(12) United States Patent
Huang et al.

(10) Patent No.: US 12,038,767 B2
(45) Date of Patent: Jul. 16, 2024

(54) CONFIGURATOR FOR MULTIPLE USER EMERGENCY RESPONSE DRONES

(71) Applicant: University of Notre Dame du Lac, South Bend, IN (US)

(72) Inventors: Jane Huang, South Bend, IN (US); Michael Vierhauser, South Bend, IN (US); Ankit Agrawal, South Bend, IN (US)

(73) Assignee: University of Notre Dame du Lac, South Bend, IN (US)

( * ) Notice: Subject to any disclaimer, the term of this patent is extended or adjusted under 35 U.S.C. 154(b) by 289 days.

(21) Appl. No.: 17/571,449

(22) Filed: Jan. 7, 2022

(65) Prior Publication Data

US 2022/0253076 A1    Aug. 11, 2022

Related U.S. Application Data

(60) Provisional application No. 63/134,624, filed on Jan. 7, 2021.

(51) Int. Cl.
*G05D 1/10* (2006.01)
*B64C 39/02* (2023.01)
(Continued)

(52) U.S. Cl.
CPC .......... *G05D 1/104* (2013.01); *B64C 39/024* (2013.01); *H04W 4/029* (2018.02); *H04W 4/30* (2018.02);
(Continued)

(58) Field of Classification Search
CPC .... G05D 1/104; G05D 1/0027; B64C 39/024; H04W 4/029; H04W 4/30; H04W 4/90;
(Continued)

(56) References Cited

U.S. PATENT DOCUMENTS

| 8,983,682 B1 | 3/2015 | Peeters et al. |
| 9,488,979 B1 | 11/2016 | Chambers et al. |

(Continued)

OTHER PUBLICATIONS

Hyrynsalmi et al., "The dark side of gamification: How we should stop worrying and study also the negative impacts of bringing game design elements to everywhere." in GamiFIN, 2017, pp. 96-104.
(Continued)

*Primary Examiner* — Michael V Kerrigan
(74) *Attorney, Agent, or Firm* — Greenberg Traurig, LLP

(57) ABSTRACT

A method for configuring a multiple autonomous drone mission includes displaying, a plurality of queries on a display of the computing device. The method further includes receiving, via a user interface, a plurality of inputs responsive to the plurality of queries. At least a first input of the plurality of inputs specifies a type of mission to be performed and at least a second input of the plurality of inputs specifies a geographical area in which a mission to be performed will be carried out. The method further includes automatically determining, based on the plurality of inputs, an initial location to move to for each of a plurality of drones available for implementing the mission. The method further includes automatically determining, based on the plurality of inputs, a series of tasks for each of the plurality of drones.

20 Claims, 37 Drawing Sheets

(51) Int. Cl.
  *G05D 1/00* (2006.01)
  *H04W 4/029* (2018.01)
  *H04W 4/30* (2018.01)
  *H04W 4/90* (2018.01)
  *B64U 101/00* (2023.01)
  *B64U 101/30* (2023.01)

(52) U.S. Cl.
  CPC ........... *H04W 4/90* (2018.02); *B64U 2101/00* (2023.01); *B64U 2101/30* (2023.01)

(58) Field of Classification Search
  CPC . H04W 4/44; B64U 2101/00; B64U 2101/30; B64U 2201/10
  See application file for complete search history.

(56) References Cited

U.S. PATENT DOCUMENTS

| | | | |
|---|---|---|---|
| 10,586,464 | B2 | 3/2020 | Dupray et al. |
| 10,600,295 | B2 | 3/2020 | Kempel et al. |
| 2010/0084513 | A1* | 4/2010 | Gariepy ............... G05D 1/0094 244/190 |
| 2020/0140087 | A1 | 5/2020 | Fulbright |

OTHER PUBLICATIONS

Knaving et al., "Designing for fun and play: exploring possibilities in design for gamification," in Proceedings of the first International conference on gameful design, research, and applications, 2013, pp. 131-134.

Antsaklis et al., 1991. An introduction to autonomous control systems. IEEE Control Systems Magazine 11, 4 (Jun. 1991), 5-13.

Atkinson et al., 1968. Human Memory: A Proposed System and its Control Processes. Psychology of Learning and Motivation, vol. 2. Academic Press, 89-195.

Biondi et al., 2018. 80 MPH and out-of-the-loop: Effects of real-world semi-automated driving on driver workload and arousal. In Proceedings of the Human Factors and Ergonomics Society Annual Meeting, vol. 62. SAGE Publications, 1878-1882.

Bødker et al., 2018. Participatory Design That Matters—Facing the Big Issues. ACM Trans. Comput.—Hum. Interact. 25, 1, Article 4 (2018), 4:1-4:31 pages.

Breuer et al., 2009. Interaction Design for Situation Awareness-Eyetracking and Heuristics for Control Centers., 6 pp.

Cook. 2007. Stories of Modern Technology Failures and Cognitive Engineering Successes. CRC Press, 16 pp.

Coyne. 2005. Wicked problems revisited. Design Studies 26, 1 (2005), 5-17.

D'Aniello et al., 2017. Adaptive Goal Selection for improving Situation Awareness: the Fleet Management case study. Procedia Computer Science 109 (2017), 529-536.

Emery et al., 1960. Socio-technical systems. In In: Churchman, C.W., Verhulst, M. (Eds.), Management Science Models and Techniques, vol. 9. Pergamon, 83-97.

Endsley et al., 2011. Designing for Situation Awareness: An Approach to User-Centered Design, Second Edition (2nd ed.). CRC Press, Inc., Chapter three, 14 pp.

Endsley. 2017. Autonomous driving systems: A preliminary naturalistic study of the Tesla Model S. Journal of Cognitive Engineering and Decision Making 11, 3 (2017), 225-238.

Fellah et al., 2019. Tactile Display Design for Flight Envelope Protection and Situational Awareness. IEEE Transactions on Haptics 12, 1 (Jan. 2019), 87-98.

Fereday et al., 2006. Demonstrating rigor using thematic analysis: A hybrid approach of inductive and deductive coding and theme development. International journal of qualitative methods 5, 1 (2006), 80-92.

Gautam et al., 2007. Design reuse framework: A perspective for lean development. Int. J. Product Development Int. J. Product Development 4 (Jan. 2007), 485-507.

Gombolay et al., 2017. Computational design of mixed-initiative human-robot teaming that considers human factors: situational awareness, workload, and workflow preferences. I. J. Robotics Res. 36, 5-7 (2017), 597-617.

Gray. 2016. "It's More of a Mindset Than a Method": UX Practitioners' Conception of Design Methods. In Proceedings of the 2016 CHI Conference on Human Factors in Computing Systems. 4044-4055.

Hotomski et al., 2018. A Qualitative Study on using GuideGen to Keep Requirements and Acceptance Tests Aligned. In 2018 IEEE 26th International Requirements Engineering Conference (RE). IEEE, 29-39.

Kaindl. 2000. A design process based on a model combining scenarios with goals and functions. IEEE Trans. Systems, Man, and Cybernetics, Part A 30, 5 (2000), 537-551.

Kaufman et al., 1998. Too much of a good thing?: Identifying and resolving bloat in the user interface. In CHI 98 Conference Summary on Human Factors in Computing Systems. 207-208.

Khan et al., 2019. Exploring Drones to Assist Firefighters During Emergencies. In 1st International Workshop on Human-Drone Interaction. Ecole Nationale de l'Aviation Civile [ENAC], Glasgow, United Kingdom, 7 pp.

Kohn et al., 1999. To err is human, Building a safety health system. Washington, DC: National Academy Press (1999), 34 pp.

Koparan et al., 2018. Evaluation of a UAV-assisted autonomous water sampling. Water 10, 5 (2018), 655.

Krüger et al., 2017. Beyond Software Product Lines: Variability Modeling in Cyber-Physical Systems. In Proc. of the 21st Int'l Systems and Software Product Line Conf. 237-241.

Lally et al., Can drones be used to conduct water sampling in aquatic environments? A review. Science of The Total Environment 670 (2019), 569-575.

Lewis et al., 2006. Task-centered user interface design: A practical introduction, 193 pp.

Lukosch et al., 2012. The participatory design of a simulation training game. In Proceedings of the 2012 Winter Simulation Conference (WSC). 1-11.

McAree et al., 2017. Towards artificial situation awareness by autonomous vehicles. IFAC-PapersOnLine 50, 1 (2017).

McCarley et al., Human factors concerns in UAV flight. Technical Report, Institute of Aviation, Aviation Human Factors Division University of Illinois at Urbana-Champaign, 5 pp.

McGrenere et al., 2002. An Evaluation of a Multiple Interface Design Solution for Bloated Software. In Proceedings of the SIGCHI Conference on Human Factors in Computing Systems. ACM, 164-170.

McNally et al., 2016. Children's Perspectives on Ethical Issues Surrounding Their Past Involvement on a Participatory Design Team. In Proceedings of the 2016 CHI Conference on Human Factors in Computing Systems. ACM, 3595-3606.

Mesar et al., 2019. Use of Drone Technology for Delivery of Medical Supplies During Prolonged Field Care. Journal of special operations medicine : a peer reviewed journal for SOF medical professionals 18 4 (2019), 34-35.

Miller. 1956. Human memory and the storage of information. IRE Trans. Information Theory 2, 3 (1956), 9 pp.

Molino et al., 2016. Using drones for automatic monitoring of vehicular accident, 18 pp. (No document uploaded).

Mueller et al., 2011. Improving users' mental models of intelligent software tools. IEEE Intelligent Systems 26, 2 (2011), 77-83.

Nielsen et al., 1993. A Mathematical Model of the Finding of Usability Problems. In Proceedings of the INTERCHI '93 Conference on Human Factors in Computing Systems (INTERCHI '93). IOS Press, NLD, 206-213.

Ore et al., 2015. Autonomous Aerial Water Sampling. Journal of Field Robotics 32, 8 (2015), 1095-1113.

Pádua et al., 2020. Digital Reconstitution of Road Traffic Accidents: A Flexible Methodology Relying on UAV Surveying and Comple-

(56) References Cited

OTHER PUBLICATIONS mentary Strategies to Support Multiple Scenarios. International Journal of Environmental Research and Public Health 17, 6 (Mar. 2020), 1868.

Pohl, Günter Böckle, and Frank van der Linden. 2005. Software Product Line Engineering: Foundations, Principles and Techniques. Springer-Verlag New York, Inc., Secaucus, NJ, USA, 31 pp.

Pokahr et al., 2005. Jadex: A BDI reasoning engine. In Multi-agent programming. Springer, 149-174.

Rao et al., 1995. BDI agents: from theory to practice . . . . In ICMAS, vol. 95. 312-319.

Rios. 2019. Firefighters practice using drones to assist ice rescues, https://www.broomfieldenterprise.com/2019/01/11/firefighters-practiceusing-drones-to-assist-ice-rescues/,Last referenced (May 14, 2020). (2019).

Ruiz-Jimenez et al., 2019. Aerial drone as a carrier for miniaturized air sampling systems. Journal of Chromatography A 1597 (Apr. 2019).

Silvagni et al., 2017. Multipurpose UAV for search and rescue operations in mountain avalanche events. Geomatics, Natural Hazards and Risk 8, 1 (2017), 18-33.

Thomas et al., 2013. A new skill based robot programming language using uml/p statecharts. In Proc. of the 2013 IEEE Int'l Conf. on Robotics and Automation. IEEE, 461-466.

Thomas. 2006. A general inductive approach for analyzing qualitative evaluation data. American journal of evaluation 27, 2 (2006), 237-246.

Vierhauser et al., 2018. Monitoring CPS at Runtime—A Case Study in the UAV Domain. In Proc. of the 44th Euromicro Conf. on Software Engineering and Advanced Applications, SEAA 2018, Prague, Czech Republic, Aug. 29-31, 2018. 73-80.

Weiss et al., 1999. Software product-line engineering: a family-based software development process. Addison-Wesley. http://books.google.com/books?id=721YAAAAYAAJ (No. document uploaded).

Wooldridge. 1997. Agent-based software engineering. IEE Proceedings-software 144, 1 (1997), 26-37.

Zhao et al., 2019. UAV-assisted emergency networks in disasters. IEEE Wireless Communications 26, 1 (2019), 45-51.

Zhi et al., 2017. Air quality monitoring platform based on remote unmanned aerial vehicle with wireless communication. In Proc. of the Int'l Conf. on Future Networks and Distributed Systems. 1-7.

Anish et al., "Probing for requirements knowledge to stimulate architectural thinking," in Proceedings of the 38th International Conference on Software Engineering, 2016, pp. 843-854.

Athanasis et al., "Big data analysis in uav surveillance for wildfire prevention and management," in Information Systems, M. Themistocleous and P. Rupino da Cunha, Eds. Cham: Springer International Publishing, 2019, pp. 47-58.

Beni et al., "Uavs for volcano monitoring: A new approach applied on an active lava flow on mt. etna (italy), during the Feb. 27, 2002-Mar. 2, 2017 eruption," Journal of Volcanology and Geothermal Research, vol. 369, pp. 250-262, 2019.

Carpentiero et al., "A swarm of wheeled and aerial robots for environmental monitoring," in 2017 IEEE 14th International Conference on Networking, Sensing and Control (ICNSC). IEEE, 2017, pp. 90-95.

Chen et al., "Situation awareness-based agent transparency and human-autonomy teaming effectiveness," Theoretical issues in ergonomics science, vol. 19, No. 3, pp. 259-282, 2018.

Chung et al., "A survey on aerial swarm robotics," IEEE Transactions on Robotics, vol. 34, No. 4, pp. 837-855, 2018.

Dooly et al., "Unmanned vehicles for maritime spill response case study: Exercise cathach," Marine Pollution Bulletin, vol. 110, No. 1, pp. 528-538, 2016.

Douglas Schuler and Aki Namioka (Eds.). 1993. Participatory Design: Principles and Practices. L. Erlbaum Associates Inc., Hillsdale, NJ, USA, partial book, 29 pp.

Endsley, "Toward a theory of situation awareness in dynamic systems," Human Factors, vol. 37, No. 1, pp. 32-64, 1995.

Fischer et al., "Supporting team coordination on the ground: requirements from a mixed reality game," in COOP 2014-Proceedings of the 11th International Conference on the Design of Cooperative Systems, May 27-30, 2014, Nice (France). Springer, 2014, pp. 49-67.

Guizzardi et al., "Ethical requirements for AI systems," in Canadian Conference on Artificial Intelligence. Springer, 2020, pp. 251-256.

Hancock et al., "Allocating functions in human-machine systems." Viewing Psychology as a Whole: The Integrative Science of William N. Dember, 1998, 31 pp.

Heard et al., "Sahrta: A supervisory-based adaptive human-robot teaming architecture," arXiv preprint arXiv:2003.05823, 2020, 9 pp.

Hu et al., "Deep reinforcement learning approach with multiple experience pools for uav's autonomous motion planning in complex unknown environments," Sensors, vol. 20, No. 7, p. 1890, 2020.

Kläs et al., "Uncertainty in machine learning applications: A practice-driven classification of uncertainty," in International Conference on Computer Safety, Reliability, and Security. Springer, 2018, pp. 431-438.

Loftin et al., "Learning behaviors via human-delivered discrete feedback: modeling implicit feedback strategies to speed up learning," Autonomous agents and multi-agent systems, vol. 30, No. 1, pp. 30-59, 2016.

Lombriser et al., "Gamified requirements engineering: model and experimentation," in International Working conference on requirements engineering: foundation for software quality. Springer, 2016, pp. 171-187.

Miller, The Quest for Software Requirements. Unspecified, 2009. (No document uploaded).

Nagel. 1998. Human error in aviation Operations. Human factors in Aviation, E.L.Weiner and E.C.Nagel (Eds) 19890047069, 34 (1998), 263-303.

Nahavandi, "Trusted autonomy between humans and robots: Toward human-on-the-loop in robotics and autonomous systems," IEEE Systems, Man, and Cybernetics Magazine, vol. 3, No. 1, pp. 10-17, 2017.

Nielsen et al., 1990. Heuristic evaluation of user interfaces. In Proceedings of the Conference on Human Factors in Computing Systems,CHI 1990. 249-256.

Norman. 2002. The Design of Everyday Things. Basic Books, Inc., New York, NY, USA, 366 pp.

Oliveira et al., 2016. Development of a User Interface for the Enrichment of Situational Awareness in Emergency Management Systems. vol. 491. 173-184.

Onal et al., 2013. From Theory to Practice: How Designing for Situation Awareness Can Transform Confusing, Overloaded Shovel Operator Interfaces, Reduce Costs, and Increase Safety, 9 pp.

Parush et al., 2017. Can teamwork and situational awareness (SA) in ED resuscitations be improved with a technological cognitive aid? Design and a pilot study of a team situation display. Journal of Biomedical Informatics 76 (2017), 154-161.

Potts, 1995. Using Schematic Scenarios to Understand User Needs. In Proceedings of the 1st Conference on Designing Interactive Systems: Processes, Practices, Methods and Techniques, DIS '95. 247-256.

Prasanna et al., 2009. Situation awareness oriented user interface design for fire emergency response. Journal of Emergency Management 7 (Mar. 2009), 65-74.

Redmon et al., 2018. YOLOv3: An Incremental Improvement. CoRR abs/1804.02767, 6 pp.

Regis et al., 2014. Formal Detection of Attentional Tunneling in Human Operator-Automation Interactions. IEEE Trans. Human-Machine Systems 44, 3 (2014), 326-336.

Richards. 2000. The reuse of knowledge: a user-centred approach. Int. J. Hum.—Comput. Stud. 52, 3 (2000), 553-579.

Rittel et al., 1973. Dilemmas in a general theory of planning. In Policy Sciences, vol. 4. 155-169.

Robertson, "Requirements trawling: techniques for discovering requirements," Int. J. Hum. Comput. Stud., vol. 55, No. 4, pp. 405-421, 2001.

(56) References Cited

OTHER PUBLICATIONS

Rushby. 2001. Modeling the human in human factors. In International Conference on Computer Safety, Reliability, and Security. Springer, 86-91.
Santoni de Sio et al., 2018. Meaningful Human Control over Autonomous Systems: A Philosophical Account. Frontiers in Robotics and AI 5 (2018), 15.
Scharre et al., An introduction to autonomy in weapon systems. Center for a New American Security, 2015, 23 pp.
Shi et al., 2011. A survey of Cyber-Physical Systems. In 2011 International Conference on Wireless Communications and Signal Processing (WCSP). 1-6.
Stoica et al., "A Berkeley view of systems challenges for AI," arXiv preprint arXiv:1712.05855, 2017, 11 pp.
Stratmann et al., 2016. Demon Hunt—The Role of Endsley's Demons of Situation Awareness in Maritime Accidents. In Human-Centered and Error-Resilient Systems Development, Springer International Publishing, Cham, 203-212.
Sutcliffe et al., "Requirements elicitation: Towards the unknown unknowns," in 21st IEEE International Requirements Engineering Conference, RE 2013, Rio de Janeiro-RJ, Brazil, Jul. 15-19, 2013, 2013, pp. 92-104.
Sutcliffe, "Requirements engineering for complex collaborative systems," in 5th IEEE International Symposium on Requirements Engineering (RE 2001), Aug. 27-31, 2001, Toronto, Canada, 2001, pp. 110-119.
Tatar. 2007. The Design Tensions Framework. Hum.—Comput. Interact. 22, 4 (Nov. 2007), 413-451.
Tezza et al., "The state-of-the-art of human-drone interaction: A survey," IEEE Access, vol. 7, pp. 167 438-167 454, 2019.
Thomaz et al., "Reinforcement learning with human teachers: Evidence of feedback and guidance with implications for learning performance," in Aaai, vol. 6. Boston, MA, 2006, pp. 1000-1005.
Tiwari et al., 2015. A Systematic Literature Review of Use Case Specifications Research. Inf. Softw. Technol. 67, C (Nov. 2015), 128-158.
Torresen, "A review of future and ethical perspectives of robotics and AI," Frontiers in Robotics and AI, vol. 4, p. 75, 2018.
van Lamsweerde et al., 1998. Managing Conflicts in Goal-Driven Requirements Engineering. IEEE Trans. Software Eng. 24, 11 (1998), 908-926.
Walker et al., 2008. A review of sociotechnical systems theory: a classic concept for new command and control paradigms. Theoretical Issues in Ergonomics Science 9, 6 (2008), 479-499.
Wickens et al., 2009. Attentional tunneling and task management in synthetic vision displays. The International Journal of Aviation Psychology 19, 2 (2009), 182-199.
Wiesner et al., "Supporting the requirements elicitation process for cyber-physical product-service systems through a gamified approach," in IFIP International Conference on Advances in Production Management Systems. Springer, 2016, pp. 687-694.
Xu et al., "Development of an uas for post-earthquake disaster surveying and its application in ms7.0 lushan earthquake, sichuan, china," Computers & Geosciences, vol. 68, pp. 22-30, 2014.
Agrawal et al., "Model-Driven Requirements for Humans-on-the-Loop Multi-UAV Missions," University of Notre Dame, Sep. 22, 2020, 10 pp.
Agrawal et al., "The Next Generation of Human-Drone Partnerships: Co-Designing an Emergency Response System," CHI '20, Apr. 25-30, 2020, Honolulu, HI, 13 pp.
Alvear et al., 2015. Mobile pollution data sensing using UAVs. In Proc. of the 13th Int'l Conf. on Advances in Mobile Computing and Multimedia. 393-397.
Anonymous, "Explaining Autonomous Decisions in Swarms of Human-on-the-Loop Small Unmanned Aerial Systems," Association for Computing Machinery, vol. 1, No. 1, Jun. 2020, 24 pp.
ArduPilot. 2019. org. (2019). [Online; http://ardupilot. accessed Sep. 1, 2019], retrieved from Wayback machine, 7 pp.

Baresi. 2018. Activity Diagrams. In Encyclopedia of Database Systems, Second Edition, pp. 51-56, https://doi.org/10.1007/978-1-4614-8265-9_9.
Batory et al., 2006. Automated analysis of feature models: challenges ahead. Commun. ACM 49, 12 (2006), 45-47.
Beg et al., 2020. UAV-enabled intelligent traffic policing and emergency response handling system for the smart city. Personal and Ubiquitous Computing (2020), 1-18.
Bellamy et al., 2017. Human-agent collaboration: Can an agent be a partner?In Proceedings of the 2017 CHI Conference Extended Abstracts on Human Factors in Computing Systems. 1289-1294.
Bertolino et al., 2006. Product Line Use Cases: Scenario-Based Specification and Testing of Requirements. Springer Berlin Heidelberg, Berlin, Heidelberg, 425-445. https://doi.org/10.1007/ 978-3-540-33253-4_11.
Bevacqua et al., "Mixed-Initiative Planning and Execution for Multiple Drones in Search and Rescue Missions," Proceedings of the Twenty-Fifth International Conference on Automated Planning and Scheduling, 9 pp.
Braganca et al., 2007. Automating mappings between use case diagrams and feature models for software product lines. In Proc. of the 11th Int'l Software Product Line Conf. IEEE, 3-12.
Bühne et al., 2006. Scenariobased application requirements engineering. In Software Product Lines. Springer, 161-194.
Caroti et al., 2017. UAV-borne photogrammetric survey as USAR firefighter teams support. In Proc. of the Int'l Conf. on Computational Science and Its Applications. Springer, 3-15.
Cauchard et al., 2015. Drone & Me: An Exploration into Natural Human-Drone Interaction. In Proc. of the 2015 ACM Int'l Joint Conf. on Pervasive and Ubiquitous Computing (UbiComp '15). ACM, New York, 361-365.
Chang et al., 2015. Development of a multicopter-carried whole air sampling apparatus and its applications in environmental studies. Chemosphere 144 (Sep. 2015), 484-492.
Claesson et al., 2017. Time to Delivery of an Automated External Defibrillator Using a Drone for Simulated Out-of-Hospital Cardiac Arrests vs Emergency Medical Services. JAMA 317, 22 (Jun. 2017), 2332-2334.
Cleland-Huang et al., 2018. Discovering, Analyzing, and Managing Safety Stories in Agile Projects. In Proc. of the 26th IEEE Int'l Requirements Engineering Conf. 262-273. https://doi.org/10.1109/RE.2018.00034.
Cleland-Huang et al., 2018. Dronology: an Incubator for Cyber-Physical Systems Research. In Proc. of the 40th Int'l Cong. on Software Engineering: New Ideas and Emerging Results. 109-112. https://doi.org/10.1145/3183399.3183408.
Cleland-Huang et al., 2020. Human-Drone Interactions with Semi-Autonomous Cohorts of Collaborating Drones. In Interdisciplinary Work shop on Human-Drone Interaction (iHDI 2020), CHI '20 Extended Abstracts, Apr. 26, 2020, Honolulu, HI, US.
Clelend-Huang et al., "Requirements-Driven Configuration of Emergency Response Missions with Small Aerial Vehicles," SPLC'20, Oct. 19-23, 2020, Montreal, Canada, 12 pp.
Cockburn. 2000. Writing Effective Use Cases (1st ed.). Addison-Wesley Longman Publishing Co., Inc., Boston, MA, USA, 204 pp.
Czarnecki et al., 2005. Mapping features to models: A template approach based on superimposed variants. In Proc. of the Int'l Conference on Generative Programming and Component Engineering. Springer, 422-437.
Deelstra et al., 2005. Product derivation in software product families: a case study. Journal of Systems and Software 74, 2 (2005), 173-194. https://doi.org/10.1016/j.jss.2003.11.012.
Doherty et al., 2010. A distributed task specification language for mixed-initiative delegation. In Proc. of the Int'l Conf. on Principles and Practice of Multi-Agent Systems. Springer, 42-57.
Ericsson et al., 1980. Verbal reports as data. Psychological Review 87, 3 (1980), 215.
Eriksson et al., 2005. The PLUSS approach—domain modeling with features, use cases and use case realizations. In Proc. of the 9th Int'l Software Product Line Conf. Springer, 33-44.
Fantechi et al., 2004. Elicitation of Use Cases for Product Lines. In Software Product-Family Engineering, Frank J. van der Linden (Ed.). Springer Berlin Heidelberg, Berlin, Heidelberg, 152-167.

(56) References Cited

OTHER PUBLICATIONS

Fantechi et al., 2007. A behavioural model for product families. In ESEC-FSE '07: Proc. of the the 6th Joint Meeting of the European Software Engineering Conf. and the ACM SIGSOFT Symp. on the Foundations of Software Engineering. ACM, New York, NY, USA, 521-524.
Fischer et al., 2014. Enhancing Clone-and-Own with Systematic Reuse for Developing Software Variants. Proc. of the 2014 IEEE Int'l Conf. on Software Maintenance and Evolution (2014), 391-400.
Fleck, 2016. Usability of lightweight defibrillators for uav delivery. In Proc. of the 2016 CHI Conf. Extended Abstracts on Human Factors in Computing Systems. 3056-3061.
García et al., 2019. High-level mission specification for multiple robots. In Proc. of the 12th ACM SIGPLAN Int'l Conf on Software Language Engineering. 127-140.
Ghabach et al., 2018. Guiding Clone-and-Own When Creating Unplanned Products from a Software Product Line. In New Opportunities for Software Reuse, Rafael Capilla et al., Springer International Publishing, Cham, 139-147.
Ghamry et al., 2017. Multiple UAVs in forest fire fighting mission using particle swarm optimization. In 2017 International Conference on Unmanned Aircraft Systems (ICUAS). IEEE, 1404-1409.
Gomaa, 2004. Designing Software Product Lines with UML: From Use Cases to Pattern-Based Software Architectures. Addison Wesley Longman Publishing Co., Inc., Redwood City, CA, USA, 57 pp.
Griffith et al., 2015. Unmanned Aerial Systems in the Fire Service: Concepts and Issues, 9 pp.
Griss et al., 1998. Integrating feature modeling with the RSEB. In Proc. of the 5th Int'l Conf on Software Reuse. IEEE, 76-85.
Hajri et al., 2016. PUMConf: a tool to configure product specific use case and domain models in a product line. In Proc. of the 24th ACM SIGSOFT Int'l Symp. on Foundations of Software Engineering. 1008-1012.
Hajri et al., 2018. Configuring use case models in product families. Software & Systems Modeling 17, 3 (2018), 939-971.
Halmans et al., 2003. Communicating the variability of a software-product family to customers. Software and Systems Modeling 2, 1 (2003), 15-36.
Hoeing et al., "Auction-based Multi-Robot Task Allocation in COMSTAR," The Sixth Intl. Joint Conf. on Autonomous Agents and Multi-Agent Systems, 8 pp.
Jacobson et al., 1997. Software reuse—architecture, process and organization for business. Addison-Wesley-Longman. I-XXVIII, 1-497 pages. (No document uploaded).
Kang et al., 1990. Feature-Oriented Domain Analysis (FODA) Feasibility Study. Technical Report. Carnegie-Mellon University Software Engineering Institute, 161 pp.
Kang et al., 2002. Feature-Oriented Product Line Engineering. IEEE Software 19, 4 (2002), 58-65.
Kim et al., 2018. Designing UAV Surveillance Frameworks for Smart City and Extensive Ocean with Differential Perspectives. IEEE Communications Magazine 56, 4 (2018), 98-104.
Markus Funk. 2018. Human-drone interaction: Let's get ready for flying user interfaces! Interactions 25, 3 (2018), 78-81. https://doi.org/10.1145/3194317.
Paul C. Clements and Linda Northrop. 2001. Software Product Lines: Practices and Patterns. Addison-Wesley. (No document uploaded).
Rabiser et al., "Supporting Product Derivation by Adapting and Augmenting Variability Models," 11th International Software Product Line Conference, 10 pp.
SEI, Software Engineering Institute. 2020. Software Product Lines. http://www.sei.cmu.edu/productlines. (2020).
Shin et al., "Auction-based Charging Scheduling with Deep Learning Framework for Multi-Drone Networks," 14 pp.

\* cited by examiner

CONFIGURATOR FOR MULTIPLE USER EMERGENCY RESPONSE DRONES

CROSS REFERENCE TO RELATED APPLICATION

This application claims priority to U.S. Provisional Patent Application No. 63/134,624, filed on Jan. 7, 2021, the disclosure of which is incorporated by reference herein in its entirety.

GOVERNMENT LICENSE RIGHTS

This invention was made with government support under Grant No. CNS1931962 awarded by the National Science Foundation (NSF), Grant No. CCF1741781 awarded by the National Science Foundation (NSF), and Grant No. CCF1647342 awarded by the National Science Foundation (NSF). The government has certain rights in the invention.

BACKGROUND

Drones or unmanned aerial vehicles (UAVs) are aircraft without human pilots, crew, or passengers on board. Drones and UAVs may be collectively referred to herein as drones. Drones may operate, for example, autonomously using a computer/controller or under control by a remote human operator. Drones may be used for varying purposes, such as photography, product transport and delivery, military operations, agriculture, infrastructure inspections, etc.

SUMMARY

An example method for configuring a multiple autonomous drone mission includes displaying, by a processor of a computing device, a plurality of queries on a display of the computing device. The method further includes receiving, by the processor via a user interface, a plurality of inputs responsive to the plurality of queries. At least a first input of the plurality of inputs specifies a type of mission to be performed and at least a second input of the plurality of inputs specifies a geographical area in which a mission to be performed will be carried out. The method further includes automatically determining, by the processor based on the plurality of inputs, an initial location to move to for each of a plurality of drones available for implementing the mission. The method further includes automatically determining, by the processor based on the plurality of inputs, a series of tasks for each of the plurality of drones.

An example system includes a display, a user interface, a memory, and a processor coupled to the memory. The processor is configured to display a plurality of queries on the display. The processor is further configured to receive, via the user interface, a plurality of inputs responsive to the plurality of queries. At least a first input of the plurality of inputs specifies a type of mission to be performed and at least a second input of the plurality of inputs specifies a geographical area in which a mission to be performed will be carried out. The processor is further configured to automatically determine, based on the plurality of inputs, an initial location to move to for each of a plurality of drones available for implementing the mission. The processor is further configured to automatically determine, based on the plurality of inputs, a series of tasks for each of the plurality of drones. The processor is further configured to receive, via the user interface after the receiving of the plurality of inputs responsive to the plurality of queries, a deploy input configured to cause the plurality of drones to carry out the mission. The processor is further configured to transmit, to each of the plurality of drones based on the receiving of the deploy input, an instruction to deploy the plurality of drones to implement the mission.

An example non-transitory computer readable medium has instructions stored thereon that, upon execution by a computing device, cause the computing device to perform operations including displaying a plurality of queries on a display of the computing device. The instructions further cause the computing device to perform operations including receiving, via a user interface, a plurality of inputs responsive to the plurality of queries. At least a first input of the plurality of inputs specifies a type of mission to be performed and at least a second input of the plurality of inputs specifies a geographical area in which a mission to be performed will be carried out. The instructions further cause the computing device to perform operations including automatically determining, based on the plurality of inputs, an initial location to move to for each of a plurality of drones available for implementing the mission. The instructions further cause the computing device to perform operations including automatically determining, based on the plurality of inputs, a series of tasks for each of the plurality of drones. The instructions further cause the computing device to perform operations including receiving, via the user interface after the receiving of the plurality of inputs responsive to the plurality of queries, a deploy input configured to cause the plurality of drones to carry out the mission. The instructions further cause the computing device to perform operations including transmitting, to each of the plurality of drones based on the receiving of the deploy input, an instruction to deploy the plurality of drones to implement the mission. The instructions further cause the computing device to perform operations including receiving, after the plurality of drones have deployed, an input via the user interface indicative of a request to change an autonomy level of a first drone of the plurality of drones.

DETAILED DESCRIPTION

Figure 1:
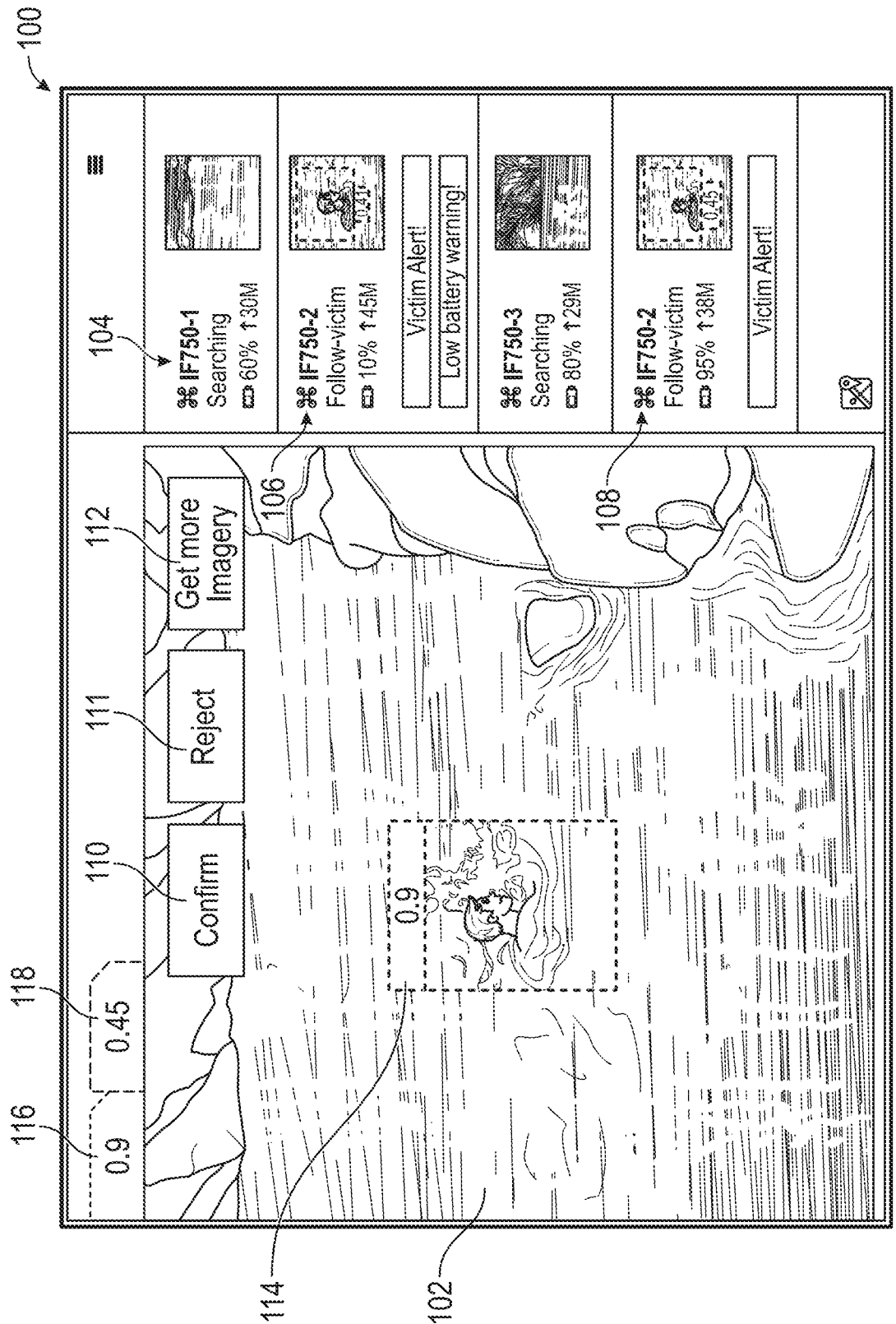
FIG. 1 is a user interface for a user tracking drones during an emergency response mission, according to various examples.

Drones and unmanned aerial vehicles (UAVs) may be increasingly used by emergency responders to support search-and-rescue operations, medical supplies delivery, fire surveillance, and many other scenarios. Described herein are various embodiments and scenarios in which drones and UAVs are imbued with varying levels of autonomy (e.g., the drones may be programmed to have greater or lesser degrees of autonomy, and those degrees may be configurable) to provide automated search, surveillance, and delivery capabilities that provide advantages over current methods. As such, further described herein are various embodiments for configurable, multi-user, multi-UAV systems for supporting the use of semi-autonomous UAVs in diverse emergency response missions. Such embodiments may also include a software product line (SPL) of highly configurable scenarios based on different types of missions (e.g., different types of emergency response missions). Furthermore, methods and processes described herein may include methods and processes for eliciting and modeling a family of related use cases, constructing individual feature models, and activity diagrams for each scenario, and then merging them into an SPL. Such an SPL may be implemented through leveraging a common set of features and/or tasks that drones are capable of performing that may be useful to apply in different types of missions. Further described herein are embodiments for configuration tools that may be used to generate mission-specific configurations for different varying use case scenarios.

Small unmanned aerial, land, or submersible vehicles (referred to herein as drones) are increasingly deployed to support time-critical emergency response missions. In current scenarios, their use may be typically limited to manual operation by a remote pilot controlling a single unmanned aerial vehicle (UAV). However, UAVs as described herein may be empowered to play a far more extensive role in various types of missions via granting varying degrees of autonomy to the UAVs/drones. Cohorts of semi-autonomous, self-coordinating, UAVs may collaborate closely with human first-responders (e.g., users) to support diverse activities such as search-and-rescue, surveillance, air and water sampling, medical supply delivery, and far more. For example, when used to support fire fighting efforts, a cohort of semi-autonomous UAVs may map out a building in order to generate a 3D heat map of potentially dangerous hotspots. Similarly, in an emergency search-and-rescue operation for a child swept out to sea, the UAVs may dynamically generate flight routes and use onboard image detection capabilities to coordinate an autonomous search for the victim, deliver flotation devices, and track and report the victim's location until rescuers arrive.

Different missions may also share common tasks while also exhibiting unique characteristics. Efficiently and effectively managing such variabilities in cyber-physical systems, such as the systems and methods described herein for collaborating UAVs, is an advantage of the embodiments herein. Such embodiments may take into consideration the context and sequencing of events in a mission, while simultaneously addressing safety-critical concerns. Tasks such as launching UAVs, obstacle and collision avoidance, and/or planning search routes, may be used across many, or even all of a group of different types of missions; while other tasks, such as collecting water samples, or tracking a moving victim in the river, may be unique to a specific mission. The UAVs, including the software controlling them and the interfaces for interacting with them, may support these diverse scenarios throughout the mission. Variability points may be managed through inclusion or exclusion of specific capabilities, differences in the order in which tasks are executed, and through different levels of UAV autonomy and human interactions enabled across different mission contexts. Mission-specific products may be configured and deployed quickly prior to launch and the concrete configuration pushed onto central components, mobile units, and/or the UAVs.

The embodiments herein may account for use cases for which variability for different missions is embodied in software features, hardware capabilities, differing degrees of UAV autonomy versus human control, alternate sequencing of tasks for different missions, or any combination thereof. Such variability provides various advantages over prior systems. For example, various embodiments described herein include providing a dataset of different detailed use cases describing emergency response scenarios and presents a requirements-driven process for systematically constructing an SPL feature model and activity diagram from these use cases. Further the embodiments herein relate to behavioral aspects of the product line (PL) such as sequencing of events and configurable and adaptable autonomy levels with differing degrees of human-drone interaction. Further described herein are various embodiments for configurators which emergency responders may use to select predefined mission plans or to configure new mission specifications. Various embodiments may include a pre-launch configuration. An already launched product may also be able to adapt to changes in the environment or in response to human interactions. Thus, the embodiments herein provide for a system which may be executed immediately following configuration without additional testing, as may be required in emergency situations. Various examples herein include multi-UAV emergency missions, the various embodiments herein may be used in other environments. For example, factory floor delivery robots may be configured for different types of missions using any of the embodiments described herein.

Various embodiments provide for determining and/or receiving from a user requirements for diverse usage scenarios of a multi-drone system. Such information may be used to create individual features and behavioral models from which PL assets may be constructed/assembled/ordered. In general, a PL may represent a set of software-intensive systems that share a common, managed set of features developed or composed from a common set of core assets. A product may be derived by selecting a set of alternative and optional features (variabilities) and composing them on top of a set of common base features (commonalities). In various embodiments herein a feature model may be created and used along with an activity diagram that may control and constrain transitions across and/or between tasks and states for each drone.

Various embodiments herein therefore include a UAV management and control system with a control or configurator interface, such as the interface 100 depicted in FIG. 1. The interface 100 may include representations of multiple drones, such as drone 104, drone 106, and/or drone 108. The interface 100, for each of the multiple drones 104, 106, 108, may include information about those drones, such as battery level, altitude level, what task the drone is currently performing, an image or images captured by a camera of the drone (e.g., a video), alerts related to tasks (e.g., a victim alert indicating that a victim candidate may have been located), or any combination thereof.

Any of the drones 104, 106, 108, etc. may also be selectable by a user such that a user may view more information related to the drone, such as a close up view of the image(s) captured by the drone. In the interface 100, the drone 106 is selected and an image 102 captured by the drone is therefore displayed larger in the interface 100. The image 102 may have a bounding box 114 overlaid to show where a processor on the drone or in another computing device remote from the drone may believe a victim to be rescued is located in the image. The bounding box 114 may also include a confidence threshold (e.g., 0.9 or 90%) representing how likely the processor has determined it is that the victim has been located as indicated by the bounding box 114.

The interface 100 may further include buttons 110, 111, 112 that may be selected by a user to confirm that the victim identified is a victim to be rescued, reject that what is identified is a victim to be rescued, or request that the drone acquire more imagery of the victim candidate (e.g., that the drone move to acquire images having additional or different angles/views of the victim candidate). In the embodiment shown in the interface 100, the drone 108 may also have located a potential victim candidate, as the thumbnail image also includes a bounding box. The victim candidate may be the same or a different object/candidate as the one identified by the selected drone 106. The drone 108 may have located a candidate, and the processor that determined the presence the victim candidate may have a different confidence threshold for this victim of 0.45 (45%). Tabs 116 and 118 may indicate the confidence thresholds of any drone that have located a victim candidate. The tabs 116 and 118 may be selectable by a user to view images of the victim candidates and quickly determine whether there are actual victims to be rescued or not. In various embodiments, a processor that controls the interface may be configured to automatically display a victim candidate at the enlarged image 102 (e.g., select the drone that has identified a victim candidate) as soon as a drone has identified a victim. In various embodiments, if multiple drones have identified a victim candidate, the system may automatically display the image from the drone where the processor determines a higher confidence threshold that a victim has been located.

While a river rescue example is depicted in FIG. 1, the embodiments herein may support diverse emergency missions from within a single application. Users (e.g., emergency responders) may use the various embodiments herein to configure common missions in advance and then contextualize and parameterize them. Second, users may also configuration new or uncommon missions on a customized basis, such as previously unseen and unfolding scenarios, prior to launch, using the configurators described herein using combinations of features and sequences of behavior for various drones.

Figure 2:
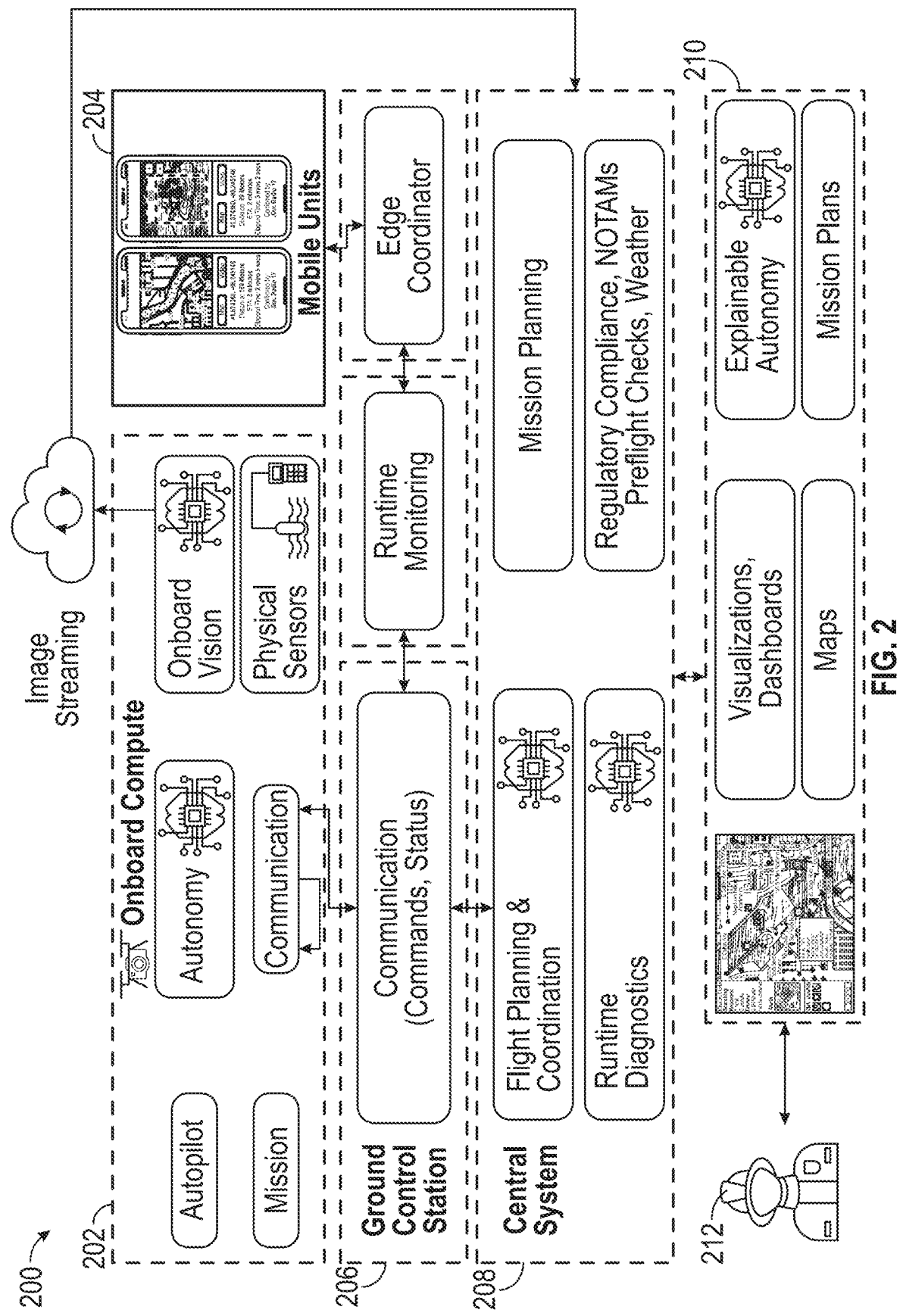
FIG. 2 is a schematic diagram of an example system for implementing a multi-drone mission.

FIG. 2 depicts an example high-level architecture of a system for multi-drone response and shows some of its variation points. UAVs may be imbued with decision-making capabilities driven by mission goals (e.g., find and rescue a victim in the river), constrained by UAV capabilities (e.g., thermal vs. visible light camera, or flotation device delivery capabilities), and influenced by their assigned roles and responsibilities. UAVs may leverage their knowledge of the environment and the overall current state of the mission in order to make decisions on enacting specific tasks. They share information with other UAVs as well as centralized modules that assist with global coordination and meta-reasoning tasks.

Figure 12:
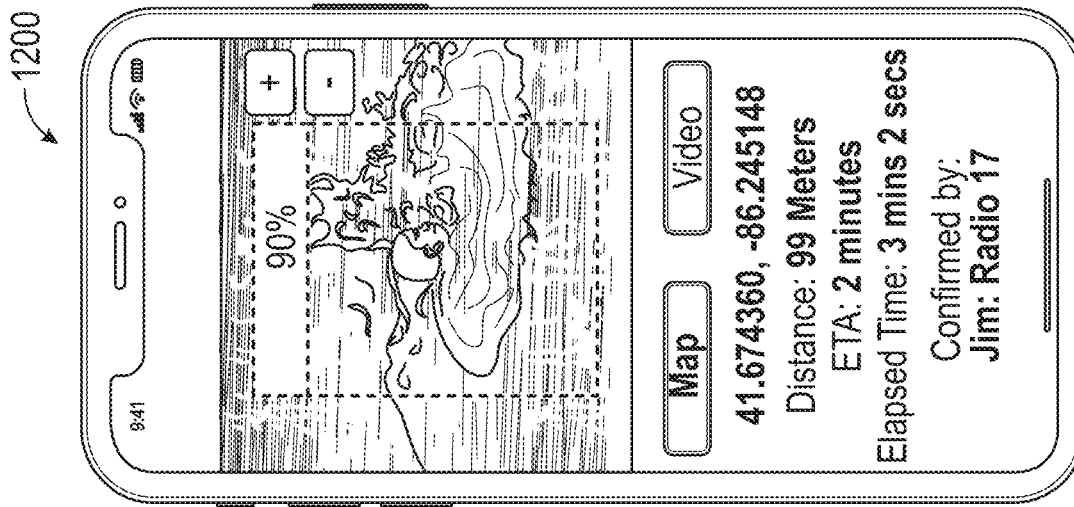

In the example of FIG. 12, drones 202 may have onboard computing power that may include autopilot software/hardware, varying levels of autonomy including artificial intelligence/machine learning/image recognition aspects, onboard vision (e.g., cameras), mission parameters/assignments, communication hardware/software, and physical sensors (e.g., temperature, water or air sampling, etc.). A ground control station 206 may communication with the drones 202, mobile units 204, and a central system 208. The central system 208 may be used for flight planning and coordination, mission planning, may have runtime diagnostics and other regulatory compliance, NOTAMs, preflight checks, weather, etc. information and software to enable the central system 208 to perform related functions. The flight planning and coordination as well as mission planning may be performed based on inputs or information from the mobile units 204, the drones 202, and/or a user device 210 that is used by a user 212 and may include an interface such as the one depicted in FIG. 1. In particular, the user device 210 may include visualizations or other dashboards, maps, explainable autonomy (e.g., aspects of the drones 202 autonomous feature that may be simplified or otherwise abstracted for ease of use of the user 212), mission plans, etc. The user 212 may also make inputs that affect how the system coordinates the drones, plans a mission, adjusts a mission or the tasks of a particular drone in real time during the mission, etc. While FIG. 2 shows several different computing devices, additional, different, or fewer devices may be used in various embodiments.

In an example method, useful aspects for different types of missions are collected and analyzed. Different sources of information for these requirements may be used. In examples built during testing of the methods described herein, aspects, features, and architecture identified with a fire department for emergency missions they face were identified. Published literature on drone and emergency was also studied to determine common aspects of different types of emergency situations faced such as firefighters, coast guards, and other groups using UAVs in emergency response scenarios. As such, a set of well-described and diverse scenarios for driving the development of a PL were identified so that discrete tasks that may be components parts of such missions may be identified for use in the methods and systems described herein. Example scenarios used to determine such components parts included river search and rescue, ice rescue, defibrillator delivery, traffic accidents, structural fires, water sampling, and air sampling. Some of the scenarios relate to off-the-shelf solutions for drone control, such as MissionPlanner (ardupilot.org/planner), QGroundControl (qgroundcontrol.com), or DroneSense (dronesense.com). Such systems may plot or generate sets of waypoints for the UAVs to follow, but do not instruct a drone when to change tasks, abandon a task, etc. as described herein.

An example use case that was abstracted to its main objectives, exceptions that may occur, etc. is shown below for an ice search and rescue. The use case starts by describing the actors and stakeholders and establishing pre-conditions and post-conditions. It then describes the main success scenario, as well as alternate sequences of events and exceptions that can occur at any time of the mission. Steps that were determined to describe common tasks that may be used in other missions (e.g., shared across multiple use cases) are defined with references to those tasks (e.g., SPLC-XXXX). In this way, the various tasks for a use case may be defined and standardized so they may be utilized in other use cases. For example, the UAV takeoff task SPLC-1007 may be used in any drone related mission, so that task may be selected and repeated for other aerial drone based use cases. In this way, those references to supporting use cases may be utilized to simplify programming of the system as a whole—the takeoff task will not need to be separately programmed for every use case, but rather a standard takeoff task may be called upon and used for different use cases. Other steps without a specific identifier may be the current (or few) use case and are described directly in the text. The example below is merely one example, and other examples may be more complex even for a similar use case, may have different tasks, may be for different use cases, etc.

constraints of different missions, and an activity diagram may be generated for each mission that describes dynamic aspects of the system by modeling the flow from one activity to another for varying missions.

In step M1, use cases are specified. The requirements elicitation process for a given mission may be performed in an iterative fashion. For example, in one system built, the first type of mission studied was a river search-and-rescue use case. That initial use case and the modeling done for it may be cloned, and used to derive a use case for a second mission scenario (e.g., ice rescue) by adding, removing, and modifying use case steps. As such, the a group of use cases that include similar steps as those shown above for the ice search and rescue may be developed.

At step M2 a mission-specific feature model (FM) is constructed. For each mission scenario an individual FM may be created. For example, starting with the river search-and-rescue scenario, the features used to support the use case may be identified. Those features may be ordered/composed into a hierarchy of mandatory, optional, and alternative features. Additional cross-tree constraints may be added as well. The resulting FM was added to an FM pool. For each subsequent mission for which an FM is developed, the most

---

Use Case: Ice Search and Rescue
USE CASE ID: SPLC-11
Description
UAV(s) dispatched with a flotation device for ice rescue
Primary Actor
Drone Commander
Trigger
The Drone Commander activates the delivery.
Main Success Scenario
 1. Emergency responders plan area search [SPLC-1001]
 2. The DroneResponse commander issues a command to start the mission.
 3. The UAV(s) takeoff [SPEC-1007]
 4. The UAVs perform search [SPLC-1002]
 5. The UAV requests victim confirmation [SPLC-1005] from the human operator.
 6. The UAV receives confirmation from the human operator that the victim
    sighting is valid.
 7. DroneResponse automatically sends the GPS coordinates to the mobile_rescue
    system.
 8. The UAV switches to flotation device delivery [SPLC-1006] mode.
 9. Human responders reach the victim's location and execute a rescue.
10. The Drone Commander ends mission [SPLC-1007].
Specific Exceptions
 1. In step 3, one of the UAVs fails to take-off.
    1.1 If a replacement UAV is flight-ready, it is dispatched in place of the failed UAV.
    1.2 If no replacement is available DroneResponse re-executes generate- search-plan
        [SPLC-1009] for the available UAVs and previously defined search area.
General Exceptions
 1. At any time, if communication is lost between the Ground Control Station and a UAV,
    DroneResponse executes the Lost Drone-to-GCS Communication (SPLC-2001)
    exception case.
 2. At any time, a malfunction error is raised by a UAV in flight, DroneResponse
    executes the Drone-in-flight Malfunction (SPLC- 2002) exception case.

---

Figure 3:
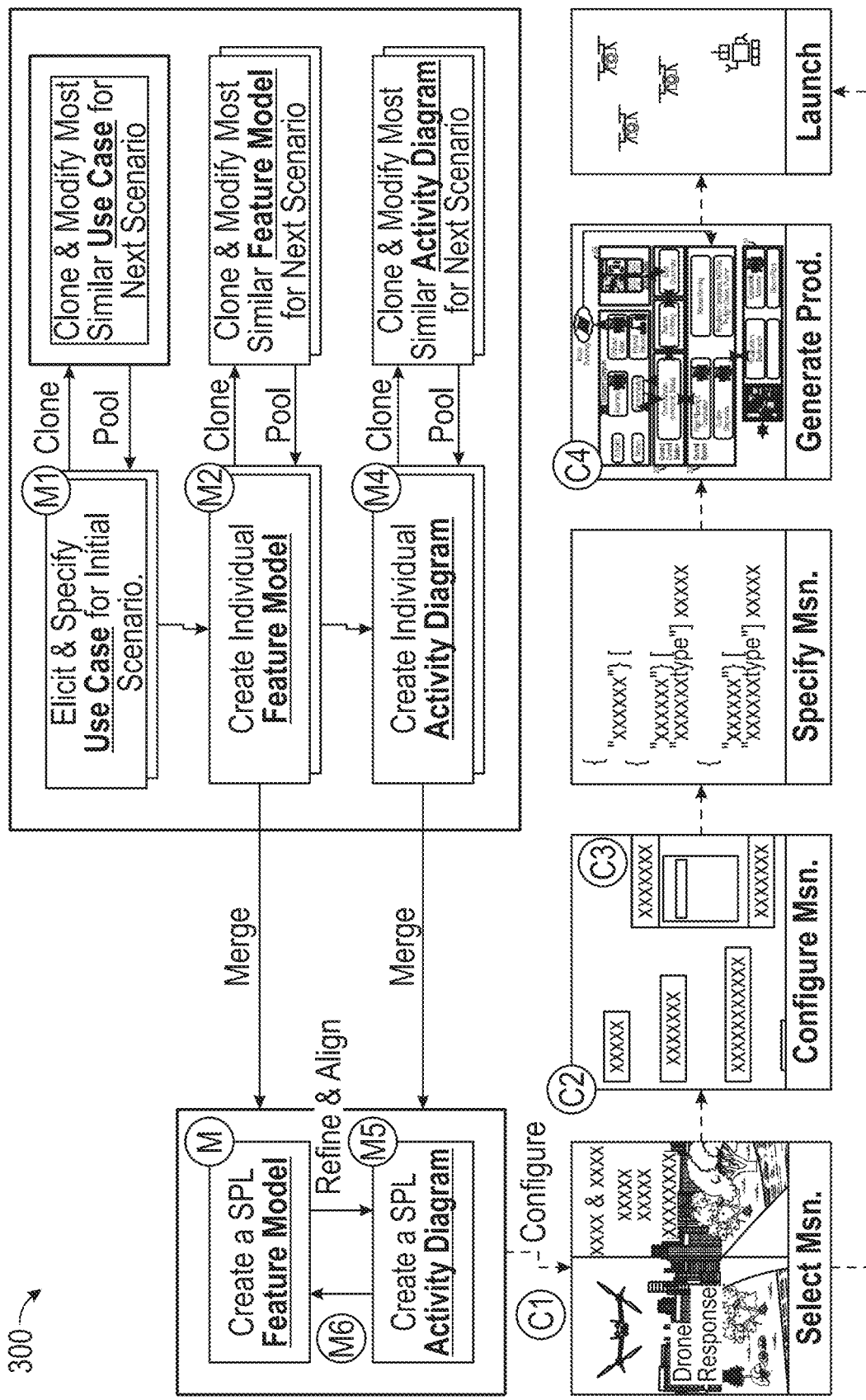
FIG. 3 is a flowchart showing an example for building mission parameters according to various examples.

Two distinct types of configurations in the embodiments described herein. In the first case, the SPL may facilitate the configuration of known mission scenarios. Initially these may include river search-and-rescue, ice rescue, defibrillator delivery, traffic accident monitoring, structural fire support, and/or water/air sampling. In a second case, the SPL may be used to configure previously unseen mission scenarios through the reuse of existing features combined and sequenced in new ways. Our process involves the two primary steps of modeling and configuration as illustrated in FIG. 3.

Figure 4:
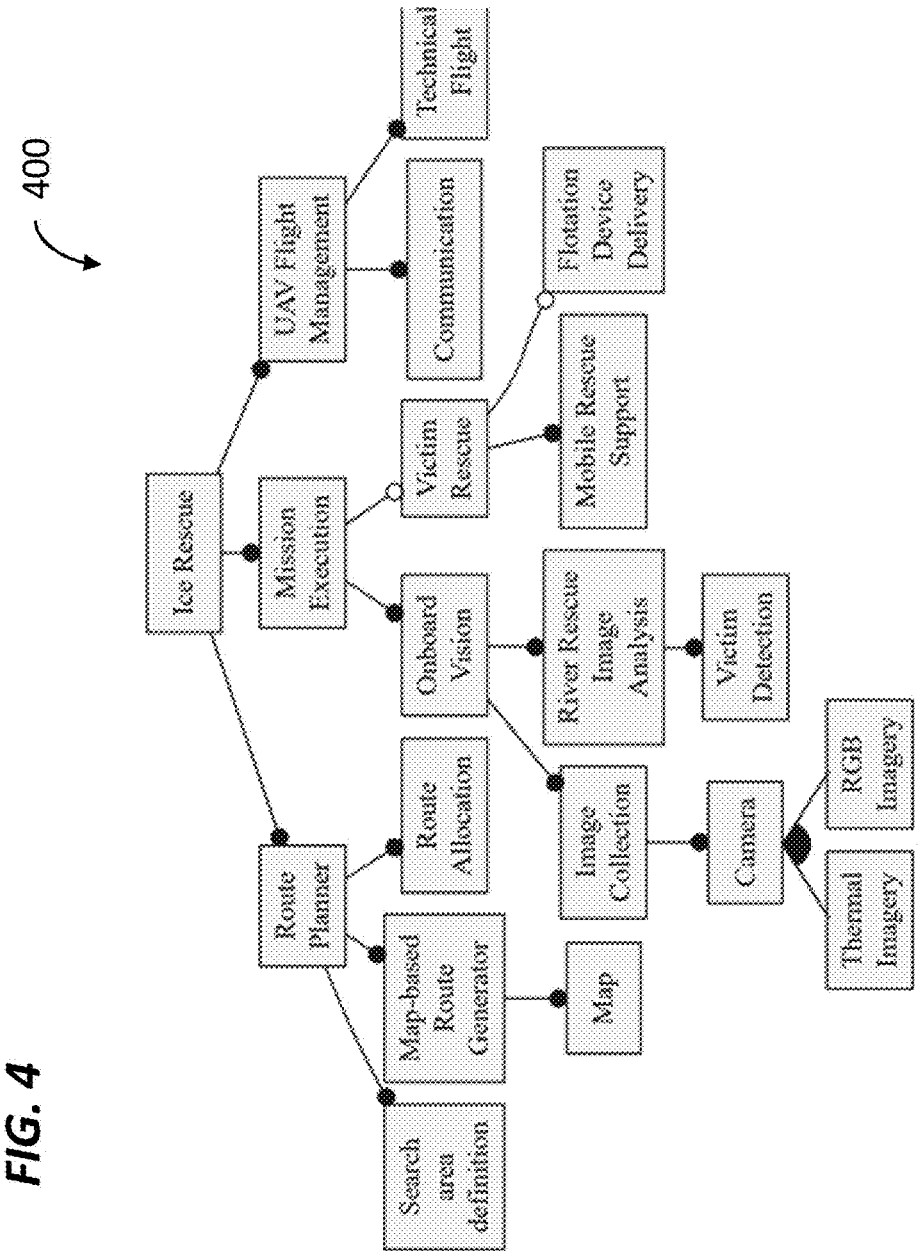
FIGS. 4-7 are example state diagrams for multi-drone missions according to various examples.

For modeling, product lines (PLs) are characterized by their commonality and variability points. Such feature models capture commonalities, variability points, and feature similar FM may be selected from the pool, cloned, and then manually adapted for a new mission by adding, removing, and modifying features, associations, and constraints. An example feature hierarchy for an ice rescue is depicted in FIG. 4. Each FM may be specified in a particular, standardized format for ease of use and programming new/unique missions. In one example, the FMs were specified in a JSON format, whereby each node was assigned a NodeName and a descriptive label. Associations between features were specified as parent-child relationships between nodes, and constraints were structured as tuples (e.g., NodeName, NodeName, [requires|excludes]).

Figure 5:
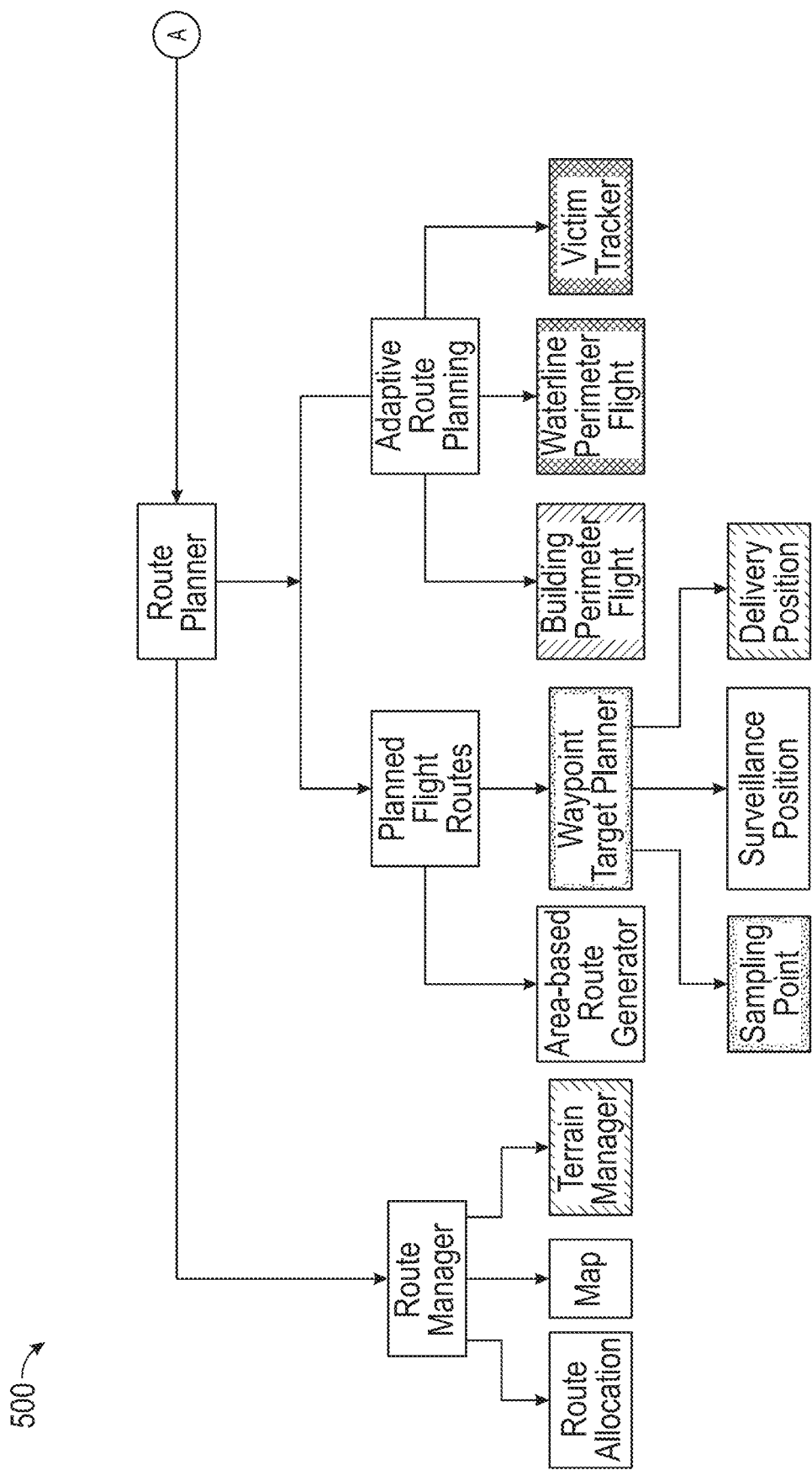
Figure 5:
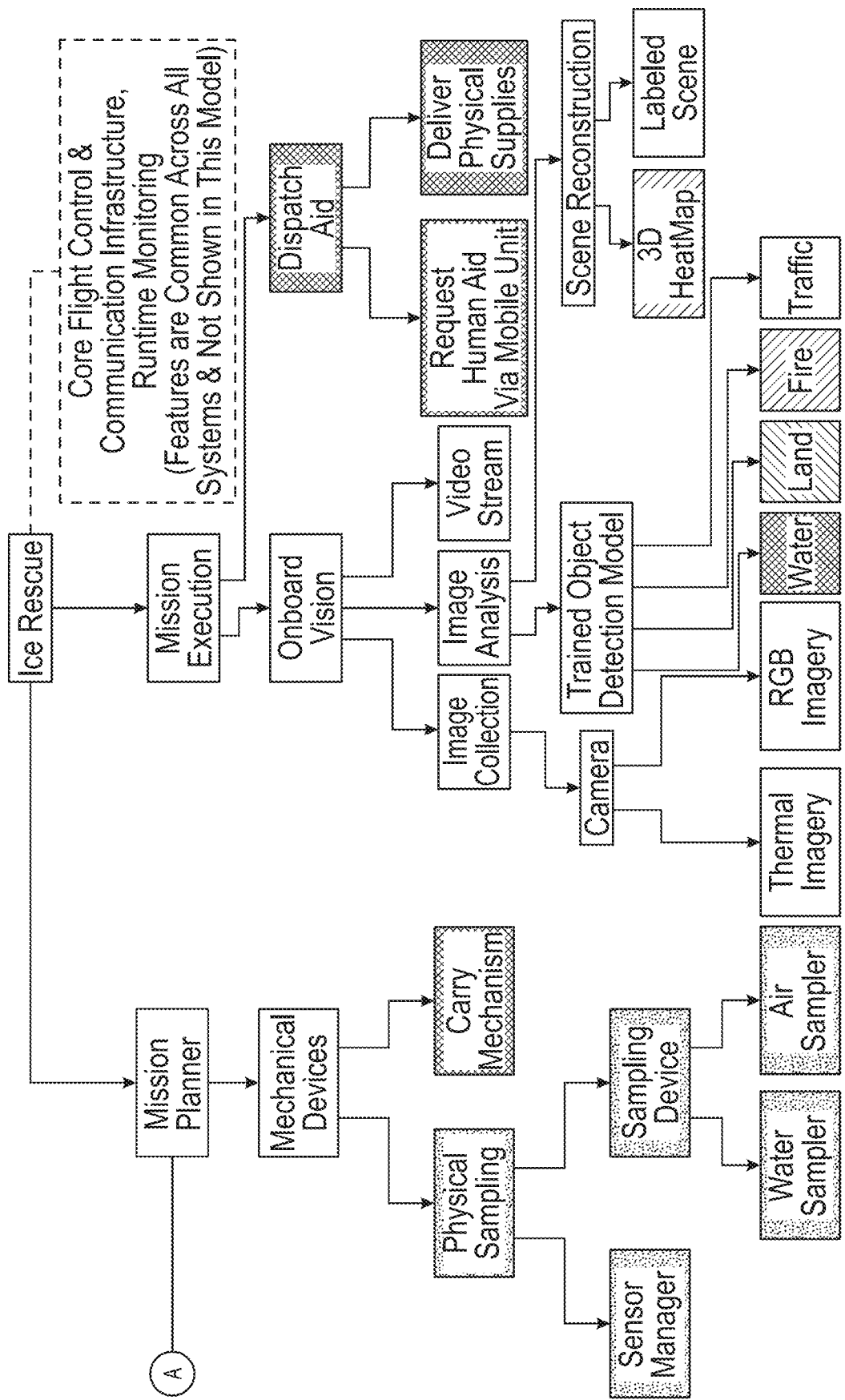

At step M3, a semi-automated merge of individual FMs may be performed. For example, all of the individual FMs were merged into a single PL-level FM. An incremental approach may be followed to limit the complexity of reconciling differences at each individual step. Starting with the river search-and-rescue FM and treating it as the initial baseline, a simple automated name matching algorithm was used to automatically merge the next individual FM into the current baseline. Given such a clone-and-own approach in which many NodeNames were shared across individual FMs, the majority of nodes were automatically matched using a simple NodeName matching algorithm. After each merge, each model may be manually inspected and refined to correct any problems through (1) merging nodes that served a similar purpose but had failed to merge due to having different node names, (2) reconciling different hierarchical organizations of the same features, and/or (3) standardizing the level of refinement across FMs by refining leaf features that were at higher levels of abstraction than defined by other FMs. The philosophy for selecting the next model to merge may be varied from the philosophy of selecting a use-case or model to clone. Instead of selecting the most similar model, the most dissimilar FM to the currently merged baseline may be selected. In this way, major structural differences between models may be addressed in earlier stages of the merging process before the overall model grew in size and complexity. An example merged feature model produced as a result of the iterative process described here is depicted in FIG. 5. In the merged FM in FIG. 5, features from river and ice rescue are included (crosshatched), delivery thatching angled up from left to right), structural fires thatching angled down from left to right), environmental sampling (dotted background pattern), and traffic surveillance. Features used in multiple scenarios are shown without fill shading.

Figure 6:
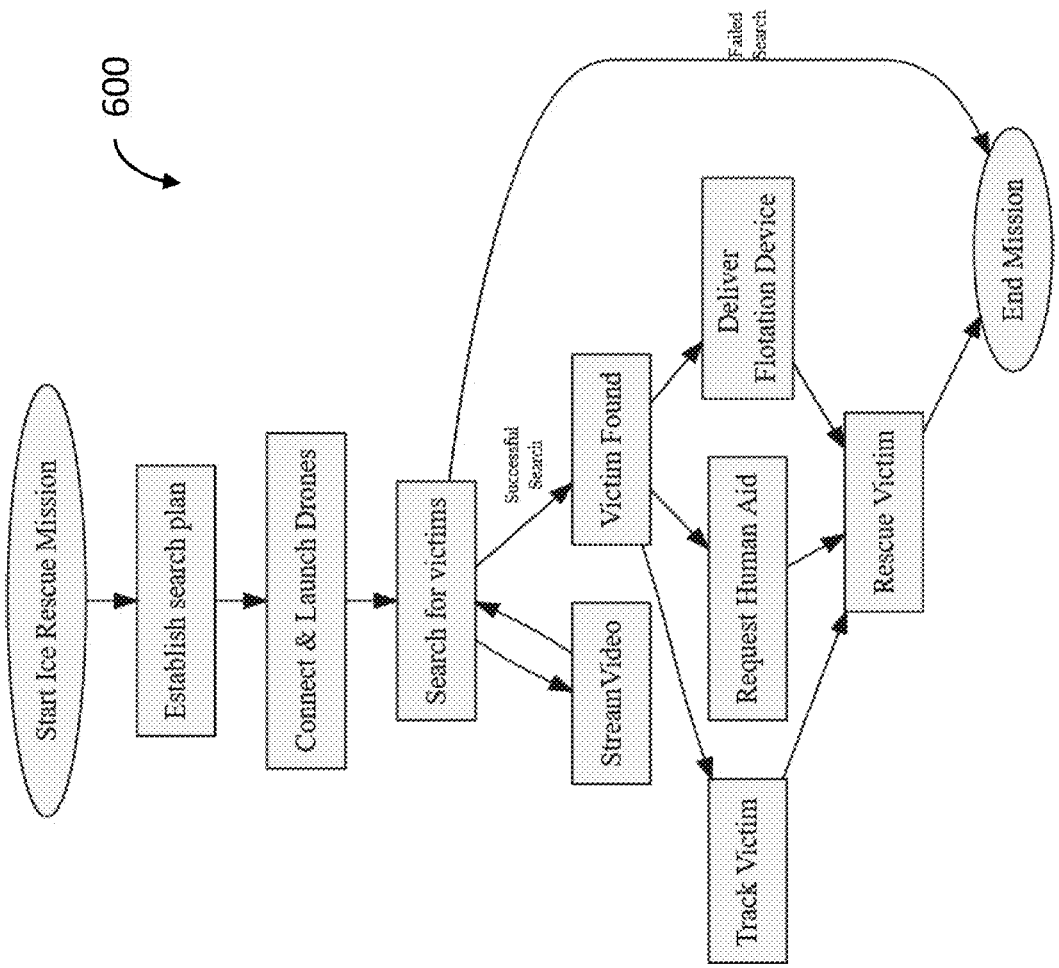

At step M4, mission-specific activity diagrams are constructed. Each mission may be characterized by a carefully choreographed set of human activities and semi-autonomous UAV tasks. For example, during a search-and-rescue mission, humans and UAVs may first plan the mission, then engage in a search activity, and when the victim is found, they may transition to activities such as tracking or delivering a flotation device. In some missions, a special UAV equipped with a flotation device may be waiting on the sidelines for the victim to be found, while in another mission (e.g., search-and-rescue at sea), all drones might be equipped and dispatched with life-saving devices from the start of the mission. The sequencing of activities is therefore different for each mission, and may be documented in the form of an activity diagram. An example of an activity diagram for an ice rescue is shown in FIG. 6. Activity diagrams may not only document activities and their transitions, but may be used for additional purposes. For example, they may be used during the product configuration process to communicate the emerging mission steps to users. In addition, the activity diagrams may be used them to dynamically visualize the current state of the mission by showing the current task that each UAV is performing at any time (e.g., by displaying an activity diagram like the one shown in FIG. 6 with additional notations visually indicating different drones that at different or the same activities in the activity diagrams, and moving those drone notations when a given drone changes activity). Transitions between tasks may occur based on different conditions being satisfied. For example, a task transition may occur by default when a given task/activity is completed. Some transitions may happen based on other conditions, such as a failed search as shown in FIG. 6 where a drone or multiple drones may transition from searching for victims to ending a mission (e.g., returning to a control center or launch location of the drone(s)).

Constructing a mission-specific activity diagram may be performed manually for each use case using the same cloning approach used to create the individual FMs. Different levels of model granularity may be used, such that visualizing detailed activities does not overly obscure the main purpose of a mission, while overly high-level abstractions may be avoided so as not to hide important information about a given configuration/mission. To balance these competing needs, variability points (e.g., track victim, deliver flotation device) that had a major impact on the sequencing of the mission may be modeled, whilst hiding internal configuration points such as computer vision models or route planning algorithms used for specific activities within specific contexts. Sequencing variations may also be hidden that may impact a single higher-level task. For example, the track-victim task may involve a variant that was driven by the autonomy level of the UAV (e.g., tracking a victim may be performed automatically once a victim is located, or after a human user confirms that the victim has actually been located based on the autonomy level granted to the UAV). A UAV awarded high levels of autonomy may switch automatically into tracking mode when it detects a potential victim (e.g., victim candidate), while a UAV with a lower level of autonomy may seek human permission before transitioning modes. This is also an example of a runtime configuration point as a user may modify the UAV's autonomy levels during a mission or in the mission pre-configuration.

At a step M5, a semi-automated merge of individual activity diagrams may be performed. Given a set of individual activity diagrams (e.g., the activity diagrams developed at step M4), the activity diagrams may be merged them into a single SPL-level activity diagram following a similar process used for creating the SPL FM from individual FMs. Once again, the next activity diagram may be merged incrementally into the baseline using a strict NodeName matching approach, and then may be systematically refined by using the resulting diagram as a new baseline. The merging process may include any or all of (1) combining activity nodes that served a similar purpose but had different node names, (2) analyzing different sequences between tasks and either reconciling them into a common sequence or establishing conditions on each transition to control the order of execution. (3) standardizing the level of refinement across diagrams by combining low-level activities into more abstract ones, and/or (4) where alternate flows of specific activities were identified for different missions, abstracting the activity to a higher level and making that activity node configurable according to the mission context.

Figure 7A:
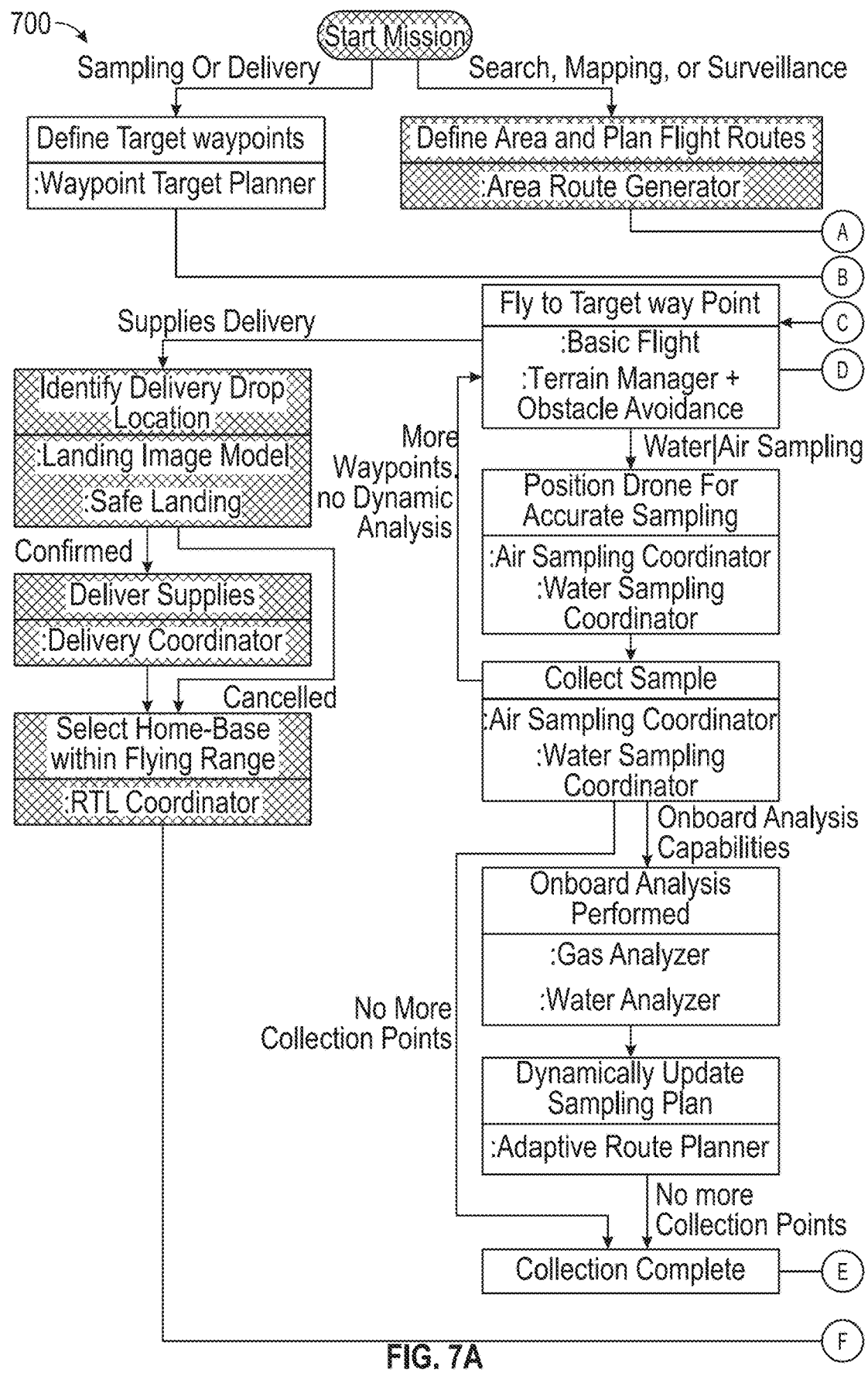
Figure 7A:
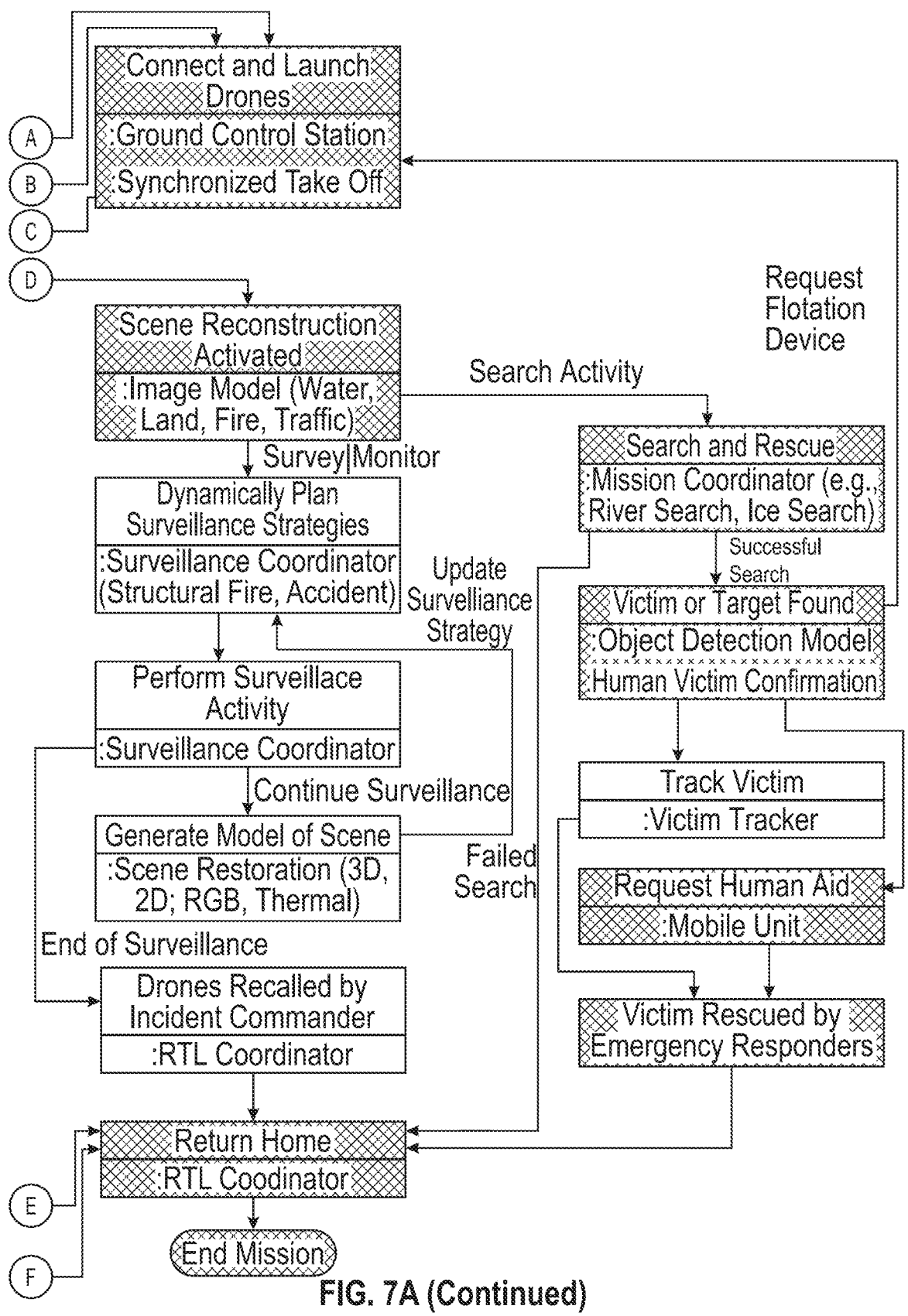
Figure 7B:
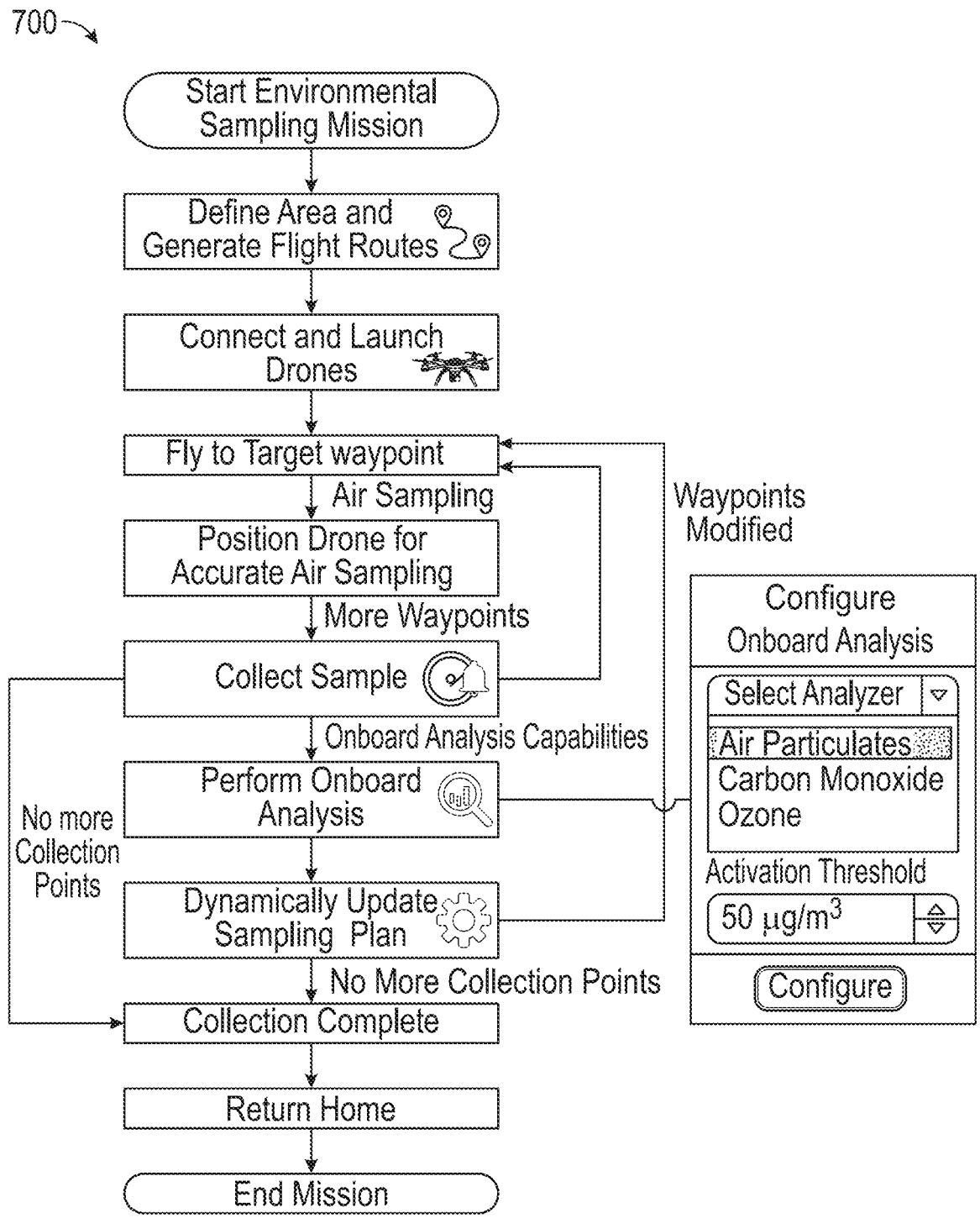

At step M6, models may be reconciled and tasks may be mapped to features. In this modeling step, a mapping may be manually created from each feature in the FM to concrete components in a multi-drone response system implementation. In addition, the activity nodes may be mapped to features. An example activity diagram is shown in FIG. 7 that includes merged activity flow diagram for seven initial emergency missions. Mappings to features are shown for key activities. For illustrative purposes, all activities relevant to the 'Ice Rescue' scenario are highlighted with crosshatching. Components are shown in the lower half of each activity node in the PL activity diagram in FIG. 7. These mappings may be used to physically configure a system for a defined mission. Step M6 may therefore be used to reconcile the FM and Activity models, and for connecting them to a concrete system architecture.

The PL-level FM, activity diagram, and their mappings to the concrete implementation may be used in a product configurator for deriving new missions as described herein. Such a system may help alleviate challenges and weaknesses in prior systems, such as a high reliance upon experts, incompatible component interactions, and erroneous parameter settings. Each of these represents a non-trivial problem which may be effectively addressed in the various embodiments herein, including in embodiments where a goal may be to configure and immediately execute a mission (as often occurs with developing emergency situations). Improper configurations may cause serious failures in the mission, such as failure to dispatch a UAV with a flotation device when needed, failure to identify a victim due to incorrect vision settings or models, or a communication failure that results in a mid-air collision. The systems and methods described herein address these problems such that appropriate tasks are addressed by drones at the appropriate or desired times. The configurator described herein may also be operated by emergency responders under time-pressure to respond to the emergency situation, hence in various situations there may be no opportunity to inspect, review, or validate new configurations before flight. Thus, using the embodiments described herein, a variety of different missions may be implemented in a multi-drone system using a shared architecture that is populated with mission-relevant components such as computer vision models, analytics, UIs, and autonomy models onboard the UAVs.

Different missions may be derived through a series of configuration steps (e.g., four steps C1-C4 as shown in FIG. 3) that may impact various aspects of the system such as a central server, ground control stations, onboard compute, and interconnected mobile devices. The configuration process may be used to dynamically generate a visualization of the configured mission (e.g., FIG. 8) which may be used for communicating with a user and for supporting interactive configuration of activity nodes. It may also output a machine-readable mission specification in a computer readable format (e.g., JSON) which may be passed to the back-end server and used to manage product configuration and deployment.

At a step C1, assembly/configuration choice is performed. The user may either select an existing mission to configure or may choose to assemble a new mission. If the user selects an existing mission, they can either launch the mission as-is (bypassing all remaining configuration steps) or configure the existing mission (bypassing step C2).

At a step C2, high-level mission assembly is performed. A wizard may be provided to the user on a user interface/display to guide the user through the process of assembling a novel mission. Questions, such as the examples below in Table 2, may be used to differentiate the primary goals and contexts of the different emergency mission use cases.

TABLE 2

Questions asked during the configuration process

| ID | Question | Variants |
| --- | --- | --- |
| Q1 | What type of mission? | Fire, Environmental sampling, Search, Delivery, Surveillance |
| Q2 | How will you define flight paths? | Region, Waypoints |
| Q3 | Are you fighting a structural fire or a ground fire? | Structural, Ground |

TABLE 2-continued

Questions asked during the configuration process

| ID | Question | Variants |
| --- | --- | --- |
| Q4 | What type of environment are you working in? | Water, Land, Ice, Snow |
| Q5 | What are you surveying? | Traffic, Flood, Other |
| Q6 | Are there independent rescue teams? | Mobile rescue unit |
| Q7 | Should drones track the victim? | Victim tracking |
| Q8 | Will your mission deliver rescue equipment to the victim? | Rescue equipment |
| Q9 | Do drones have on-board sample analysis capabilities? | On-board analysis |
| Q10 | What are you sampling? | Water, Air |

Figure 8:
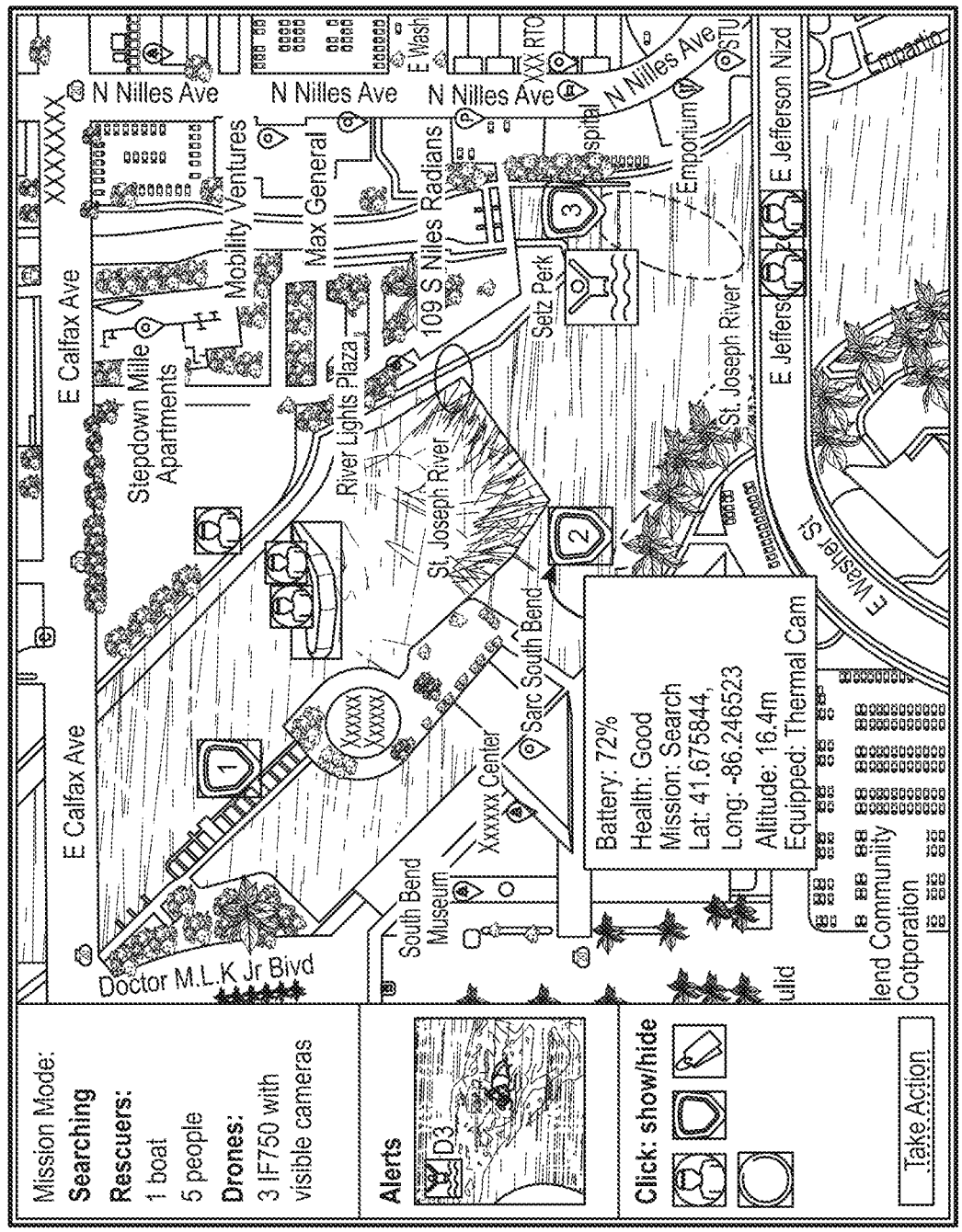
FIGS. 8-12 are a user interfaces for a user tracking drones during an emergency response mission, according to various examples.

Some questions may have several candidate answers, listed as variants in the table, while others may require a yes/no answers to specify whether a feature was present or absent. The questions may be organized into a decision tree so that pertinent follow-up questions may be asked in response to previous answers. For example, if a user responds "SEARCH" to question Q1, then they are asked questions Q4, Q6, Q7, and Q8 in order to determine planning, context, rescue, and tracking capabilities. The maximum number of questions per configuration may be limited (e.g., five), and the least number may be a minimum number (e.g., two). Once these questions are answered, the system may use the response to generate a mission-specific activity diagram and may display it on a display or user interface. FIG. 8 shows an example of such an activity diagram rendered for an environmental air sampling scenario.

At step C3, components of the system are configured. Configurable nodes of the activity diagram in FIG. 8 are annotated with representative icons, which in this example includes five configurable nodes. For example, area definition and flight route generation features can be configured with different mapping options (e.g., terrain, map) and with different techniques for generating flight routes. Similarly, sample collection and onboard analysis activities may be configurable by available collection mechanisms and onboard analysis techniques, and software for connecting to mechanical controls (e.g., sensors and actuators) and for performing onboard analysis needs to be correctly loaded onto the UAVs prior to the mission. As such, by interacting with these nodes, a user may configure different aspects of a mission during setup.

At step C4, a runtime configuration is performed. Runtime configuration options may be supported in various embodiments. Some runtime operations may also be exposed to users, while others are not. For example, a synchronized launch mechanism is automatically activated at runtime if more than one drone is scheduled for simultaneous launch, and the system may be configured such that a user cannot adjust or turn off this feature. However, other features may be exposed to the users—for example, allowing them to raise or lower autonomy permissions of a UAV with respect to specific actions. In an example for victim tracking, a user may be able to, via a user interface, reduce a UAV's autonomy and require that it seeks permission to track a candidate victim or increase its autonomy such that it may begin tracking a victim automatically.

This multi-step configuration process described herein therefore produces a mission specification in a computer readable format (e.g., JSON), which serves as a machine-interpretable description of the mission and its configuration points. The configuration decisions during that configuration process may impact the system in several key ways including the following: (1) central control mechanisms: Some parts of system may be centrally coordinated. Examples include the route_planning algorithms that generate search routes for N UAVs within a region defined by the user. Core dronology components may be configured dynamically through a parameterization mechanism. (2) Onboard autonomy: the system's UAVs may be imbued with decision-making capabilities using a BDI (Belief-Desire-Intent) model of autonomous agents. UAVs may build their beliefs through directly observing the environment (e.g., use of their onboard sensors) and through receiving information from other UAVs, central control, and human operators. Mechanisms for supporting communication and enabling UAVs to reason about achieving their goals (desires) through enacting specific tasks (intents) may be included in the mandatory architectural components on board each UAV. Onboard configuration may involve configuration of several BDI components, including its knowledge management capabilities, goals, permitted tasks, and mode transitions. Onboard configuration may also involve context-specific computer vision models, logic for interacting with mechanical devices, and software analytics for dealing with specialized data (e.g., onboard water sampling). (3) Mobile units: the systems herein may represent a complex socio-technical environment that includes mobile units which also may be configured or activated. For example, a river rescue configuration may include a mobile application for communicating with rescuers on a boat (e.g., the rescuers on the boat may have mobile devices that communicate with the system). Such mobile devices may, in various embodiments, have any of the functionality, user interfaces, etc. as any of the other devices described herein. (4) User interface (UI): missions may be configured to support different degrees of human-drone interactions within mission-specific contexts. Therefore UIs may be activated and configured according to the specific mission. An example of a mission-specific UI is shown in FIG. 1.

A mission coordinator component on the central system (e.g., the central system 208 of FIG. 2) may be responsible for interpreting the mission specification, configuring each part of the system, and/or using the mission specification to track and monitor the state of the unfolding mission.

The system's UI may therefore be designed specifically to support emergency response missions. The configurator may also be implemented/integrated into a larger system UI so that users can interactively answer the configuration questions and configure a multi-drone mission for different missions. The resulting mission specifications may be dynamically visualized as an activity diagram, for example, using services of a d3-graphviz library where graphviz formatted activity files are stored or hosted. In addition, a machine-readable (e.g., JSON) file may be generated depicting the mission configuration.

The use of semi-autonomous Unmanned Aerial Vehicles (UAV) to support emergency response scenarios, such as fire surveillance and search and rescue, offers the potential for huge societal benefits. Various embodiments herein further account for situational awareness (SA) in a scenario-driven, participatory design for multi-drone systems. Methods and systems described herein may address certain problems in prior systems, such that the systems and methods herein may represent a reusable solution for achieving SA in multi-stakeholder, multi-UAV, emergency response applications.

Different types of systems are deployed with various goals such as enabling humans and machines to engage collaboratively in real-world tasks. Such systems may incorporate aspects of both cyber-physical systems (CPS) and socio-technical systems (STS), and may further be characterized by close co-operation between multiple humans and machines. They may be referred to as socio-technical CPS. One example is a system that deploys small Unmanned Aerial Vehicles (UAVs) alongside human first responders to quickly create a 3D heat map of a burning building, detect structurally unsound hotspots, or to generate thermal imagery of smoke-filled rooms to search for people trapped inside the building. In such scenarios, a certain degree of UAV autonomy may be programmed into the drones such that it frees up human responders to focus on mission planning and decision-making tasks without dealing with low-level details of controlling individual UAVs. Humans, however, may collaborate closely with the UAVs, for example, examining video streams to evaluate potential victim sightings or setting high-level mission goals.

The embodiments herein advantageously address such complex problems presented by emergency situations that may have no well-formulated solution, multiple stakeholders with conflicting needs, no definitive test of a solution's validity, and/little opportunity to learn by trial and error. Historically, many CPS failures have originated in the user interface (UI). For example, in 1988 the US Navy shot down a civilian plane with 290 people on board. The Vincennes had entered Iranian water and mistakenly identified the Airbus as an attacking F-14 Tomcat despite the fact that the Airbus was emitting civilian signals. The mistaken identification was partially attributed to a problem in the UI which caused the operator to confuse the data of a military plane in the area with that of the civilian one. In fact, design problems may have contributed to 60% to 85% of accidents in aviation and medical device domains, including many attributed to human failures.

User interface design problems in socio-technical CPS may be related to poor Situational Awareness (SA), which may be defined as the ability for users to perceive, understand, and to make effective decisions. Accordingly, various embodiments herein include aspects that provide users with better situational awareness. FIG. 8 depicts an example user interface for a system for a river-rescue scenario. Three UAVs are dispatched on the river (shown as shields), and are tasked with planning and executing search routes. UAV #3 may use image recognition to identify a potential victim in the water and streams video shown in the left side panel.

To reiterate, situational awareness (SA) may be defined as the ability for users to fully perceive, understand, and make decisions in a given situation. Perception (Level 1 SA) is a first level of SA and involves recognizing and monitoring elements such as people, objects, and environmental factors as well as their current states (e.g., can the elements of a situation be perceived). Comprehension (Level 2 SA) builds upon perception and involves the ability to develop a picture of the current situation through using pattern recognition, evaluation, and interpretation to synthesize information (e.g., can the perceived information be understood/comprehended). Finally, a third level of SA, Projection (Level 3 SA), involves understanding dynamics of the environment and projection of future states (e.g., can the perceived and comprehended information be used to make higher level decisions). An effective UI design must support all three SA levels.

The river-rescue scenario, depicted in FIG. 8, highlights several user interface situational awareness factors. First, the three UAVs may be operating semi-autonomously, and a human incident commander (e.g., the user) may benefit from full awareness of the scope of UAV permissions and a current state of each task being performed by each UAV.

This may include information such as the geographical boundaries of each UAVs search or the mission at large, understanding their current modes (e.g., searching, returning home), capabilities (e.g., thermal or visible-light imagery) or constraints (e.g., poor light requires thermal imagery), and/ or empowering the designated operator(s) (e.g., user) to issue meaningful commands. For example, in FIG. 8, UAV #3 has identified a potential victim and has automatically switched to "track-victim" mode. The operator may be alerted to this event, inspect the video stream, confirms or refutes the victim has been found, and/or may take actions based on the preceding information and actions.

The various embodiments described herein may provide advantages which address various SA challenges. For example, an SA challenge may be transition failures across graphical & physical UIs. CPS may require physical UI controls in addition to graphical ones on a computerized display. Misalignment of these UIs during transitions from one interface to the other may cause confusion and/or errors, including errors by users. For example, accidents may occur where a physical flight control was ceded from a computer to a human operator using a hand-held controller because an input on the hand-held controller was held by a human operator in an extreme position during the transition. For example, prior to take-off, an operator may incorrectly positioned the throttle in the fully downward direction. This mistake may be ignored during software controlled flight if the software is not specially programmed to notice this error. As soon as control was ceded to the handheld controller, the UAV may plummet to the ground and break. However, it is desirable to pass control of UAVs between humans and machines. As such, the UIs described herein may be more carefully aligned during transitions. A system may also identify all potential pairings between graphical and physical UIs (e.g., throttle position of hand-held controller as UAV transitions from computer to manual control or vice versa) and integrate consistency checks. For example, system may sound an alarm on the UAV Technician's UI and prohibit a UAV from taking off until its handheld controls are positioned correctly.

Another SA challenge may include socio-technical CPS communication failures. In a socio-technical CPS, high degrees of collaboration and complex systems may benefit from clear human to human, UAV to UAV, human to UAV, and UAV to human coordination. Communication failures across any of these pairings may isolate humans or UAVs, introduce confusion and uncertainty, reduce understanding of recent events, and/or force humans and/or UAVs to make independent decisions without the benefit of intended coordination mechanisms. In emergency response scenarios, communication may traditionally been based on the use of radios and hand signals, and communication failures are inevitable due to unclear spoken commands and spotty telecommunications coverage. A well-designed UI may provide the opportunity to augment radio-communication with visible messaging and to provide communication logs that enable a human or UAV to quickly reconstruct situational awareness lost through a communication breakdown.

Another SA challenge may involve enigmatic autonomy. An autonomous system may change its behavior at runtime in response to changing conditions and events. Human users of the system therefore may benefit by understanding the capabilities and permissions of the autonomous system in order to interpret its behavior. For example, the human operator may benefit from understanding when and why a UAV makes an autonomous decision to return to launch (RTL), switch operating modes from search to track-victim mode, or change its flight plan to avoid a communication dead spot. The UIs herein may therefore advantageously provide such information to keep an operator/user aware of current tasks performed by different drones, switching of tasks, and/or what autonomous permissions a drone does or does not have (so that the user can understand to what degree a drone may be able to switch tasks autonomously).

Figure 9:
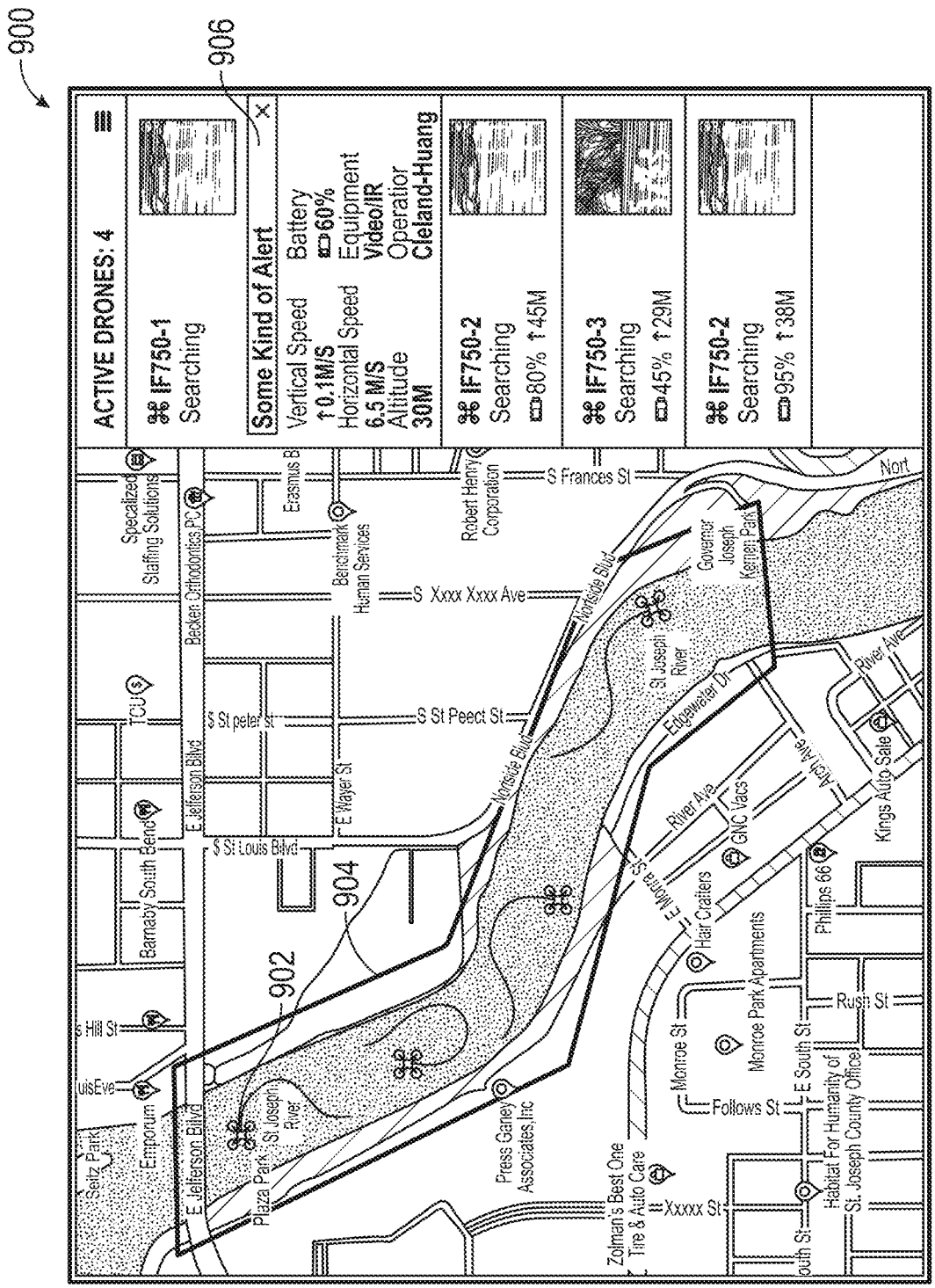

FIG. 9 shows an example user interface 900 that may aid in providing a user with situational awareness. For example, on the right of the UI 900, summaries of multiple drones similar to that in FIG. 1 may be provided. The left of the UI 900 may include a map showing icons representative of the location of each of the four active drones being used. On such icon 902 is shown, along with a path indication. The path indication may be where the drone has traveled, where it is planning to travel, or both. If both, the indication may further include an element like an arrow to differentiate where the drone has been and where it is going. The map may further include an indication 904 outlining a relevant area for the mission, such as a river rescue search mission. The user may set the search boundaries for the drones of the system, as all four drone icons appear within the indication 904. The icons may also be color coded with the information on the right of the UI 900 so that it is clear which drone is which.

Figure 10:
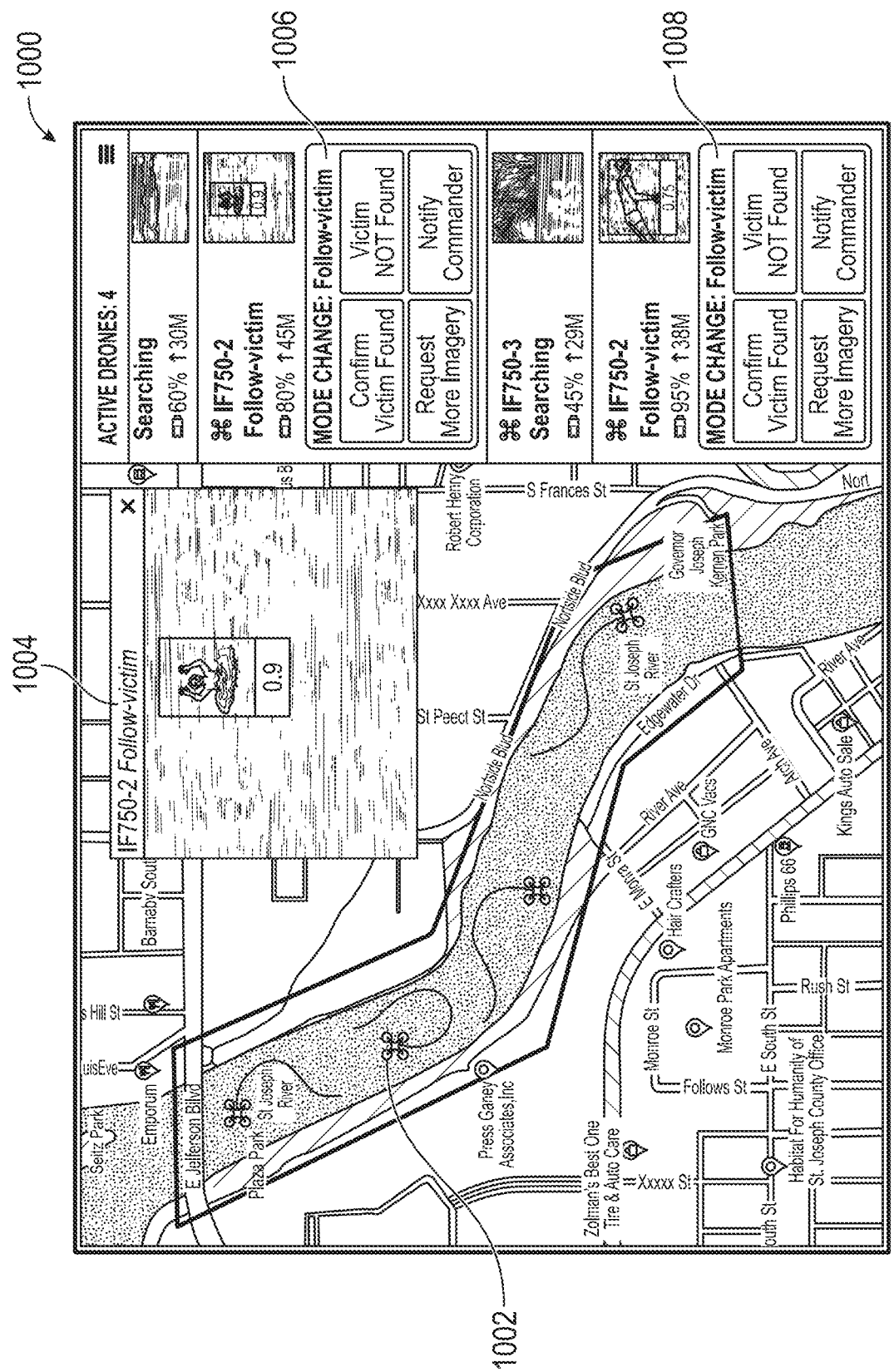

FIG. 10 shows another example similar to FIG. 9 with a user interface 1000. The UI 1000 includes an overlay 1004 showing images or video captured by one of the drones. The selected drone may be indicated by an indicator 1002, so that the user knows which drone's video/images is being displayed. The UI 1000 may further include interface elements 1006 and/or 1008 that may include selectable elements for the user to indicate whether a victim has been located by the drones as described herein. Various aspects of a UI or all aspects of a UI may also be displayed on more than one device, such as the mobile device displays depicted in FIGS. 11 and 12.

Figure 11:
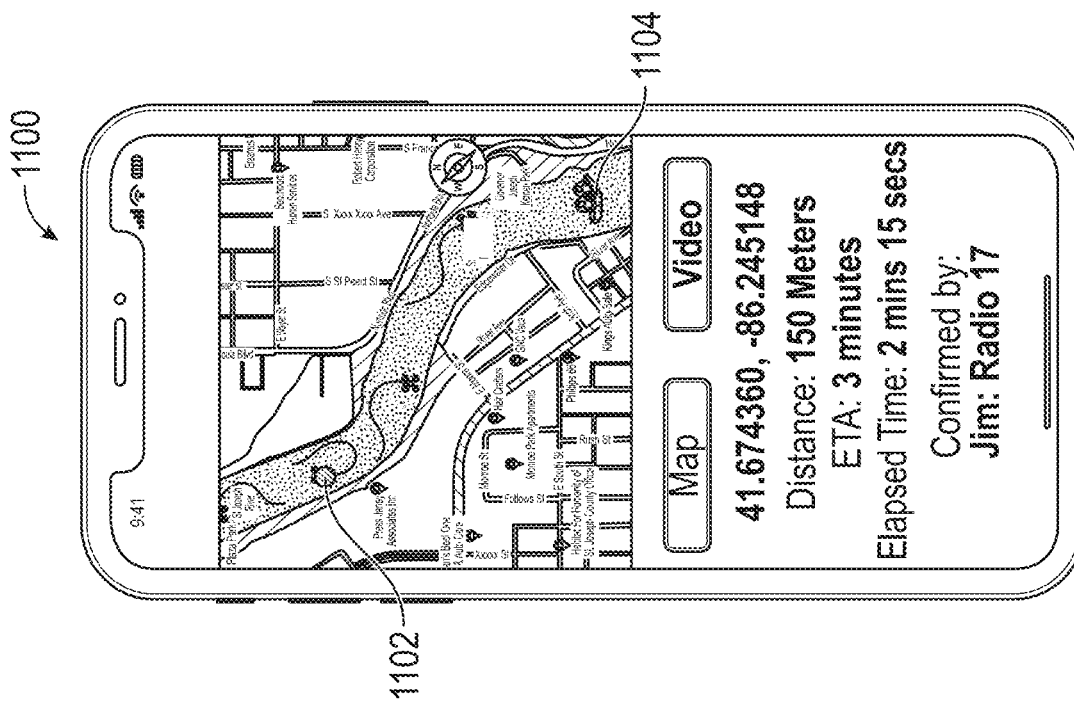

FIGS. 11 and 12 include UIs for mobile devices, such as for emergency responders out searching for a victim in a river rescue situation. In the UI 1100 of FIG. 11, a map icon is selected and a map with icons 1102 and 1104 are displayed. The icon 1102 may indicate a location of a victim based on a drone that has located the victim (and/or based on a user's confirmation that a potential victim candidate located by a drone is in fact a victim). The icon 1104 may indicate a location of the rescuers (e.g., based on GPS coordinates of the mobile device displaying the UI 1100). The UI 1100 may display other information relating to the mission, such as GPS coordinates of the victim, distance to the victim, time to reach the victim based on current speed and distance to the victim, how much time has passed since the victim was located or since emergency services had begun looking for a victim or since emergency services became aware of the situation. The UI 1100 may further include information about the user that confirmed the location of the victim based on drone images, in this way, if the rescuers on the boat wish to seek additional information about the victim or the user's confirmation of the location of the victim, the rescuers may be enable to reach out and communicate with that user. The UI 1200 shows a video or image(s) captured by a drone that is tracking a victim when the video selectable element is selected.

In various embodiments, the UI may switch from a view like in FIG. 9 or 10 to a view like the one in FIG. 1 once a victim is identified, as the rescue of the victim may take precedence over any other activity or tracking of other location/activity of other drones. In various embodiments, other types of alerts may be used beyond just relating to a detected victim, and those alerts may be communicated visually on a UI. For example, the UI may have a blinking alert to indicate that communication with a drone or other device has been lost, and may further include a timer indicating for how long communication with that device has been lost. Different alerts may have different colors or other visual features on a UI so that certain alerts may be prioritized (e.g., red) compared to others (e.g., yellow). Other alerts may be for a fly-away, where a drone has left the screen and therefore a user can no longer see that icon. The alert may note to a user that the drone is no longer being represented on the map portion of the UI, so to keep the user's SA high relating to that fly-away drone, an alert indicating such a status may be displayed so that the user remembers to check/monitor that drone. Other alerts may be related to wind or other environmental variables. For example, in certain high wind speeds drones may be instructed to land immediately. In such situations, the user should be alerted visually on the UI so they understand what is happening and that one or more drones are no longer performing their assigned tasks/functions. In other words, visual cues such as weather icons, for any operating conditions that are likely to impact system behavior. Make relevant information available upon request. (e.g., "You are operating in low visibility conditions. Expect the UAVs to fly more slowly and closer to the surface under these conditions.") Other information may be selectively displayed based on different drone's tasks. In other words, clearly identify and display any information that is needed within the current context (e.g., a UAV needs to return home, and therefore the home location is displayed on the map). Whenever operator input is needed for a critical decision (e.g., when a victim is found), display common options prominently on the screen.

Various embodiments for the use of semi-autonomous unmanned aerial vehicles (UAVs or drones) to support emergency response scenarios, such as fire surveillance and search-and-rescue are therefore described herein. Onboard sensors and artificial intelligence (AI) may allow such UAVs to operate autonomously or semi-autonomously in the environment. However, human intelligence and domain expertise may be used in planning and/or guiding UAVs to accomplish the mission. Therefore, humans and multiple UAVs may to collaborate as a team to conduct a time-critical mission successfully. Further various embodiments herein include functionality for providing for how and when human operators may interact with a swarm of UAVs. Different collaboration actions may be taken, and the roles of UAVs and humans in autonomous decisions may vary based on different scenarios or emergency scenarios. In various embodiments, a user may not only interact with the UAVs, but the user's input may also be elicited to plan specific missions, which also has an impact on UAV behavior after the mission begins. As such, described herein are various example scenarios where humans may collaborate with UAVs to augment the autonomy of the UAVs.

The deployment of a swarm of Unmanned-Aerial Vehicles (UAVs) to support human first responders in emergencies such as river search-and-rescue, hazardous material sampling, and fire surveillance has earned significant attention due to advancements in the robotics and Artificial Intelligence (AI) domains. Advanced AI models may assist UAVs in performing tasks such as creating a 3D heat-map of a building, finding a drowning person in a river, and delivering a medical device, while robotics autonomy models enable UAVs to automatically plan their actions in a dynamic environment to achieve a task. However, despite these advances, the deployment of such systems may have challenges due to uncertainties in the outcome of the AI models, rapid changes in environmental conditions, and/or emerging requirements for how a swarm of autonomous UAVs may best support first responders during a mission.

The UAVs used in systems described herein may have functions such as sensing, planning, reasoning, sharing, and acting to accomplish their tasks. For example, in a multi-UAV river search-and-rescue mission, the autonomous UAV may detect a drowning person in the river utilizing the on-board AI vision models (sensing) and ask another UAV to schedule delivery of a flotation device to the victim's location (planning and reasoning). These UAVs may collaborate to share (sharing) the victim's location and subsequently deliver the flotation device (acting). These intelligent UAVs may also send the victim's location to emergency responders on the rescue-boat so that they can perform the physical rescue operation. Systems of such complexity may benefit from the interaction of humans and intelligent agents to collaborate as a human-agent team.

Issues can arise in designing a system comprising humans and autonomous agents is to identify how they can collaborate and work together to achieve a common goal. The challenges in human multi-agents collaboration may include identifying when and how humans should adjust the autonomy levels of agents, identifying how autonomous agents should adapt and explain their current behavior to maintain humans' trust in them, and finally, identifying different ways to maintain situational awareness among humans and all autonomous agents. Described herein are various embodiments for a humans-on-the-loop solution in which humans may maintain oversight while intelligent agents may be empowered to autonomously make planning and enactment decisions.

Various embodiments described herein may represents a socio-technical cyber-physical system (CPS) in which multiple humans and multiple semi-autonomous UAVs may engage in a shared emergency response mission. UAVs may be designed to make autonomous decisions based on their current goals, capabilities, and current knowledge. They may build and maintain their knowledge of the mission through directly observing the environment (e.g., through use of their onboard sensors) and through receiving information from other UAVs, central control, and human operators. UAVs then work to achieve their goals through enacting a series of tasks.

Humans may interact with UAVs through various GUIs to create and view mission plans, monitor mission progress, assign permissions to UAVs, provide interactive guidance, and to maintain situational awareness. Bidirectional communication may be used for enabling both humans and UAVs to complement each other's capabilities during the mission. An example of human-UAV collaboration is depicted in the UIs in FIGS. 1 and 10. In this example, a UAV has detected a candidate victim in the water, autonomously started tracking the victim, while simultaneously requesting confirmation from the human incident commander that the detected object is actually the victim.

Various embodiments may include human-UAV interaction related to planning a rescue strategy. When a UAV identifies a potential victim in the river, the victim's coordinates may be sent to a mobile rescue unit. However, the UAV may also make a decision such as deciding whether to request delivery of a flotation device by a suitably equipped UAV or whether it is sufficient to simply continue streaming imagery of the victim until human rescuers arrive. The UAV may make this decision by estimating the arrival time of the rescue boat versus the time to deliver a flotation device. However, a human user may contribute additional information to the decision—for example, by modifying the expected arrival time of the rescue boat, or by inspecting the streamed imagery and determining whether the victim would be able to receive the flotation device if it were delivered (e.g., the victim is conscious and not obscured by overhead branches) and is in need of the device (e.g., not having a safe waiting position on a rock or tree branch). This is an example of a bidirectional exchange of knowledge between multiple humans and multiple UAVs, where the first UAV shares the victim's coordinates and streams imagery, humans on the boat estimate their ETA and if necessary update the UAV's situational awareness, the incident commander decides whether a flotation device could be used effectively if delivered on time, and/or, if desired/needed, a second UAV performs the delivery. Other examples of such bidirectional exchange of knowledge between human users and UAVs may also be used in various embodiments.

UAVs and humans may also share environmental information. In a river search-and-rescue mission, victims may tend to get trapped in 'strainers' (i.e., obstruction points) or tangled in tree roots on outer banks. These areas may need closer visual inspection. While UAVs have onboard vision and will attempt to identify 'hotspots', human responders may directly provide this information to multiple UAVs based on their observation of the scene and/or knowledge of such areas. This may enable UAVs to collaboratively adapt their flight plan so that they prioritize specific search areas, or adjust their flight patterns to reduce speed or fly at lower altitudes in order to render higher-resolution images of priority search areas. As such, unidirectional information sharing such as this may pass actionable information from humans to UAVs (or vice versa in other examples).

Victim confirmation is another example of information sharing. A UAV's AI model may use its onboard computer vision to detect potential victims. When the confidence level surpasses a given threshold, the UAV may autonomously switch to tracking mode and broad-cast this information to all other UAVs. If the UAV autonomy level is low and/or the confidence level is below a predetermined threshold, it may request human confirmation of the victim sighting before it starts tracking. Human feedback may then be sent to the UAV and propagated across all other UAVs. In this scenario the UAV may elicit help from the human and the human responds by confirming or refuting the UAV's belief that it has sighted a victim or by suggesting additional actions. For example, if the detected object is partially obscured, the human might ask the UAV to collect additional imagery from multiple altitudes and angles.

Support for UAV coordination may also involve human and UAV communication. Multiple UAVs may simultaneously detect a victim. They may then use onboard computer vision and their own estimated coordinates of the detected object to determine whether they have detected the same object and to plan a coordinated response. However, this determination may be more complicated in poor visibility environments with weak satellite signals and/or low geolocation accuracy (e.g., in canyons). Human responders may therefore intervene in the UAV's planning process by helping determine whether the sighted objects are valid and/or unique, and may assist in selecting an appropriate UAV for the tracking task. This is an example in which a human user may intervene in a UAV's autonomy and potentially provide direct commands, assigning a specific UAV to the task.

Prohibiting normal behavior may be a further human and UAV communication in various embodiments. UAVs may have with built-in safety features so that they autonomously land-in-place or return to launch (RTL) when their battery becomes low or a malfunction is detected. In the case of a low battery, the system may initially raise a low-battery alert in the UI, and eventually initiates the RTL command. A human responder may modify the UAV's permissions and prohibit the UAV from transitioning to RTL if the UAV is conducting a critical task. As an example, the use of floating drones for man-overboard scenarios may be controlled not to RTL. If a UAV found a victim, and no other UAV or human rescue unit were in the vicinity, the RTL feature may be deactivated automatically. This meant that when batteries lost power, the UAV would land in the water and serve as a search beacon. However, for many reasons, a human may wish to override the default deactivation of the RTL, thereby reactivating the UAV's RTL autonomy.

Agents within a human-on-the-loop (HotL) system may therefore be empowered to execute tasks independently with humans serving in a purely supervisory role. However, as described herein, humans and agents may continually share information in order to maintain bidirectional situational awareness and to work collaboratively towards achieving mission goals. Agents may report on their status (e.g., remaining battery levels, GPS coordinates, and altitude), and they may explain their current plans, actions, and autonomous decisions whenever requested by humans. Humans may directly intervene in the agents' behavior by providing additional information about the environment, and agents may then leverage this information to make more informed decisions. Humans may also respond to direct requests for feedback—for example, to confirm a victim sighting as previously discussed. They may also provide direct commands (e.g., RTL or stop tracking), or may explicitly modify an agent's permissions in order to enhance or constrain the agent's autonomous behavior. These types of interactions are depicted in FIG. 3.

An important way in which users and UAVs may interact is that a human may choose to raise or lower autonomy levels of the agent/drone. Autonomy levels, which may be defined as the extent of an agent's independence while acting autonomously in the environment, may be expressed through role assignments or through specific permissions within a role. For example, a UAV that is permitted to track a victim without first obtaining human confirmation has a higher autonomy level than one which needs explicit human confirmation before tracking. Humans tend to establish autonomy levels based on their trust in the agent's capabilities. For example, a UAV exhibiting high degrees of accuracy in the way it classifies an object increases human trust, and as a result, the human might grant the UAV additional permissions. On the other hand, the human operator might revoke permissions, thereby lowing autonomy levels, if the UAV were operating in weather conditions for which the computer vision model had not been appropriately trained and for which accuracy was expected to be lower than normal.

Figure 13:
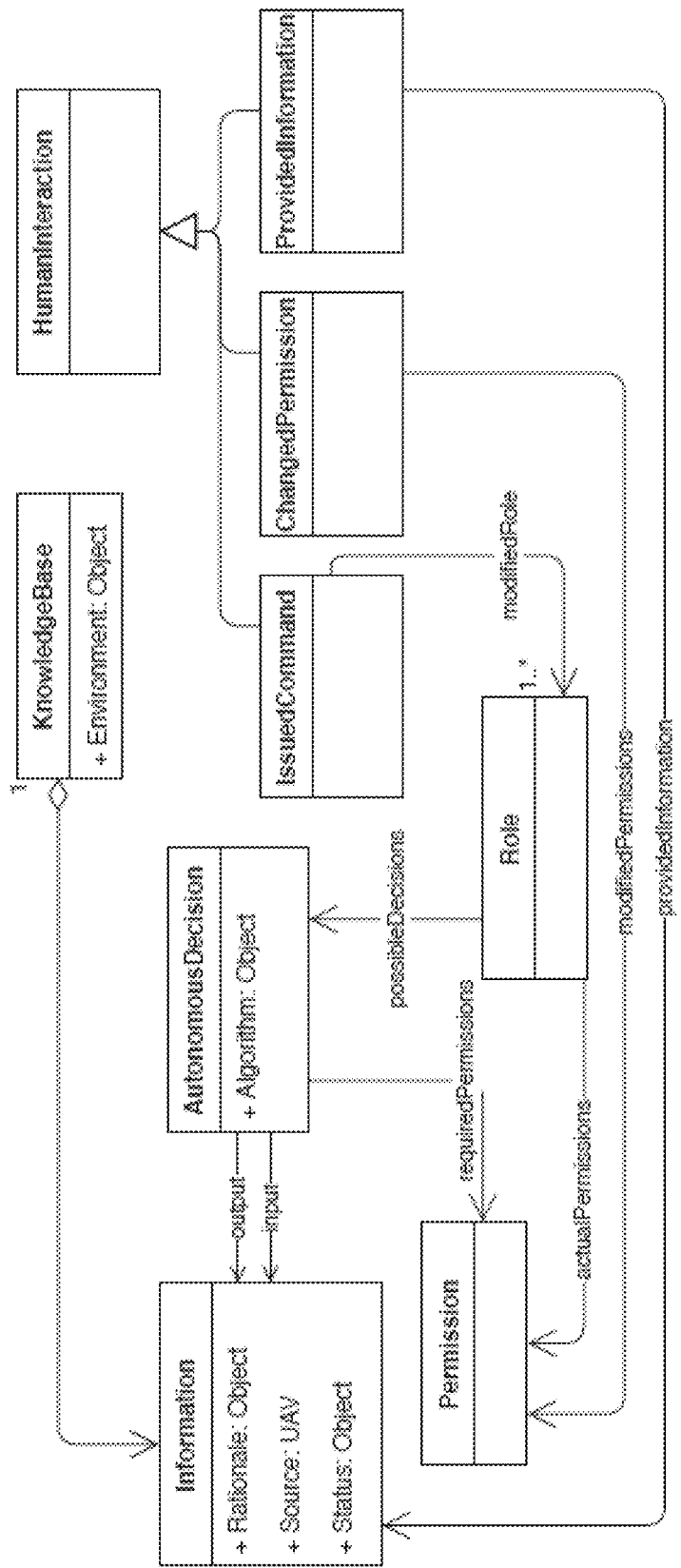
FIGS. 13-15 are example state diagrams for multi-drone missions according to various examples.

A model depicting how autonomy levels may be raised and lowered is shown in FIG. 13. The model includes various elements. A Role defines the complex behaviors that agents perform autonomously. Complex behaviors of a UAV may include takeoff, search, track, deliver, and RTL. An AutonomousDecision entity may use algorithms that leverage Information in the KnowledgeBase to make decisions. The complex behavior of a Role may be defined through one or several such decisions. For example, there are many cases in which a single agent may serve as a leader, responsible for coordinating behavior of its followers. During a leader election, an AutonomousDecision entity could select a new leader from the set of followers, thereby enabling the system to switch leaders without the need for human intervention. Upon making a decision, an AutonomousDecision entity may generate output Information including a rationale for its decision, which later may be used to generate a human-readable explanation.

Entities of type Permission may be used by Autonomous-Decisions to decide if the agents are allowed to make a specific decision. For example, an AutonomousDecision entity may check whether a human responder has allowed the system to automatically select a replacement if needed during a victim tracking activity. Roles come with a set of permissions which may be modified at run-time. A KnowledgeBase entity may contain current environmental information as well as information about the state of a single agent or multiple agents. An AutonomousDecision entity may use the Information stored in the KnowledgeBase in decision making. A human may use the information in the KnowledgeBase entity to gain situational awareness of the mission. Entities of type HumanInteraction may allow humans to intervene in the autonomy of the agents or to share their explicit knowledge of the environment. The three entity types ProvidedInformation, ChangedPermission, and IssuedCommand may provide different ways for humans to interact with the system. The ProvidedInformation entity adds Information to the KnowledgeBase of the system to maintain the consistent knowledge among multiple agents. Humans may use interventions of type ChangedPermission to raise or lower the autonomy of an agent, or agents, based on their trust in the ability of the agents to make correct decisions within the current environment. Finally, an IssuedCommand entity may allow humans to gain control over the autonomous behavior of the agents. For example, if a UAV loses communication with other UAVs in the mission and fails to deliver the flotation device when it is needed, a human may send a direct command that sets the current Role of the UAV to deliver flotation device. Neither humans nor agents are represented explicitly in the model of FIG. 13. The underlying implicit assumption may be that roles are assigned to agents and that humans and agents have access to one or several instances of KnowledgeBase. The reason for leaving these aspects implicit are that the domain of our model is human multi-UAV interaction and it may not be relevant to the metamodel to specify which concrete UAV has assumed each specific role.

Figure 14:
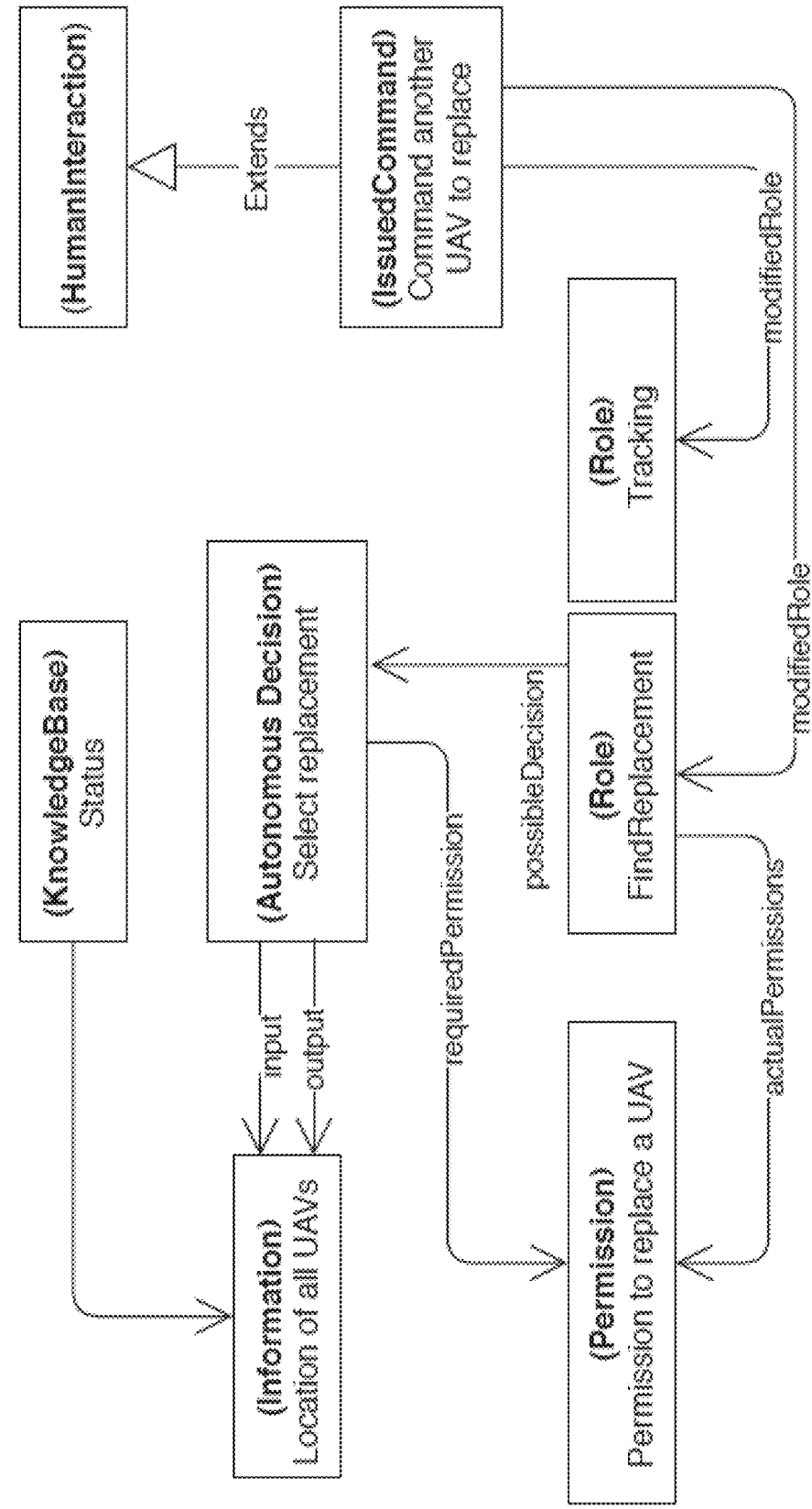

FIG. 14 depicts an example model of human intervention in the automatic selection of a UAV to replace another UAV. A human operator issues commands to modify the role of a UAV, thereby overriding autonomous decision of the system. An example of autonomous behavior may occur when the battery level of a UAV performing a critical task (e.g., tracking) falls below a predefined level. By default, the UAV may automatically RTL; however, it may first request a replacement from other UAVs in the mission as depicted in FIG. 14. Therefore, other UAVs in the mission may autonomously and collaboratively select a replacement for the tracking task.

Figure 15:
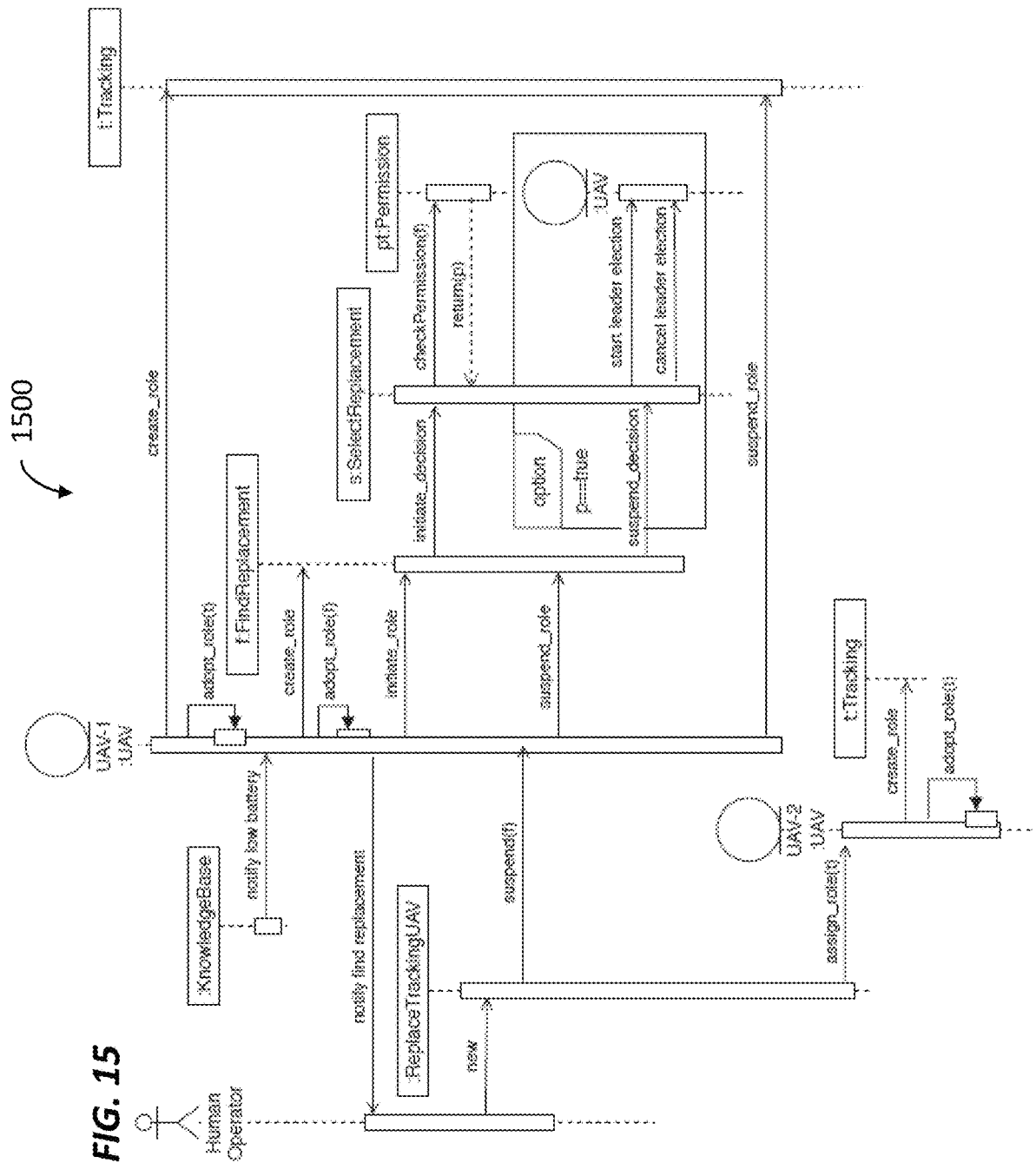

FIG. 15 further depicts a model of the human multi-UAV interaction specifically showing each component's role in a sequence of events when the human operator intervenes to override an autonomous decision. UAV-1 begins the process of selecting a replacement. However, the human operator overrides the decision by assigning a tracking role to UAV-2 and at the same time suspending UAV-1's search for a replacement.

Figure 16:
FIG. 16 is a user interface for a user tracking drones during an emergency response mission, according to various examples.
Figure 17:
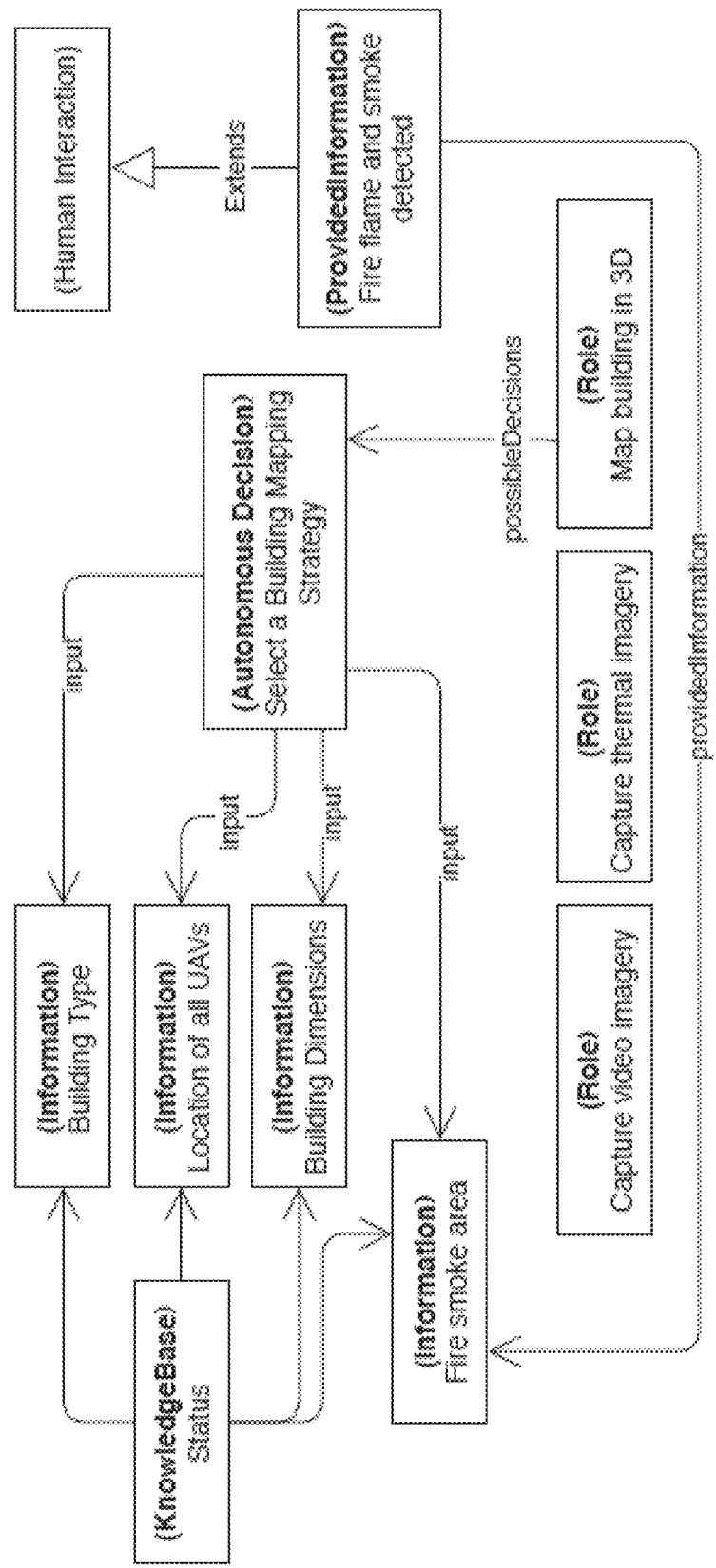
FIGS. 17 and 18 are example state diagrams for multi-drone missions according to various examples.
Figure 18:
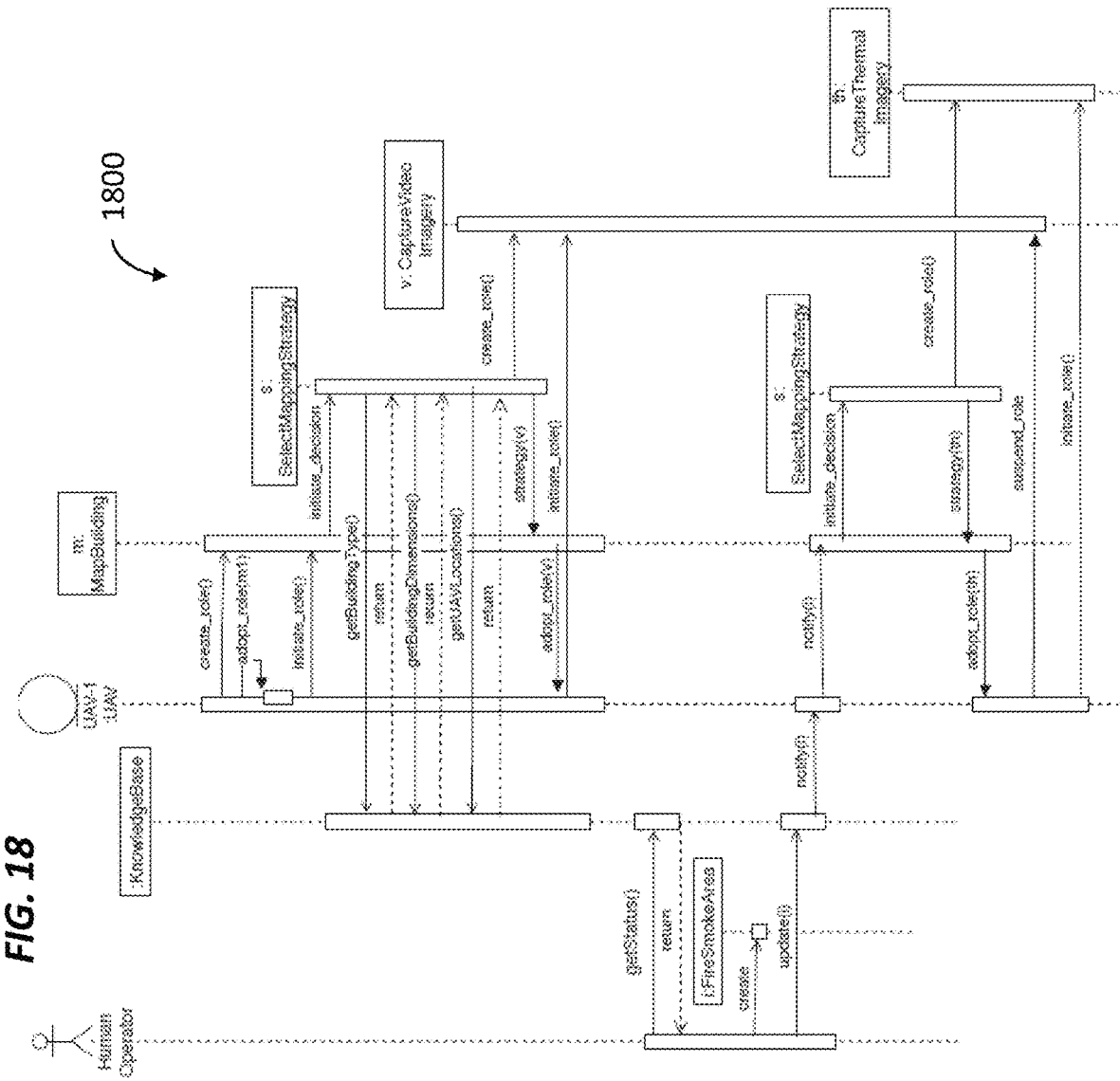

In an example different to a river rescue, FIG. 16 shows an example interface for a structural fire emergency response scenario. Drones may be useful in such a scenario to they create thermal maps of the building—focusing especially on detecting hotspots on roofs as many firefighters have been injured when a roof has collapsed without warning due to an undetected internal fire. UAVs may also be configured to mark hotspots with lasers so that firefighters on the roof may visually see the hotspots. Second, UAVs may be used to search for victims through windows and smoke using thermal cameras. At the start of the mission, the UAVs may collaboratively create a plan for surveying the building. For example, depending upon the size and layout of the building, weather conditions, and the number of available UAVs, they may work independently on different parts (sides, roof) of the building, they may prioritize specific areas, fly around the building in either direction, or even work together on a single section at distinct altitudes. The UAVs may therefore devise a specific mapping plan; however, firefighters may observe smoke coming from a different area of the building, update the knowledge base, and this leads to the UAVs redesigning their strategy. In this example, the firefighters may not issue a direct command, but instead provide additional information and allow the UAVs to autonomously adapt their plans. In this example, one of the UAVs assumes a new role of using thermal imagery to search for victims through windows in the area at which smoke has been detected. FIGS. 17 and 18 show figures similar to FIGS. 14 and 15, but for this fire example instead of a water rescue scenario. In particular, FIG. 17 shows a model depicting entities involved in the human-UAV interaction, while FIG. 18 shows a sequence diagram for multiple UAVs to collaborate to create a 3D model of the building. When the human operator shares information about smoke observed at one end of the building. UAV-1 starts capturing thermal images to search for victims through the smoke.

Figure 19:
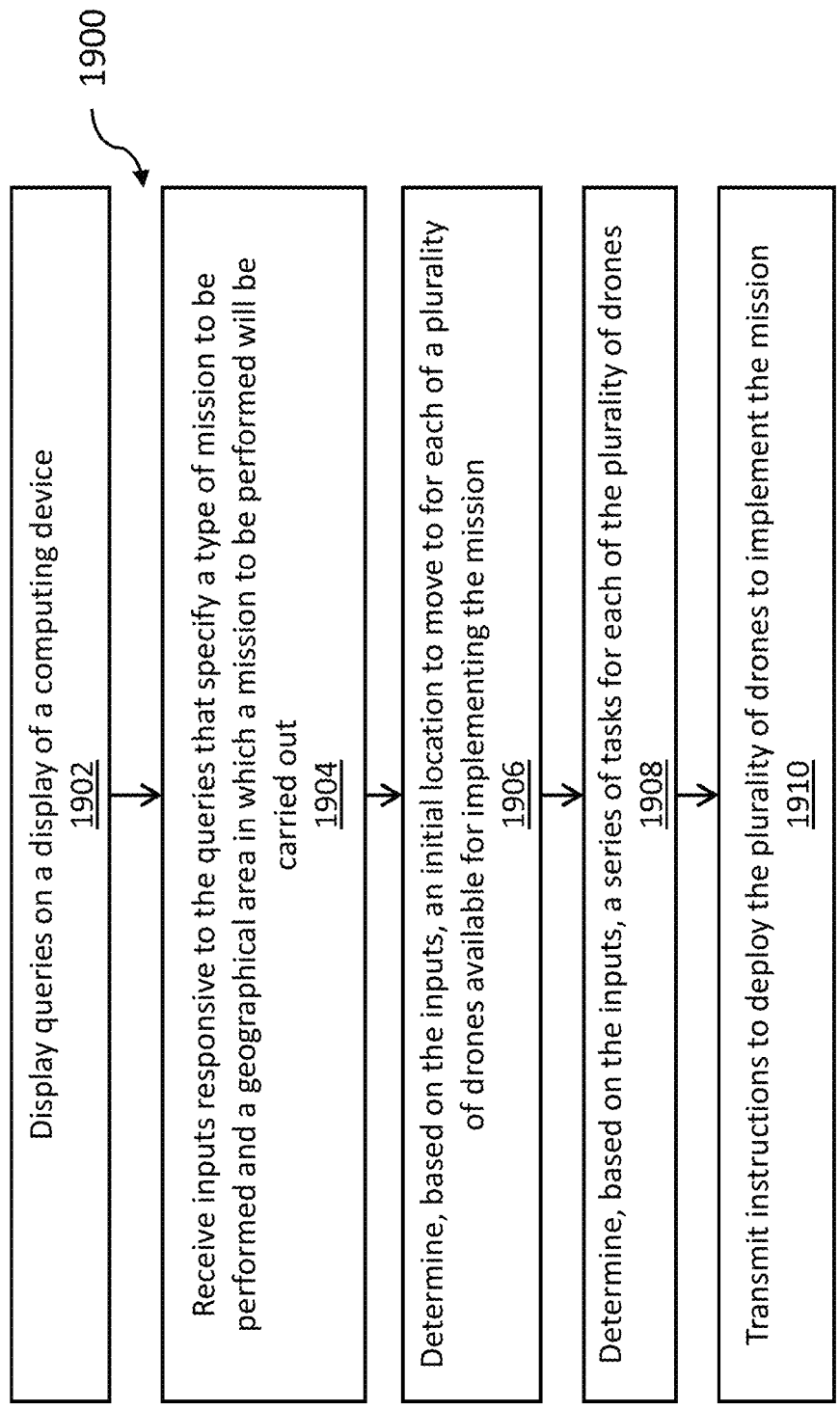
FIG. 19 is a flowchart illustrating an example method of configuring a mission according to various examples.
Figure 20:
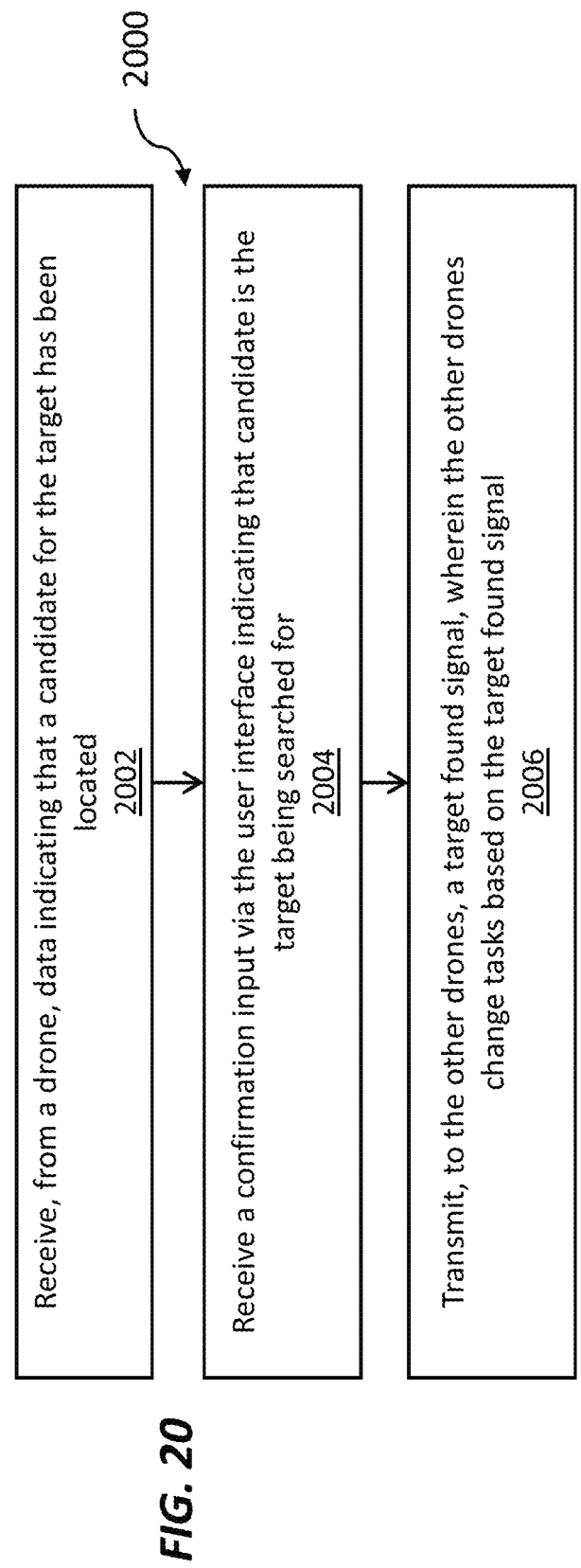
FIG. 20 is a flowchart illustrating an example method of confirming a target location according to various examples.
Figure 21:
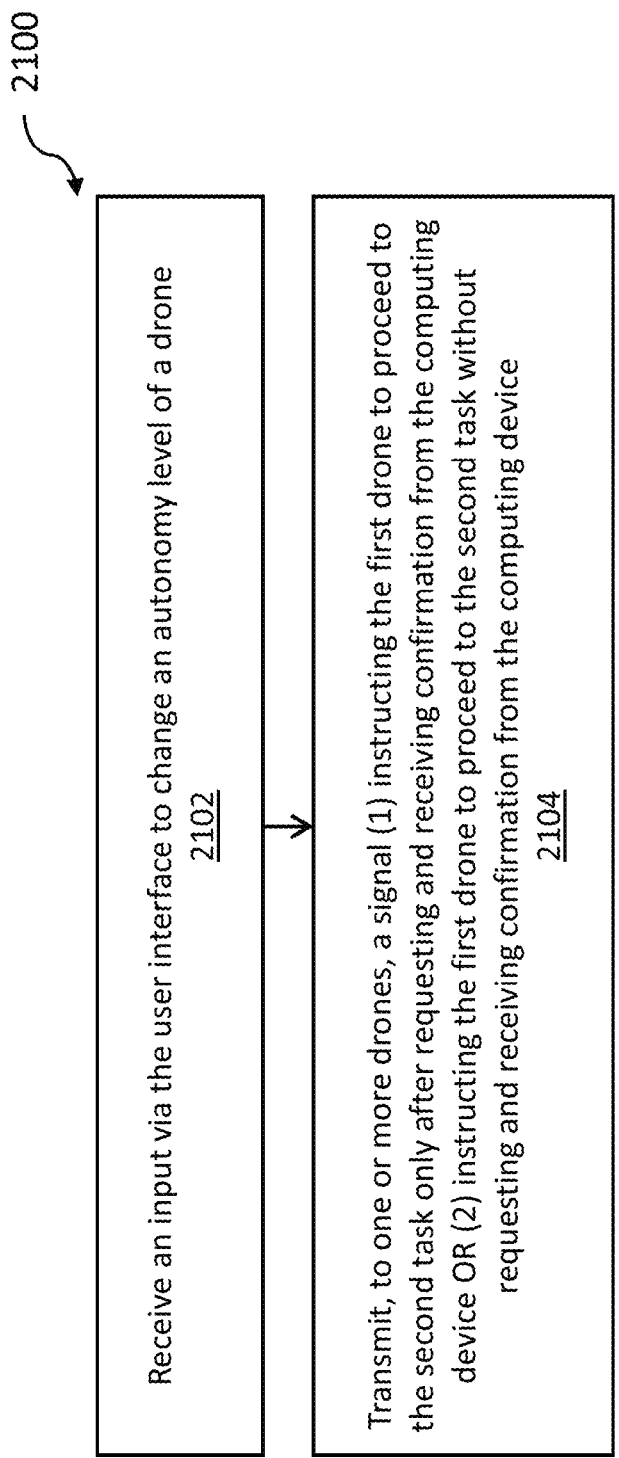
FIG. 21 is a flowchart illustrating an example method of changing a drone autonomy level according to various examples.

FIGS. 19-21 depict example methods 1900, 2000, and 2100, respectively, for implementing multi-drone systems described herein. In the method 1900, queries for configuring a mission are displayed on a UI at 1902, inputs to those queries are received at 1904, and initial locations for the drones to move to or search areas are determined for the drones that are available for a mission at 1906. At 1908, a series of tasks is also assigned to each drone, which may assigned to each drone to complete in a certain order or based on certain conditions as described herein. At 1910, the instructions to deploy the drones to implement the mission are transmitted to the drones.

In the method 2000, data indicating that a candidate for a target has been located at 2002 (e.g., a rescue victim or other item or person of interest depending on the mission). At 2004, confirmation is received (e.g., through a user input via a UI) that the candidate is indeed the target being searched for. At 2006, a target found signal is transmitted to the other drones, so that the other drones may act accordingly (e.g., switch or change tasks to RTL, assist in capturing additional images of the target, etc.).

In the method 2100, an input is received via a user interface to change an autonomy level of a drone at 2102. In response, at 2104, a signal is transmitted to one or more drones that (1) instructs the first drone to proceed to the second task only after requesting and receiving confirmation from the computing device OR (2) instructs the first drone to proceed to the second task without requesting and receiving confirmation from the computing device. In other words, as described herein, a drones autonomy may be adjusted up or down by a user as desired to cause it to autonomously perform or switch tasks or not do so.

Figure 22:
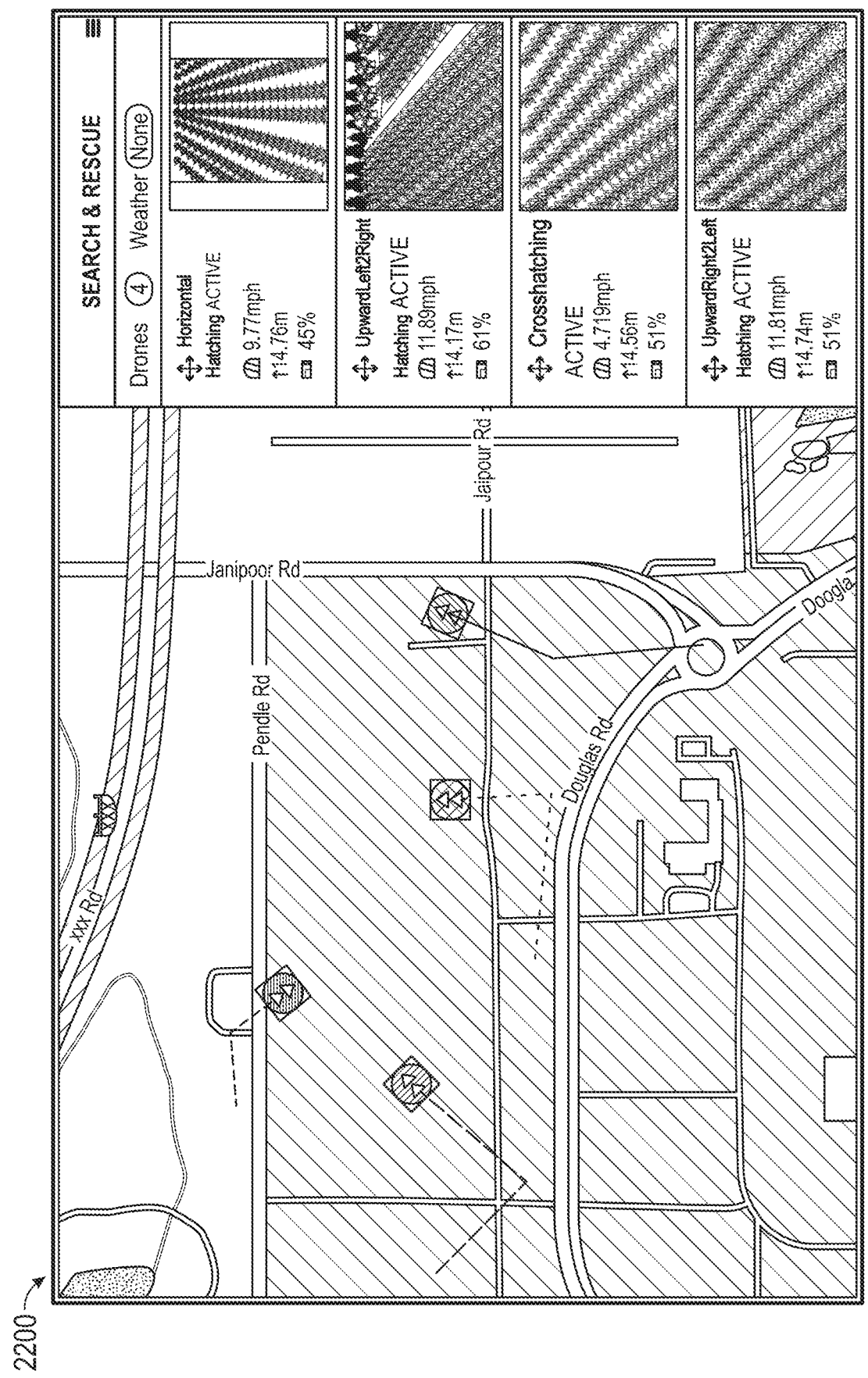
FIGS. 22-26 show interfaces associated with user interface for a user tracking drones during an emergency response mission, according to various examples.
Figure 23:
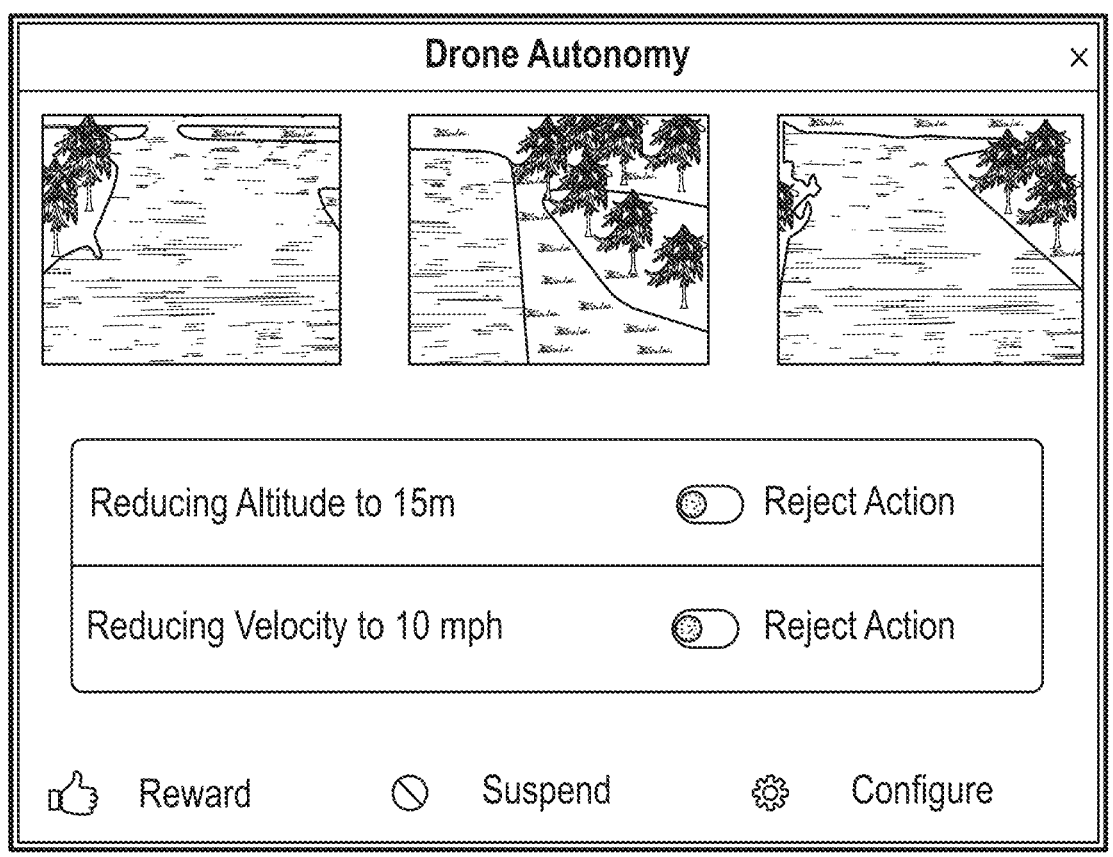

FIG. 22 shows another example UI 2200 that includes the tracking of 4 drones. Each of the drone icons includes a directional arrow showing the direction of travel and a tail showing where the drone has traveled. FIG. 23 shows an example UI 2300 where a user may interact with the system to affect the autonomy of a drone. In the example, the drone or another source of information may have detected poor environmental conditions such as poor visibility. The drone may be programmed to take certain action, so the UI 2300 may pop up on a UI, instructing the user of the action the drone plans to take and giving the user a chance to reject the planned actions. The actions may take place after a predetermined amount of time if the user does not intervene, for example.

Figure 24:
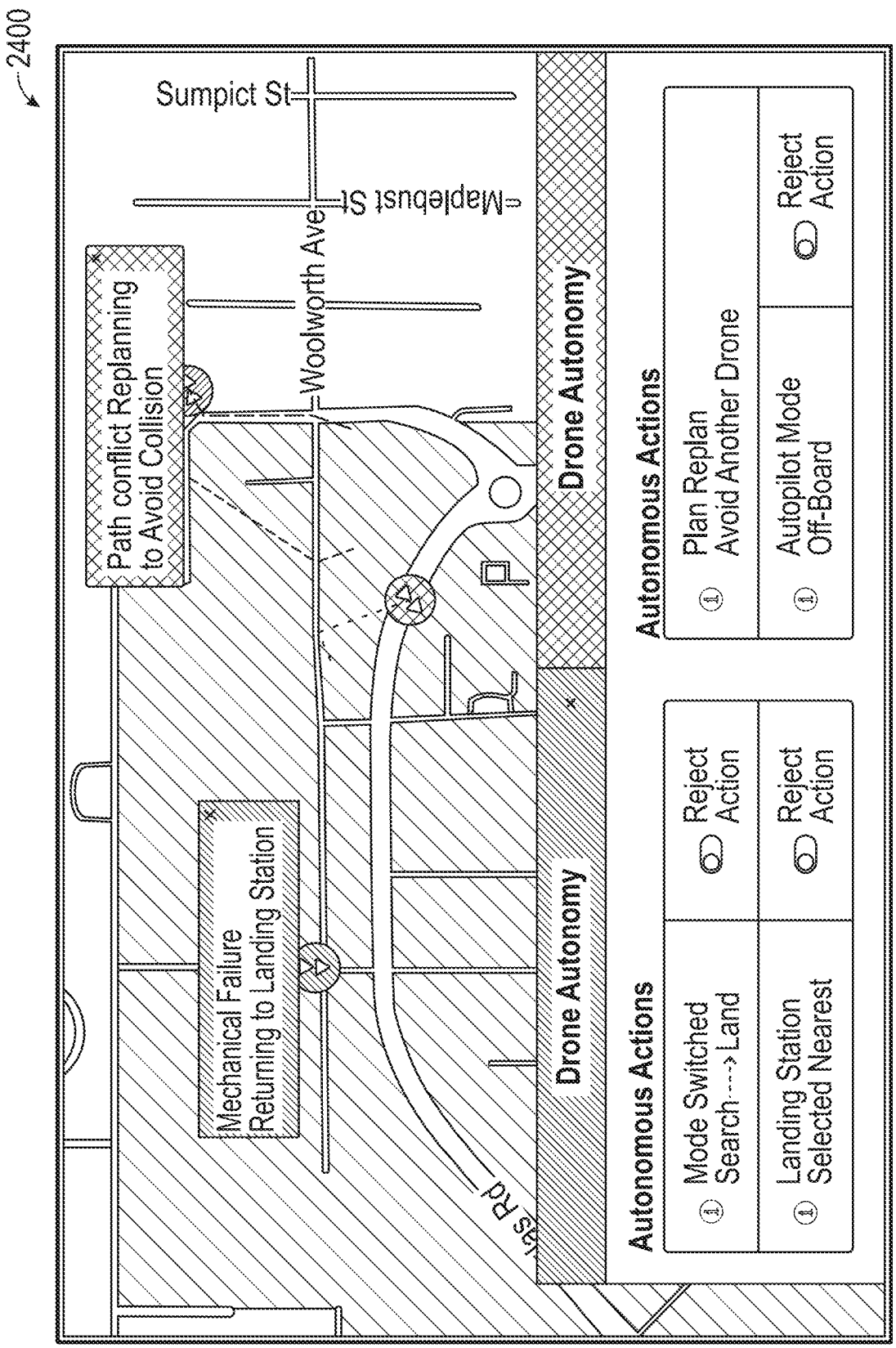

FIG. 24 shows further examples of what such pop ups for changing of tasks and opportunities for a user to intervene may look like. For example, on the left of UI 2400, a drone is switching to land mode and selecting a station to land at, which can be rejected by the user. On the right, two drones may be in line for a conflicting flight path, and so one drone is replanning its path, which may be rejected by the user.

Figure 25:
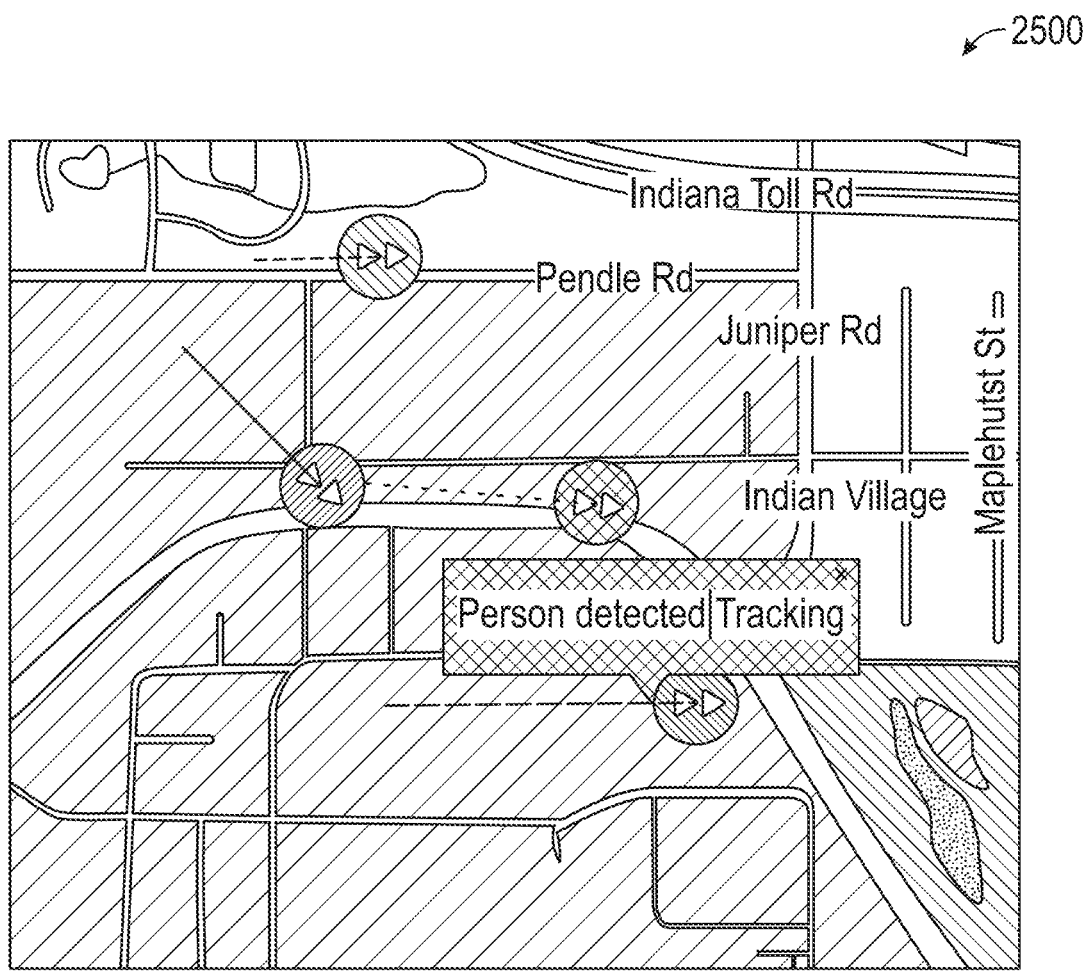

FIG. 25 shows another example UI 2500 where an alert or task is shown proximate to the drone icon to which it is associated. This may be done for certain tasks such as when a person is detected and/or being tracked. In this way, the user may be able to easily see and prioritize their attention toward important tasks.

Figure 26:
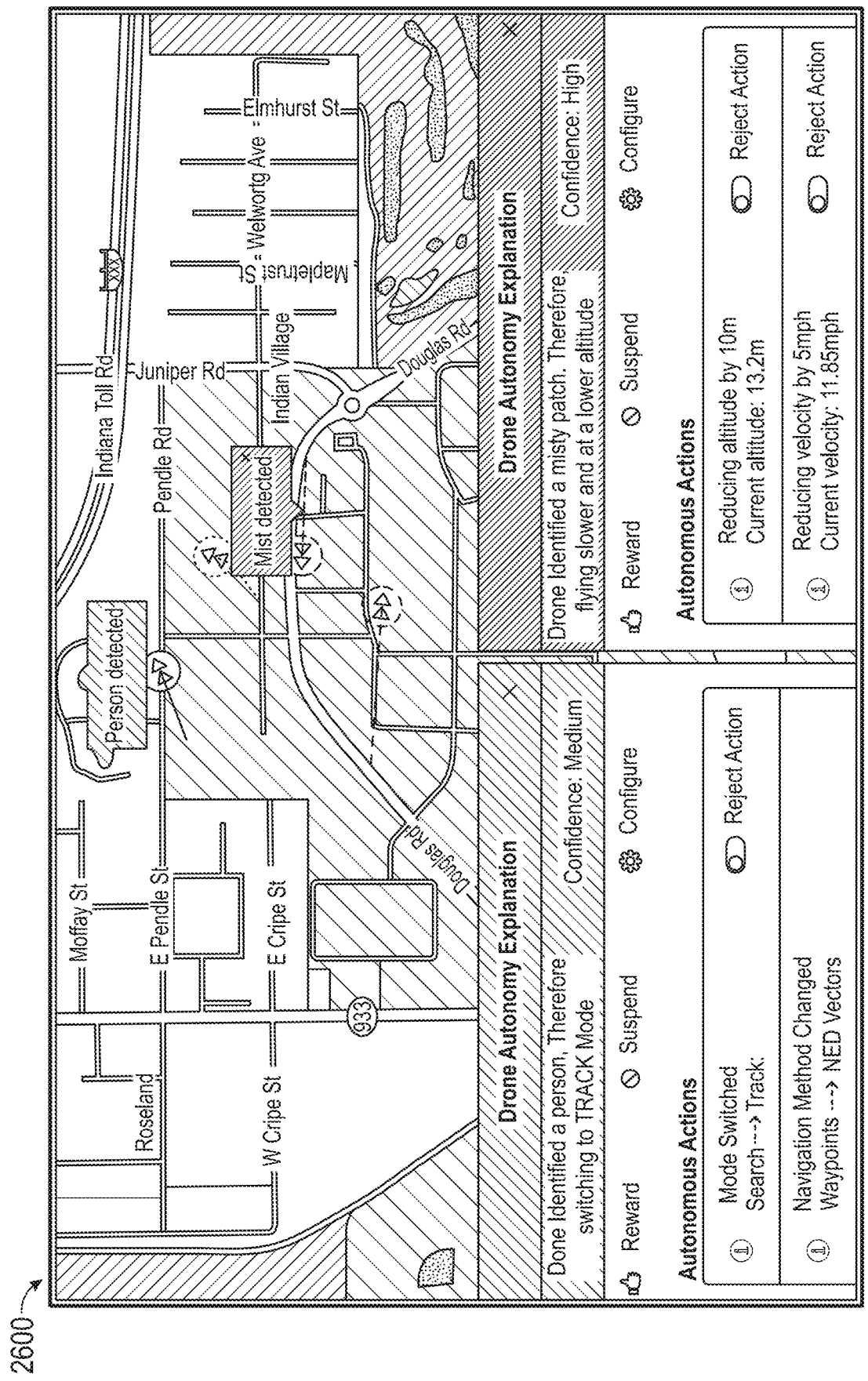

FIG. 26 shows another example UI 2600 where multiple drones have alerts displayed associated with their respective drone positions similar to the UI 2500. Similar to the UI 2400, each alert is also associated with a pop up in which the alert and/or associated change in behavior/task is explained and a user is given the opportunity to reject the behavior.

Figure 27:
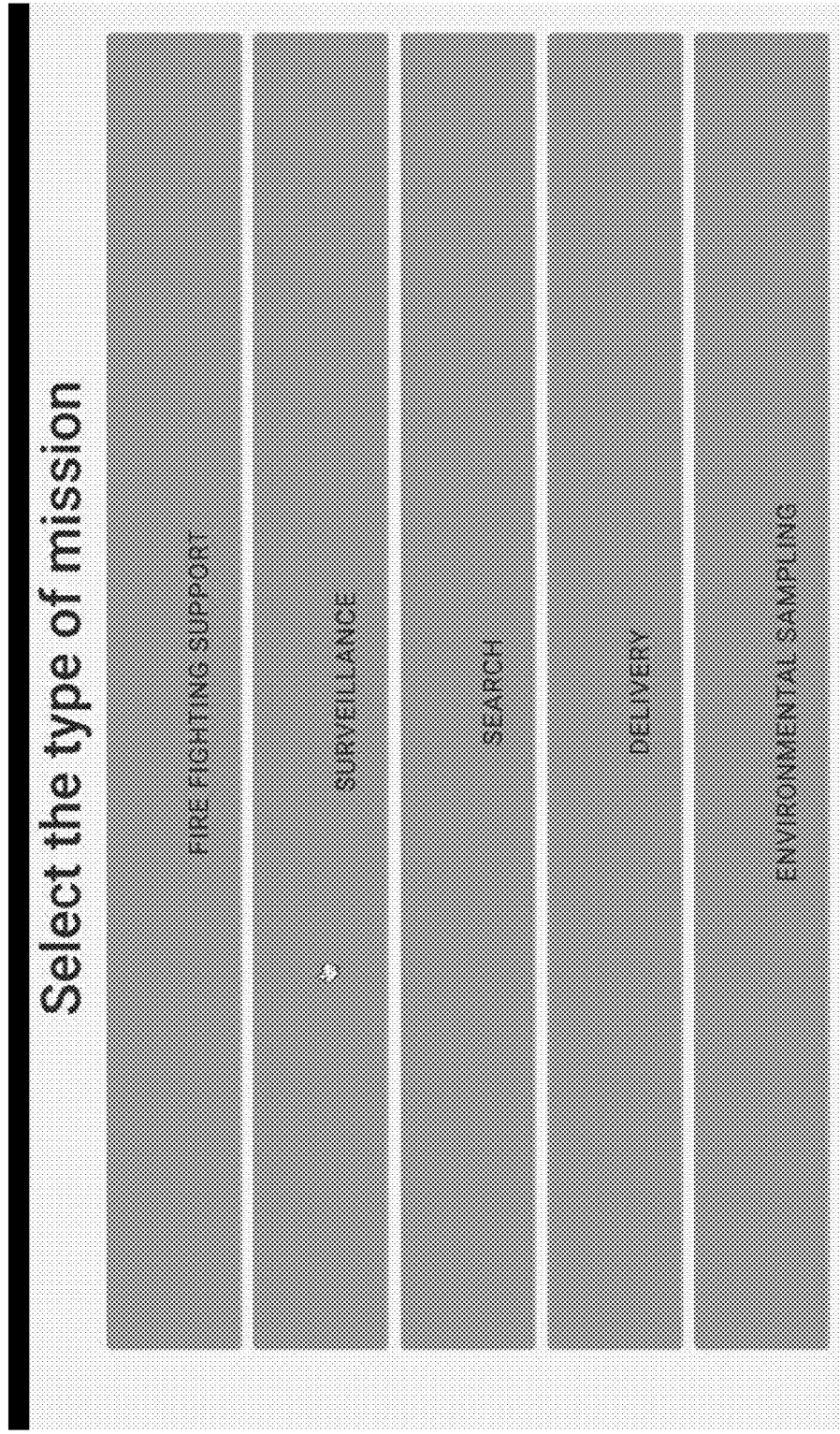
FIGS. 27-31 show interfaces associated with a wizard for configuring a mission, according to various examples.
Figure 28:
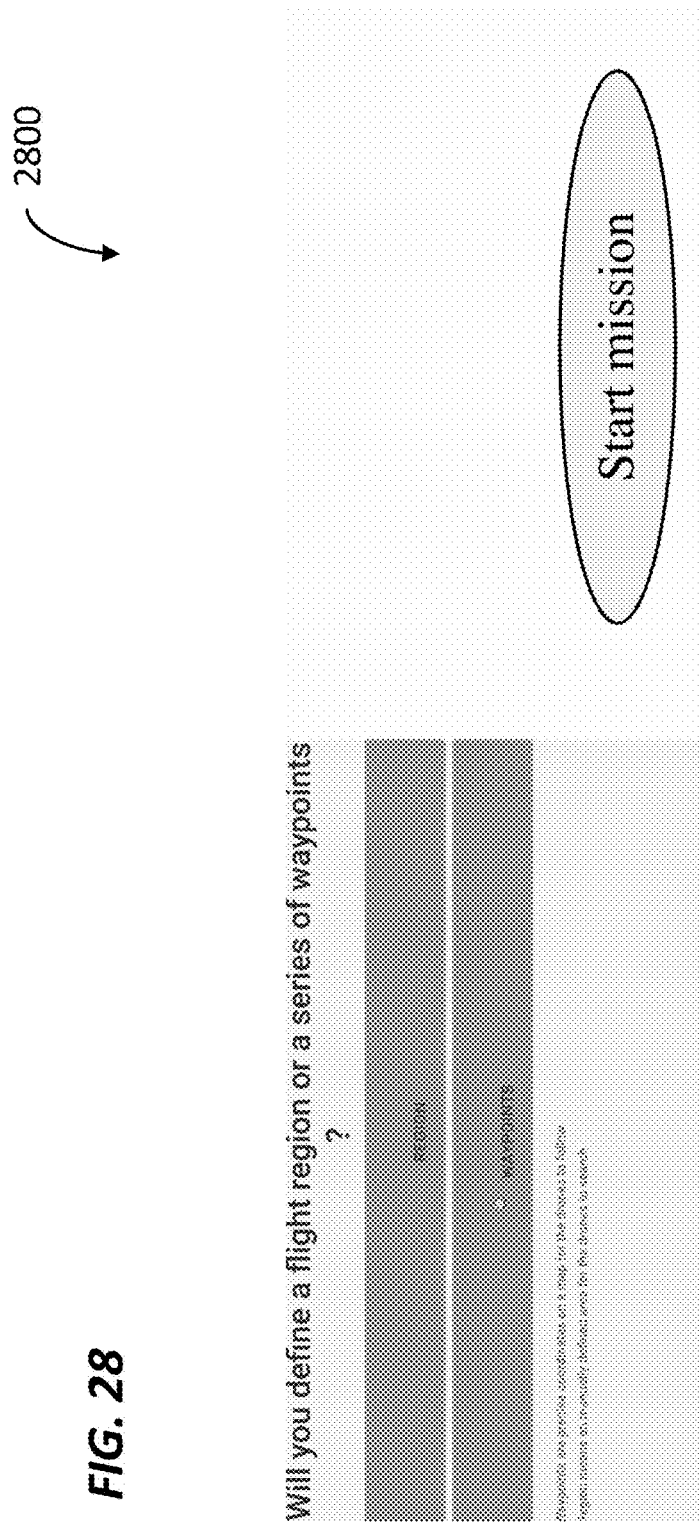
Figure 29:
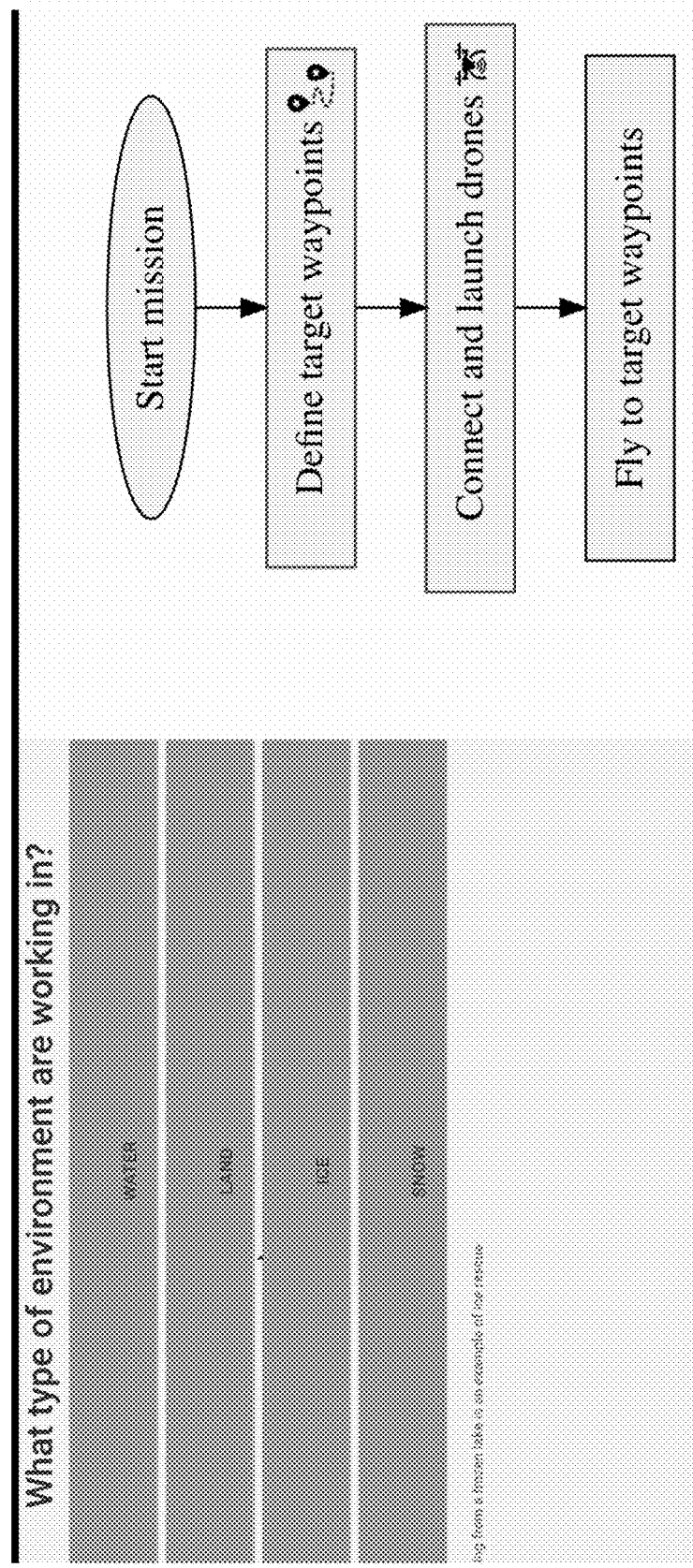

FIGS. 27-31 show interfaces associated with a wizard for configuring a mission as described herein. FIG. 27 includes a UI 2700 for selecting the initial type of mission. FIG. 28 includes a UI 2800 displayed after a fire fighting support mission was selected in UI 2700. FIG. 29 includes a UI 2900 displayed after a waypoints option was selected in UI 2800.

Figure 30:
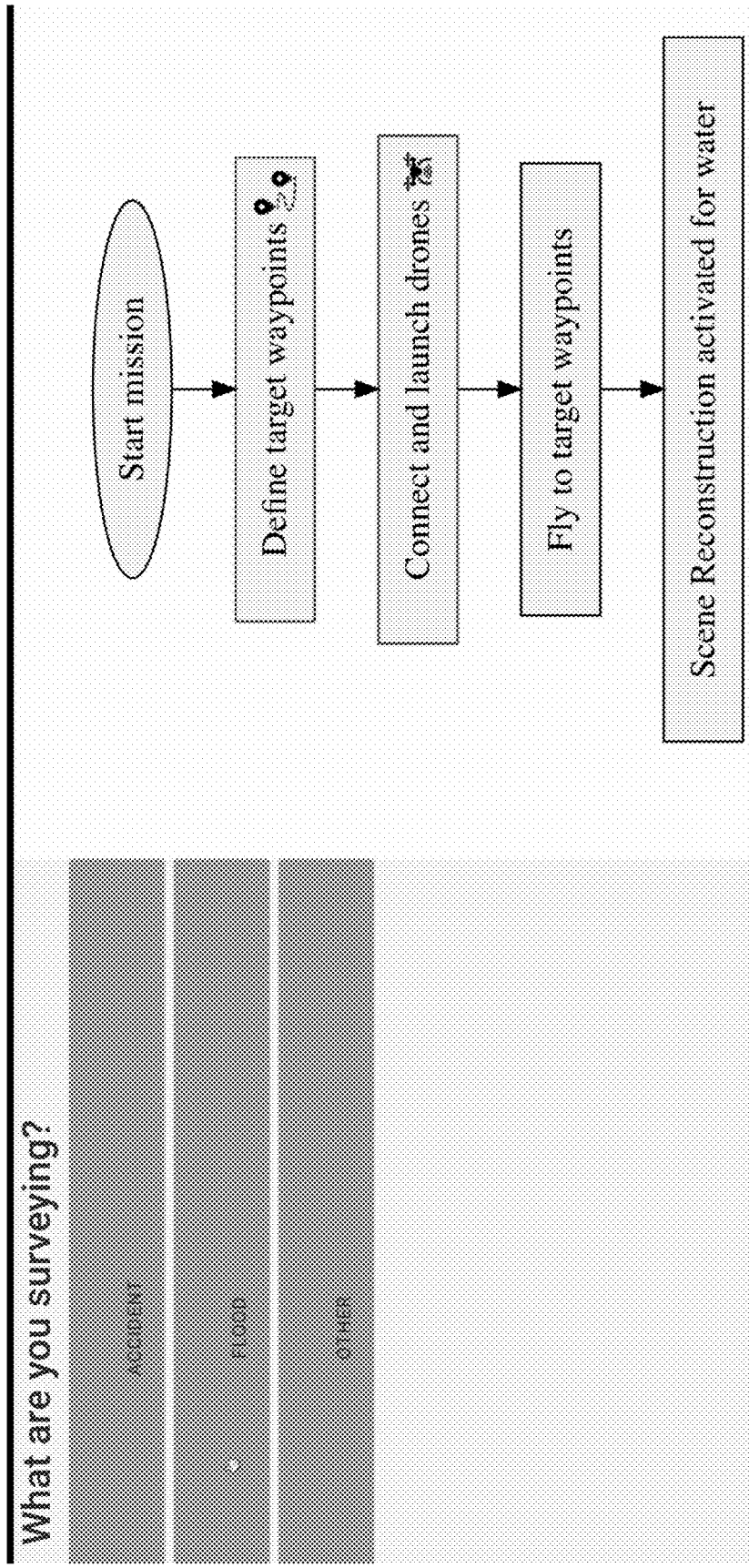
Figure 31:
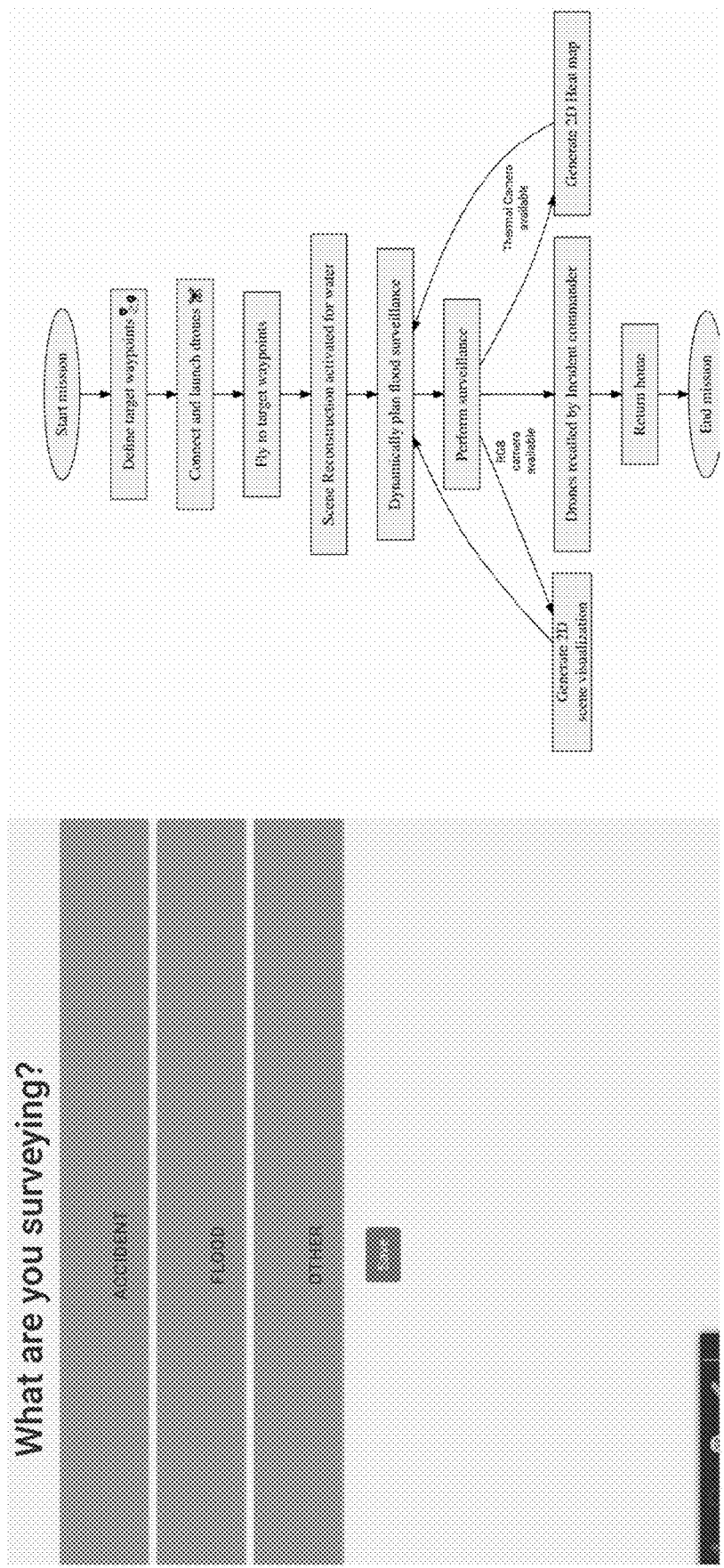

FIG. 30 includes a UI 3000 displayed after a water option was selected in UI 2900. FIG. 31 includes a UI 3100 displayed after a flood option was selected in UI 3000.

Figure 32:
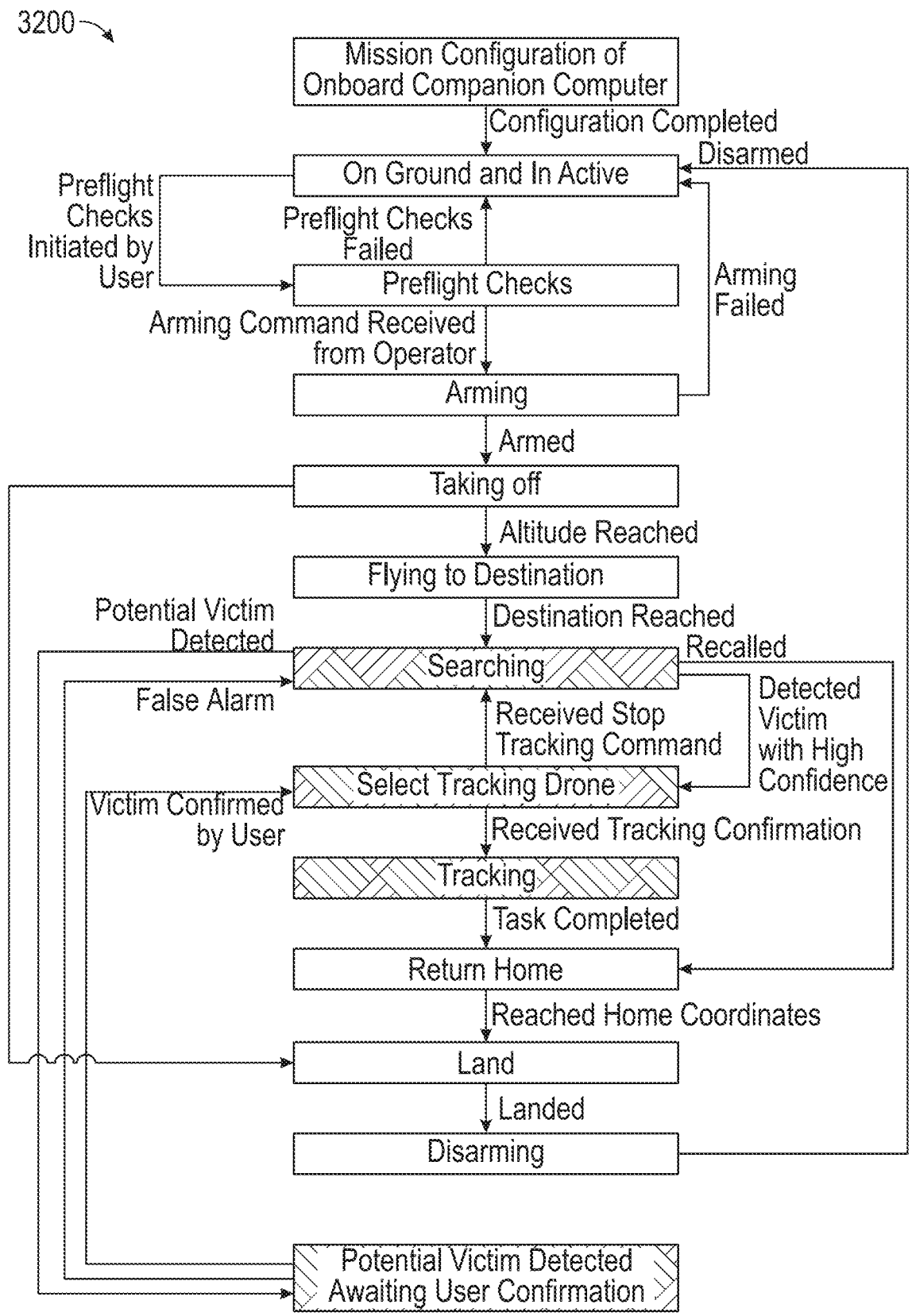
FIGS. 32 and 33 show examples of states and tasks that individual drones may perform as they carry out a mission, according to various examples.
Figure 33:
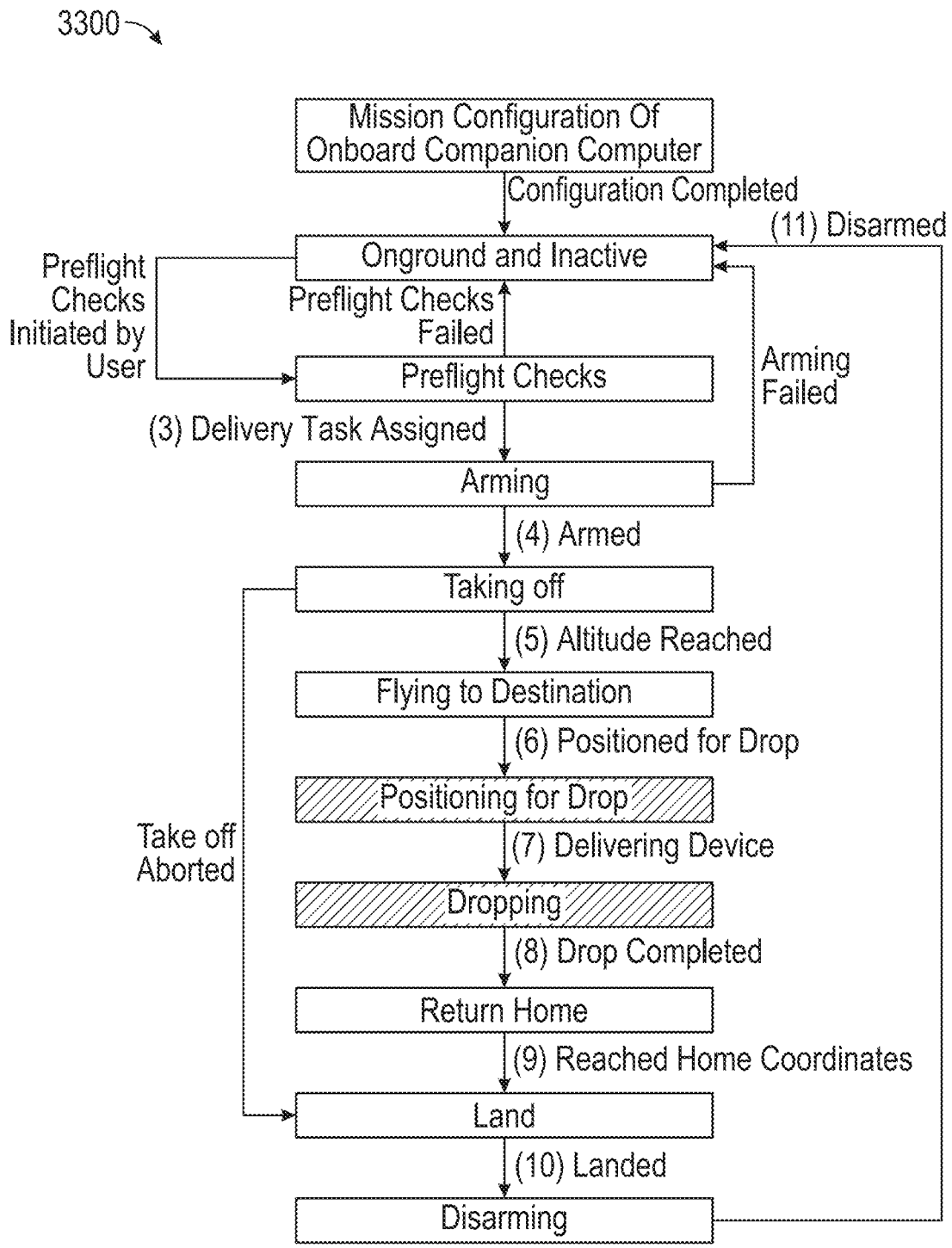
Figure 34:
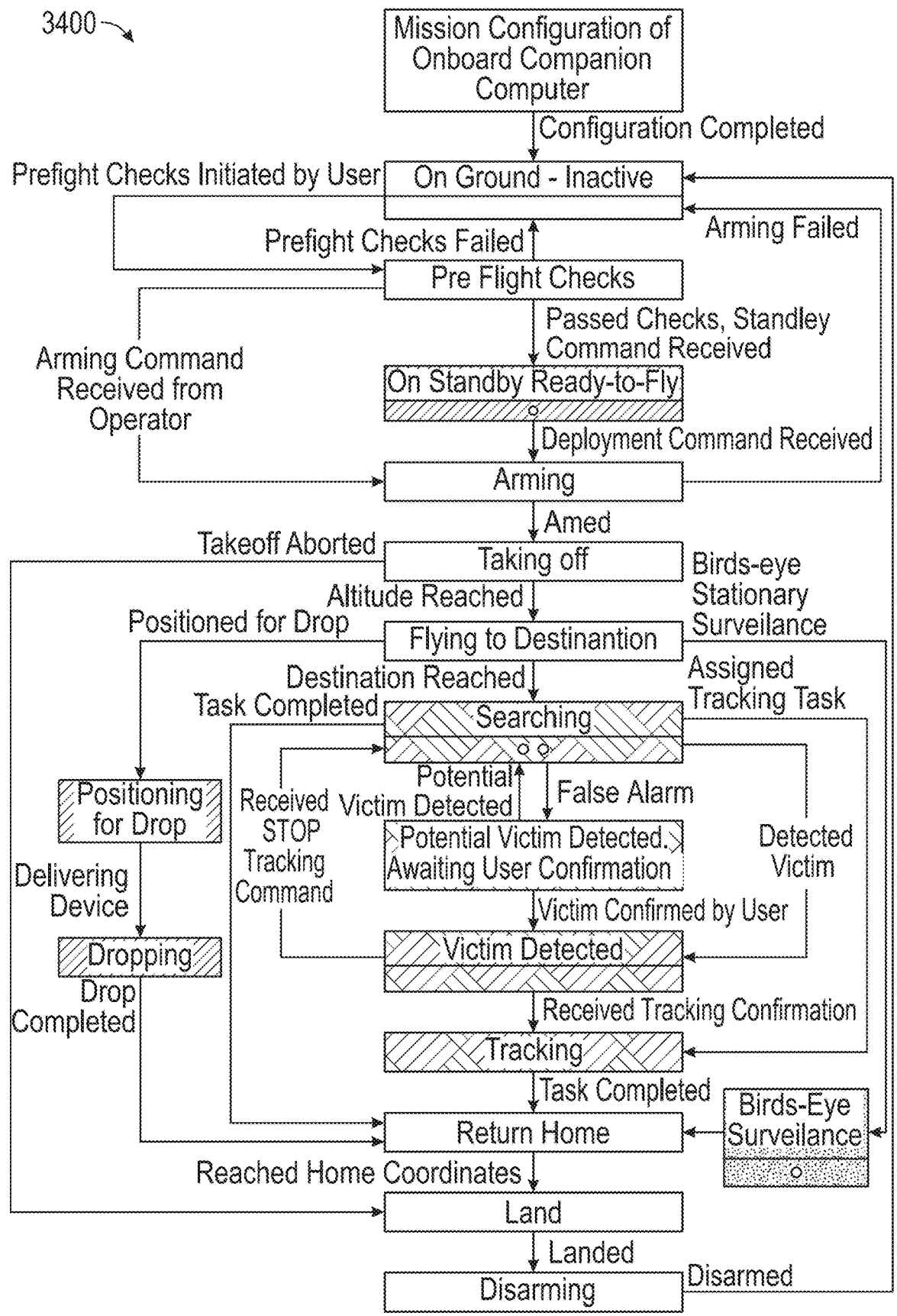
FIG. 34 shows an example combined states and tasks for an overall mission, according to various examples.

FIGS. 32 and 33 show additional examples of states and tasks that individual drones may perform as they carry out a mission. Based on what they encounter, what tasks they complete, what interactions a user makes, the drones may take different paths through different states. FIG. 32 shows an example of a state transition model for a search and track drone, and FIG. 33 shows an example of a state transition model for a flotation delivery drone. These state models may be adjusted based on how a user configures a mission or intervenes in a mission (e.g., by changing a drones autonomy or assigned tasks) during a mission or prior to a mission. FIG. 34 shows an example of a combined state diagram for a whole mission rather than specific drones. Tables 2 and 3 below further show states and transitions that are possible for drones as described herein.

TABLE 2

States:

| States | Display Name | Implemented |
|---|---|---|
| OnGroundAndInactive | OnGroundAndInactive | FALSE |
| MissionPreparation | UAV Configured for Mission | FALSE |
| Preflight | Preflight Checks | TRUE |
| Arming | Arming | TRUE |
| TakeOff | Taking Off | TRUE |
| FlytoDestination | Flying to Destination | FALSE |
| Hover | Hover | TRUE |
| Searching | Searching | FALSE |
| UserVictimCheck | User confirmation | FALSE |
| VictimDetected | Victim Detected | FALSE |
| Tracking | Tracking | FALSE |
| ReturnHome | ReturnHome | FALSE |
| Land | Landing | TRUE |
| Disarm | Disarming | TRUE |
| PositionForDrop | Positioning for Drop | FALSE |
| Dropping | Dropping | FALSE |

TABLE 3

Transitions:

| Transition From | Transition To | Condition Code | Condition Description |
|---|---|---|---|
| MissionPreparation | OnGroundAndInactive | MissionConfigured | Mission received from DR |
| OnGroundAndInactive | Preflight | PreflightChecksIntiated | Onboard mission configured |
| Preflight | OnGroundAndInactive | PreflightChecksFailed | Preflight checks failed |
| Preflight | Arming | PreflightChecksPassed | Arming command received |
| Preflight | OnStandBy | PreflightChecksPassed | Preflight checks passed, Standby command |
| OnStandBy | Arming | DeployCommand | Deployment command received |
| Arming | OnGroundAndInactive | ArmingFailed | Arming failed |
| Arming | TakeOff | DroneArmed | Drone armed |
| TakeOff | FlyToDestination | AltitudeReached | Takeoff target altitude reached |
| FlyToDestination | Searching | DestinationReached | Destination reached |
| FlyToDestination | PositionForDrop | DestinationReached | Destination reached |
| PositionForDrop | Dropping | Positioned | Successfully positioned for drop |
| Searching | VictimDetected | VictimDetected | Victim Detected |
| Searching | UserVictimCheck | PossibleVictimDetected | PossibleVictimDetected |
| UserVictimCheck | Searching | False Alarm | User denies sighting |
| UserVictimCheck | VictimDetected | VictimConfirmed | User confirms sighting |
| VictimDetected | Searching | ContinueSearch | DR Command to continue search |
| VictimDetected | Tracking | SelectedToTrack | DR Command to start tracking |
| Searching | Tracking | SelectedToTrack | DR Command to start tracking |
| Searching | ReturnHome | ReturnHomeCommand | DR Command to return home |

TABLE 3-continued

Transitions:

| Transition From | Transition To | Condition Code | Condition Description |
|---|---|---|---|
| Tracking | ReturnHome | ReturnHomeCommand | DR Command to return home |
| Dropping | ReturnHome | DropCompleted | Drop completed |
| ReturnHome | Land | HomeReached | Home coordinates reached |

Figure 35:
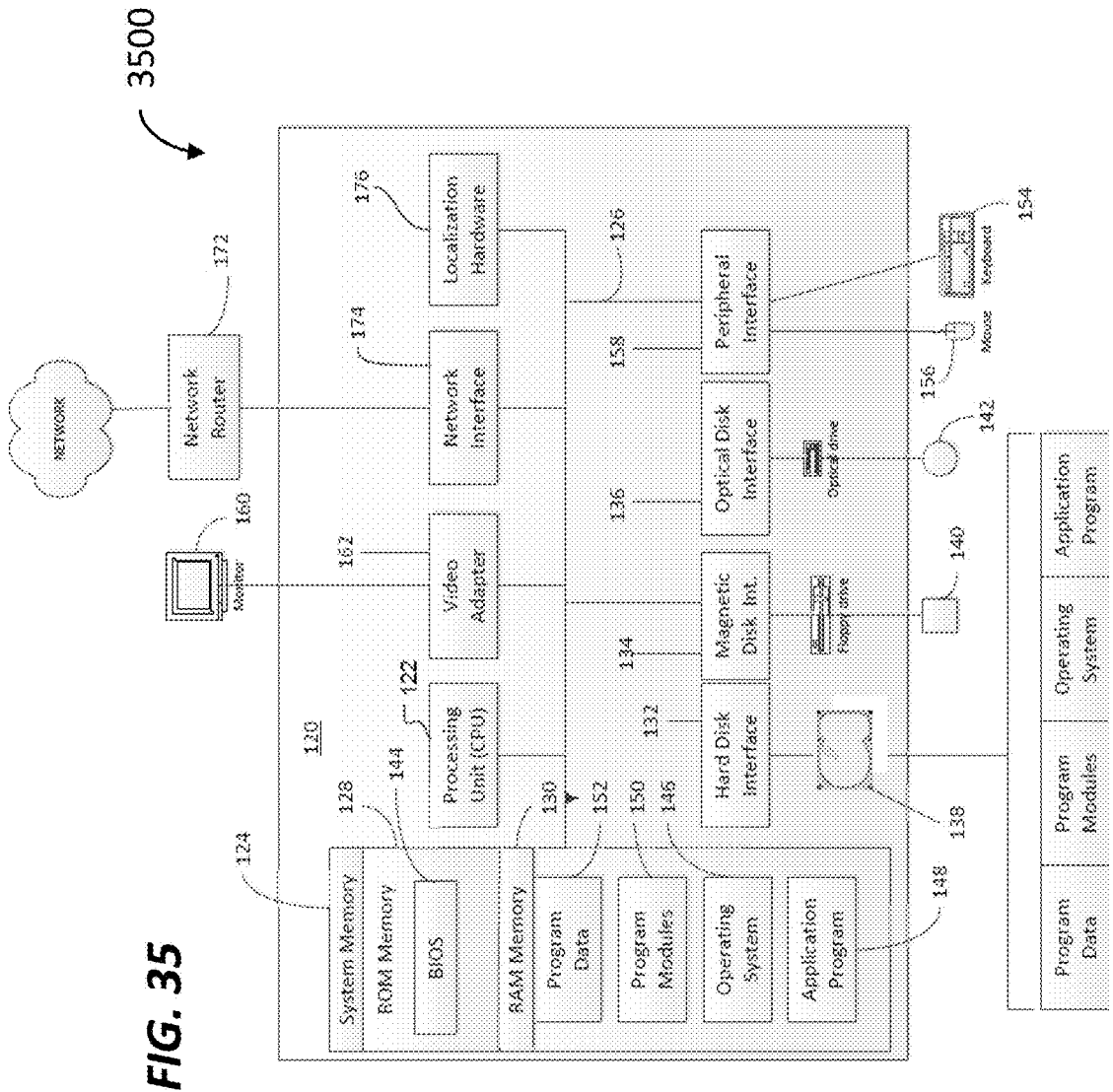
FIG. 35 is a diagrammatic view of an example computing environment, according to various examples.

FIG. 35 is a diagrammatic view of an illustrative computing system or device that includes a general purpose computing system environment 120, such as a desktop computer, laptop, smartphone, tablet, or any other such device having the ability to execute instructions, such as those stored within a non-transient, computer-readable medium. Furthermore, while disclosed and illustrated in the context of a single computing system 120, those of ordinary skill in the art will also appreciate that the various tasks disclosed hereinafter may be practiced in a distributed environment having multiple computing systems 120 linked via a local or wide-area network in which the executable instructions may be associated with and/or executed by one or more of multiple computing systems 120.

In its most basic configuration, computing system environment 120 typically includes at least one processing unit 122 and at least one memory 124, which may be linked via a bus 126. The processing unit 122 may be a real time or near real time processing unit (e.g., FPGA, GPU, etc.). Depending on the exact configuration and type of computing system environment, memory 124 may be volatile (such as RAM 130), non-volatile (such as ROM 128, flash memory, etc.) or some combination of the two. Computing system environment 120 may have additional features and/or functionality. For example, computing system environment 120 may also include additional storage (removable and/or non-removable) including, but not limited to, magnetic or optical disks, tape drives and/or flash drives. Such additional memory devices may be made accessible to the computing system environment 120 by means of, for example, a hard disk drive interface 132, a magnetic disk drive interface 134, and/or an optical disk drive interface 136. As will be understood, these devices, which would be linked to the system bus 126, respectively, allow for reading from and writing to a hard disk 138, reading from or writing to a removable magnetic disk 140, and/or for reading from or writing to a removable optical disk 142, such as a CD/DVD ROM or other optical media. The drive interfaces and their associated computer-readable media allow for the nonvolatile storage of computer readable instructions, data structures, program modules and other data for the computing system environment 120. Those of ordinary skill in the art will further appreciate that other types of computer readable media that can store data may be used for this same purpose. Examples of such media devices include, but are not limited to, magnetic cassettes, flash memory cards, digital videodisks, Bernoulli cartridges, random access memories, nano-drives, memory sticks, other read/write and/or read-only memories and/or any other method or technology for storage of information such as computer readable instructions, data structures, program modules or other data. Any such computer storage media may be part of computing system environment 120.

A number of program modules may be stored in one or more of the memory/media devices. For example, a basic input/output system (BIOS) 144, containing the basic routines that help to transfer information between elements within the computing system environment 120, such as during start-up, may be stored in ROM 128. Similarly, RAM 130, hard drive 138, and/or peripheral memory devices may be used to store computer executable instructions comprising an operating system 146, one or more applications programs 148 (such as a Web browser, mobile app, and/or other applications that execute the methods and processes of this disclosure), other program modules 150, and/or program data 152. Still further, computer-executable instructions may be downloaded to the computing environment 120 as needed, for example, via a network connection.

An end-user, e.g. a customer or the like, may enter commands and information into the computing system environment 120 through input devices such as a keyboard 154 and/or a pointing device 156. While not illustrated, other input devices may include a microphone, a joystick, a game pad, a scanner, etc. These and other input devices would typically be connected to the processing unit 122 by means of a peripheral interface 158 which, in turn, would be coupled to bus 126. Input devices may be directly or indirectly connected to processor 122 via interfaces such as, for example, a parallel port, game port, firewire, or a universal serial bus (USB). To view information from the computing system environment 120, a monitor 160 or other type of display device may also be connected to bus 26 via an interface, such as via video adapter 162. In addition to the monitor 160, the computing system environment 120 may also include other peripheral output devices, not shown, such as speakers and printers.

The computing system environment 120 may also utilize logical connections to one or more computing system environments. Communications between the computing system environment 120 and the remote computing system environment may be exchanged via a further processing device, such a network router 172, that is responsible for network routing. Communications with the network router 172 may be performed via a network interface component 174. Thus, within such a networked environment, e.g., the Internet, World Wide Web, LAN, or other like type of wired or wireless network, it will be appreciated that program modules depicted relative to the computing system environment 120, or portions thereof, may be stored in the memory storage device(s) of the computing system environment 120.

The computing system environment 120 may also include localization hardware 176 for determining a location of the computing system environment 120. In examples, the localization hardware 176 may include, for example only, a GPS antenna, an RFID chip or reader, a WiFi antenna, or other computing hardware that may be used to capture or transmit signals that may be used to determine the location of the computing system environment 120.

While this disclosure has disclosed certain examples, it will be understood that the claims are not intended to be limited to these examples except as explicitly recited in the claims. On the contrary, the present disclosure is intended to cover alternatives, modifications and equivalents, which may be included within the spirit and scope of the disclosure. Furthermore, in the detailed description of the present disclosure, numerous specific details are set forth in order to provide a thorough understanding of the disclosed examples. However, it will be obvious to one of ordinary skill in the art that systems and methods consistent with this disclosure may be practiced without these specific details. In other instances, well known methods, procedures, components, and circuits have not been disclosed in detail as not to unnecessarily obscure various aspects of the present disclosure.

Some portions of the detailed descriptions of this disclosure have been presented in terms of procedures, logic blocks, processing, and other symbolic representations of operations on data bits within a computer or digital system memory. These descriptions and representations are the means used by those of ordinary skill in the data processing arts to most effectively convey the substance of their work to others of ordinary skill in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic data capable of being stored, transferred, combined, compared, and otherwise manipulated in a computer system or similar electronic computing device. For reasons of convenience, and with reference to common usage, such data is referred to as bits, values, elements, symbols, characters, terms, numbers, or the like, with reference to various examples of the present invention.

It should be borne in mind, however, that these terms are to be interpreted as referencing physical manipulations and quantities and are merely convenient labels that should be interpreted further in view of terms commonly used in the art. Unless specifically stated otherwise, as apparent from the discussion herein, it is understood that throughout discussions of the present example, discussions utilizing terms such as "determining" or "outputting" or "transmitting" or "recording" or "locating" or "storing" or "displaying" or "receiving" or "recognizing" or "utilizing" or "generating" or "providing" or "accessing" or "checking" or "notifying" or "delivering" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers, or other such information storage, transmission, or display devices as disclosed herein or otherwise understood to one of ordinary skill in the art.

What is claimed is:

1. A method for configuring a multiple autonomous drone mission comprising:
    displaying, by a processor of a computing device, a plurality of queries on a display of the computing device;
    receiving, by the processor via a user interface, a plurality of inputs responsive to the plurality of queries, wherein at least a first input of the plurality of inputs specifies a type of mission to be performed and at least a second input of the plurality of inputs specifies a geographical area in which a mission to be performed will be carried out;
    automatically determining, by the processor based on the plurality of inputs, an initial location to move to for each of a plurality of drones available for implementing the mission; and
    automatically determining, by the processor based on the plurality of inputs, a series of tasks for each of the plurality of drones.

2. The method of claim 1, wherein the series of tasks for each of the plurality of drones comprises a first series of tasks for a first drone and a second series of tasks for a second drone, wherein the first series of tasks and the second series of tasks are different from one another.

3. The method of claim 1, further comprising transmitting, by the processor, an instruction to deploy the plurality of drones to implement the mission, wherein the plurality of drones is deployed only after the plurality of inputs are received via the user interface.

4. The method of claim 1, wherein the automatically determining the initial location to move to for each of the plurality of drones further comprises automatically determining a search area for assignment to each of the plurality of drones, where the search area for each of the plurality of drones is different and indicates an area in which each of the plurality of drones should search for a target.

5. The method of claim 4, further comprising receiving, by the processor from a first drone of the plurality of drones after the plurality of drones have been deployed, data indicating that a candidate for the target has been located.

6. The method of claim 5, further comprising:
    receiving, by the processor, a confirmation input via the user interface indicating that the candidate is the target being searched for; and
    transmitting, by the processor to each of the plurality of drones other than the first drone, a target found signal, wherein each of the plurality of drones other than the first drone changes tasks based on the target found signal.

7. The method of claim 5, further comprising receiving, by the processor, a confirmation input via the user interface indicating that the candidate is not the target being searched for, wherein each of the plurality of drones other than the first drone do not change tasks based on the data indicating that the candidate for the target has been located.

8. The method of claim 1, wherein the series of tasks for a first drone of the plurality of drones comprises a first task and a second task, wherein:
    the second task is configured to be completed after completion of the first task; and
    the first drone is configured to autonomously determine that the first task is completed and, based on the determination that the first task is completed, autonomously implement the second task.

9. The method of claim 1, wherein the series of tasks for a first drone of the plurality of drones comprises a first task and a second task, wherein the second task is configured to be completed after completion of the first task and wherein the method further comprises:
    receiving, at the processor, an indication that the first drone has completed the first task;
    receiving, at the processor, a confirmation input via the user interface indicating that the first drone may proceed to implementing the second task; and
    transmitting, from the processor to the first drone, a signal instructing the first drone to implement the second task.

10. The method of claim 1, wherein the series of tasks for a first drone of the plurality of drones comprises a first task and a second task, wherein:
    the second task is configured to be completed after completion of the first task; and
    the first drone is initially configured to autonomously determine that the first task is completed and, based on the determination that the first task is completed, autonomously implement the second task, and wherein the method further comprises:
receiving, by the processor, an input via the user interface indicative of a change of an autonomy level of the first drone; and
transmitting, by the processor to the first drone while the first drone is implementing the first task, a signal instructing the first drone to proceed to the second task only after requesting and receiving confirmation from the computing device authorizing the first drone to proceed to the second task.

11. A system comprising:
a display;
a user interface;
a memory; and
a processor coupled to the memory, the processor configured to:
display a plurality of queries on the display;
receive, via the user interface, a plurality of inputs responsive to the plurality of queries, wherein at least a first input of the plurality of inputs specifies a type of mission to be performed and at least a second input of the plurality of inputs specifies a geographical area in which a mission to be performed will be carried out;
automatically determine, based on the plurality of inputs, an initial location to move to for each of a plurality of drones available for implementing the mission;
automatically determine, based on the plurality of inputs, a series of tasks for each of the plurality of drones;
receive, via the user interface after the receiving of the plurality of inputs responsive to the plurality of queries, a deploy input configured to cause the plurality of drones to carry out the mission; and
transmit, to each of the plurality of drones based on the receiving of the deploy input, an instruction to deploy the plurality of drones to implement the mission.

12. The system of claim 11, wherein the processor is further configured to:
receive, from each of the plurality of drones, a video feed from a camera of each of the plurality of drones; and
display, on the display, the video feed from each of the plurality of drones.

13. The system of claim 11, wherein the processor is further configured to:
receive, from each of the plurality of drones, geographic location information from each of the plurality of drones; and
display, on the display based on the geographic location information, icons representative of each of the plurality of drones overlaid over a map to indicate an actual location of each of the plurality of drones.

14. The system of claim 13, wherein the icons further indicate a direction of travel of each of the plurality of drones.

15. The system of claim 11, wherein the processor is further configured to:
receive, from a first drone of the plurality of drones, data indicative of:
a current task of the first drone being completed,
a potential candidate for a search task of the first drone being located,
the first drone currently changing tasks,
the first drone changing speed, path, or altitude, or
a request for the first drone to change tasks; and
display, on the display, a pop up indicative of the data received from the first drone.

16. A non-transitory computer readable medium having instructions stored thereon that, upon execution by a computing device, cause the computing device to perform operations comprising:
displaying a plurality of queries on a display of the computing device;
receiving, via a user interface, a plurality of inputs responsive to the plurality of queries, wherein at least a first input of the plurality of inputs specifies a type of mission to be performed and at least a second input of the plurality of inputs specifies a geographical area in which a mission to be performed will be carried out;
automatically determining, based on the plurality of inputs, an initial location to move to for each of a plurality of drones available for implementing the mission;
automatically determining, based on the plurality of inputs, a series of tasks for each of the plurality of drones;
receiving, via the user interface after the receiving of the plurality of inputs responsive to the plurality of queries, a deploy input configured to cause the plurality of drones to carry out the mission;
transmitting, to each of the plurality of drones based on the receiving of the deploy input, an instruction to deploy the plurality of drones to implement the mission; and
receiving, after the plurality of drones have deployed, an input via the user interface indicative of a request to change an autonomy level of a first drone of the plurality of drones.

17. The non-transitory computer readable medium of claim 16, wherein the input indicative of the request to change the autonomy level of the first drone comprises an instruction to reject a current action of the first drone or a proposed action of the first drone.

18. The non-transitory computer readable medium of claim 16, wherein, based on the input indicative of the request to change the autonomy level of the first drone, the instructions further cause the computing device to perform operations comprising presenting, on the display, additional information about tasks being performed by or planned to be performed by the first drone.

19. The non-transitory computer readable medium of claim 16, wherein input indicative of the request to change the autonomy level of the first drone is received responsive to a prompt displayed on the display comprising information explaining a change in task being performed by the first drone.

20. The non-transitory computer readable medium of claim 16, wherein the instructions further cause the computing device to perform operations comprising:
presenting, on the display, first information about a first change in task of the first drone that will take place autonomously without further input by a user; and
presenting on the display, second information about a second change in task of the first drone that will take place only if a user input is received to authorize the second change in task.

* * * * *